(12) United States Patent
Qu et al.

(10) Patent No.: US 10,050,684 B2
(45) Date of Patent: Aug. 14, 2018

(54) FBMC TRANSMIT DIVERSITY TRANSMISSION METHOD, TRANSMIT END APPARATUS, AND RECEIVE END APPARATUS

(71) Applicant: Huawei Technologies Co., Ltd., Shenzhen (CN)

(72) Inventors: Daiming Qu, Wuhan (CN); Jun LI, Wuhan (CN); Tao Jiang, Wuhan (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/604,387

(22) Filed: May 24, 2017

(65) Prior Publication Data

US 2017/0272137 A1    Sep. 21, 2017

Related U.S. Application Data

(63) Continuation of application No. PCT/CN2015/095378, filed on Nov. 24, 2015.

(30) Foreign Application Priority Data

Nov. 25, 2014    (WO) ................ PCT/CN2014/092183

(51) Int. Cl.
*H04B 7/02* (2018.01)
*H04L 1/02* (2006.01)
(Continued)

(52) U.S. Cl.
CPC ............. *H04B 7/0456* (2013.01); *H04B 7/06* (2013.01); *H04B 15/00* (2013.01)

(58) Field of Classification Search
CPC ........ H04B 7/0456; H04B 7/06; H04B 15/00; H04B 15/70669; H04B 7/0669
(Continued)

(56) References Cited

U.S. PATENT DOCUMENTS 7,609,611 B1    10/2009    Siohan et al.
8,873,365 B2 *  10/2014    Walton ................ H04B 7/0669
                                                     370/208

FOREIGN PATENT DOCUMENTS

CN          103825862 A    5/2014
CN          103888406 A    6/2014
WO    WO 2014130554 A1    8/2014

OTHER PUBLICATIONS

Renfors et al., "A Block-Alamouti Scheme for Filter Bank Based Multicarrier Transmission," 2010 European Wireless Conference, pp. 1031-1037, Institute of Electrical and Electronics Engineers. New York, New York, (2010).
(Continued)

*Primary Examiner* — Phuong Phu
(74) *Attorney, Agent, or Firm* — Leydig, Voit & Mayer, Ltd.

(57) ABSTRACT

The present invention provides an FBMC transmit diversity transmission method and apparatus. The method includes: obtaining a to-be-transmitted data sequence, where the to-be-transmitted data sequence includes 2*M*N pieces of data; performing transmit diversity processing on the to-be-transmitted data sequence to obtain FBMC signals of a first antenna and a second antenna, where a precoding matrix is (I) or (II), a matrix that includes the FBMC signals of the first antenna and the second antenna is (III), a matrix that includes the to-be-transmitted data sequence is (IV), $0 \le i \le M-1$, $0 \le j \le N-1$, Y=WX, the 2*M*N pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le N-1$; and transmitting the FBMC signals of the first antenna and the second antenna.

16 Claims, 14 Drawing Sheets

(51) Int. Cl.
*H04B 7/0456* (2017.01)
*H04B 7/06* (2006.01)
*H04B 15/00* (2006.01)

(58) Field of Classification Search
USPC .................. 375/267, 260, 299, 347; 370/208
See application file for complete search history.

(56) References Cited

OTHER PUBLICATIONS

Zakaria et al., "On Interference cancellation in Alamouti coding scheme for filter bank based multicarrier systems," The Tenth International Symposium on Wireless Communication Systems, pp. 26-30, VDE Verlag GMBH, Offenbach, Germany (2013).

* cited by examiner

FBMC TRANSMIT DIVERSITY TRANSMISSION METHOD, TRANSMIT END APPARATUS, AND RECEIVE END APPARATUS

CROSS-REFERENCE TO RELATED APPLICATIONS

This application is a continuation of International Application No. PCT/CN2015/095378, filed on Nov. 24, 2015, which claims priority to International Application No. PCT/CN2014/092183, filed on Nov. 25, 2014, the disclosure of which is hereby incorporated by reference in its entirety.

TECHNICAL FIELD

Embodiments of the present invention relate to the communications field, and more specifically, to an FBMC transmit diversity transmission method, a transmit end apparatus, and a receive end apparatus.

BACKGROUND

A transmit diversity technology can effectively reduce channel fading and improve reliability of a communications system. Alamouti encoding is a classic space time coding scheme based on transmit diversity, and construction is easy and decoding is simple. However, filter bank-based multi carrier (Filter Bank-based Multi Carrier, FBMC) has an imaginary part interference problem, and can hardly be combined with Alamouti encoding.

A block Alamouti scheme is proposed in the prior art. In this scheme, space time block code (Space Time Block Code, STBC) is combined with the FBMC, and a guard interval needs to be added in a time domain to eliminate impact of imaginary part interference. Because the FBMC uses a prototype filter of a relatively long impulse response, a symbol transmitted in the time domain suffers imaginary part interference from multiple symbols. Therefore, the guard interval added in the time domain is quite large, which causes relatively low system efficiency.

A difficulty of combining the FBMC with Alamouti encoding lies in the impact of imaginary part interference. How to reduce the impact of imaginary part interference without using a guard interval is a problem that the present invention intends to resolve.

SUMMARY

The present invention provides an FBMC transmit diversity transmission method, a transmit end apparatus, and a receive end apparatus, so as to almost completely eliminate impact of imaginary part interference without using a guard interval, and improve system performance.

According to a first aspect, an FBMC transmit diversity transmission method is provided, where the method includes: obtaining a to-be-transmitted data sequence, where the to-be-transmitted data sequence includes 2*M*N pieces of data;

performing transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^{j} & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^{j} & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

0≤i≤M−1, 0≤j≤N−1, Y=WX, the 2*M*N pieces of data of the to-be-transmitted data sequence are denoted by $x^{(0)}(k,l)$ and $x^{(1)}(k,l)$, 0≤k≤M−1, 0≤l≤N−1, FBMC signals of the first antenna and the second antenna on an $r^{th}$ subcarrier and an $s^{th}$ symbol are denoted by $y^{(0)}(r,s)$ and $y^{(1)}(r,s)$, 0≤r≤2M−1, and 0≤s≤N−1; and transmitting the FBMC signals of the first antenna and the second antenna.

With reference to the first aspect, in a first possible implementation manner, specific implementation is: all the 2*M*N pieces of data are pure-real-number data, or all are pure-imaginary-number data.

According to a second aspect, an FBMC transmit diversity transmission method is provided, where the method includes: obtaining a to-be-transmitted data sequence, where the to-be-transmitted data sequence includes 2*M*N pieces of data;

performing transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, $Y=WX$, the $2*M*N$ pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le M-1$, and $0 \le s \le 2N-1$; and transmitting the FBMC signals of the first antenna and the second antenna.

With reference to the second aspect, in a first possible implementation manner, specific implementation is: all the $2*M*N$ pieces of data are pure-real-number data, or all are pure-imaginary-number data.

According to a third aspect, an FBMC transmit diversity receiving method is provided, where the method includes: receiving transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \le i \le M-1$, $0 \le j \le N-1$, $Y=WX$, $2*M*N$ pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le N-1$;

performing an FBMC signal demodulation operation on the transmit diversity signals to obtain a first signal;

performing a decoding operation on the first signal according to Alamouti encoding to obtain a second signal; and according to the second signal, performing an interference cancellation operation on received signals corresponding to the $(M-1)^{th}$ subcarrier and the $M^{th}$ subcarrier that are two adjacent subcarriers of the first antenna, and performing an interference cancellation operation on received signals corresponding to the $(M-1)^{th}$ subcarrier and the $M^{th}$ subcarrier that are two adjacent subcarriers of the second antenna, to obtain an estimated value of the data sequence.

With reference to the third aspect, in a first possible implementation manner, specific implementation is: all the $2*M*N$ pieces of data are pure-real-number data, or all are pure-imaginary-number data.

According to a fourth aspect, an FBMC transmit diversity receiving method is provided, where the method includes: receiving transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is a matrix that $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

includes the first FBMC signal and the second FBMC signal is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, $Y=WX$, $2*M*N$ pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ sub carrier and an $s^{th}$ symbol are denoted by $y^{(0)}(r,s)$ and $y^{(1)}(r,s)$, $0 \le r \le M-1$, and $0 \le s \le 2N-1$;

performing an FBMC signal demodulation operation on the transmit diversity signals to obtain a first signal;

performing a decoding operation on the first signal according to Alamouti encoding to obtain a second signal; and according to the second signal, performing an interference cancellation operation on received signals corresponding to the $(N-1)^{th}$ symbol and the $N^{th}$ symbol that are two adjacent symbols of the first antenna, and performing an interference cancellation operation on received signals corresponding to the $(N-1)^{th}$ symbol and the $N^{th}$ symbol that are two adjacent symbols of the second antenna, to obtain an estimated value of the data sequence.

With reference to the fourth aspect, in a first possible implementation manner, specific implementation is: all the 2*M*N pieces of data are pure-real-number data, or all are pure-imaginary-number data.

According to a fifth aspect, a transmit end apparatus is provided, where the apparatus includes: an obtaining unit, configured to obtain a to-be-transmitted data sequence, where the to-be-transmitted data sequence includes 2*M*N pieces of data;

a processing unit, configured to perform transmit diversity processing on the to-be-transmitted data sequence to obtain FBMC signals of a first antenna and a second antenna, where
a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \le i \le M-1$, $0 \le j \le N-1$, $Y=WX$, the 2*M*N pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le N-1$; and a transmitting unit, configured to transmit the FBMC signals of the first antenna and the second antenna.

With reference to the fifth aspect, in a first possible implementation manner, specific implementation is: all the 2*M*N pieces of data are pure-real-number data, or all are pure-imaginary-number data.

According to a sixth aspect, a transmit end apparatus is provided, where the apparatus includes: an obtaining unit, configured to obtain a to-be-transmitted data sequence, where the data sequence includes 2*M*N pieces of data;

a processing unit, configured to perform transmit diversity processing on the to-be-transmitted data sequence to obtain FBMC signals of a first antenna and a second antenna, where
a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, $Y=WX$, the 2*M*N pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le M-1$, and $0 \le s \le 2N-1$; and a transmitting unit, configured to transmit the FBMC signals of the first antenna and the second antenna.

With reference to the sixth aspect, in a first possible implementation manner, specific implementation is: all the 2*M*N pieces of data are pure-real-number data, or all are pure-imaginary-number data.

According to a seventh aspect, a receive end apparatus is provided, where the apparatus includes: a receiving unit, configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where
a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \le i \le M-1$, $0 \le j \le N-1$, $Y=WX$, $2*M*N$ pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le N-1$;

a demodulation unit, configured to perform an FBMC signal demodulation operation on the transmit diversity signals to obtain a first signal; and a decoding unit, configured to: perform a decoding operation on the first signal according to Alamouti encoding to obtain a second signal; and according to the second signal, perform an interference cancellation operation on received signals corresponding to the $(M-1)^{th}$ subcarrier and the $M^{th}$ subcarrier that are two adjacent subcarriers of the first antenna, and perform an interference cancellation operation on received signals corresponding to the $(M-1)^{th}$ subcarrier and the $M^{th}$ subcarrier that are two adjacent subcarriers of the second antenna, to obtain an estimated value of the data sequence.

With reference to the seventh aspect, in a first possible implementation manner, specific implementation is: all the $2*M*N$ pieces of data are pure-real-number data, or all are pure-imaginary-number data.

According to an eighth aspect, a receive end apparatus is provided, where the apparatus includes: a receiving unit, configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is a matrix that $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, $Y=WX$, $2*M*N$ pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ sub carrier and an $s^{th}$ symbol are denoted by $y^{(0)}(r,s)$ and $y^{(1)}(r,s)$, $0 \le r \le M-1$, and $0 \le s \le 2N-1$;

a demodulation unit, configured to perform an FBMC signal demodulation operation on the transmit diversity signals to obtain a first signal;

a decoding unit, configured to: perform a decoding operation on the first signal according to Alamouti encoding to obtain a second signal; and according to the second signal, perform an interference cancellation operation on received signals corresponding to the $(N-1)^{th}$ symbol and the $N^{th}$ symbol that are two adjacent symbols of the first antenna, and perform an interference cancellation operation on received signals corresponding to the $(N-1)^{th}$ symbol and the $N^{th}$ symbol that are two adjacent symbols of the second antenna, to obtain an estimated value of the data sequence.

With reference to the eighth aspect, in a first possible implementation manner, specific implementation is: all the $2*M*N$ pieces of data are pure-real-number data, or all are pure-imaginary-number data.

According to a ninth aspect, an FBMC transmit diversity transmission method is provided, where the method includes: obtaining a to-be-transmitted data sequence, where the to-be-transmitted data sequence includes $2*M*N$ pieces of data; determining a first data matrix, a second data matrix, a third data matrix, and a fourth data matrix according to the data sequence, where the first data matrix is equal to an M rows*N columns data matrix generated from $M*N$ pieces of data in the data sequence or a data matrix obtained by multiplying data in a first group of specified positions in M rows*N columns positions of an M rows*N columns data matrix generated from $M*N$ pieces of data by $-1$, the third data matrix is equal to an M rows*N columns data matrix generated from other $M*N$ pieces of data in the data sequence or a data matrix obtained by multiplying data in a second group of specified positions in M rows*N columns positions of an M rows*N columns data matrix generated from other $M*N$ pieces of data by $-1$, the second data matrix is equal to a data matrix obtained by arranging the third data matrix in reversed order of rows and multiplying data in odd-numbered columns by $-1$, and the fourth data matrix is equal to a data matrix obtained by arranging the first data matrix in reversed order of rows and multiplying data in even-numbered columns by $-1$; and mapping the first data matrix onto N consecutive symbols*M consecutive subcarriers on a first antenna, mapping the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, mapping the third data matrix onto a same time-frequency position as the first data matrix on a second antenna, and mapping the fourth data matrix onto a same time-frequency position as the second data matrix on the second antenna; and separately generating FBMC signals of the first antenna and the second antenna according to the mapped data matrices; and transmitting the FBMC signals of the first antenna and the second antenna.

With reference to the ninth aspect, in a first possible implementation manner, specific implementation is: all the 2*M*N pieces of data are pure-real-number data, or all are pure-imaginary-number data.

With reference to the ninth aspect or the first possible implementation manner of the ninth aspect, in the second possible implementation manner, specific implementation is: the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} -b_{M,1} & b_{M,2} & -b_{M,3} & \ldots & (-1)^N b_{M,N} \\ \ldots & \ldots & \ldots & \ldots & \ldots \\ -b_{2,1} & b_{2,2} & -b_{2,3} & \ldots & (-1)^N b_{2,N} \\ -b_{1,1} & b_{1,2} & -b_{1,3} & \ldots & (-1)^N b_{1,N} \end{bmatrix};$$

the third data matrix is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

With reference to the ninth aspect or the first possible implementation manner of the ninth aspect, in a third possible implementation manner, specific implementation is: the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} b_{M,1} & b_{M,2} & b_{M,3} & \ldots & b_{M,N} \\ \ldots & \ldots & \ldots & \ldots & \ldots \\ b_{2,1} & b_{2,2} & b_{2,3} & \ldots & b_{2,N} \\ b_{1,1} & b_{1,2} & b_{1,3} & \ldots & b_{1,N} \end{bmatrix};$$

the third data matrix is $$\begin{bmatrix} -b_{1,1} & b_{1,2} & -b_{1,3} & \ldots & (-1)^N b_{1,N} \\ -b_{2,1} & b_{2,2} & -b_{2,3} & \ldots & (-1)^N b_{2,N} \\ \ldots & \ldots & \ldots & \ldots & \ldots \\ -b_{M,1} & b_{M,2} & -b_{M,3} & \ldots & (-1)^N b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

According to a tenth aspect, an FBMC transmit diversity transmission method is provided, where the method includes: obtaining a to-be-transmitted data sequence, where the data sequence includes 2*M*N pieces of data; determining a first data matrix, a second data matrix, a third data matrix, and a fourth data matrix according to the data sequence, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns; and mapping the first data matrix onto N consecutive symbols*M consecutive subcarriers on a first antenna, mapping the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, mapping the third data matrix onto a same time-frequency position as the first data matrix on a second antenna, and mapping the fourth data matrix onto a same time-frequency position as the second data matrix on the second antenna; separately generating FBMC signals of the first antenna and the second antenna according to the mapped data matrices; and transmitting the FBMC signals of the first antenna and the second antenna.

With reference to the tenth aspect, in a first possible implementation manner, specific implementation is: all the 2*M*N pieces of data are pure-real-number data, or all are pure-imaginary-number data.

With reference to the tenth aspect or the first possible implementation manner of the tenth aspect, in a second possible implementation manner, specific implementation is: the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & \cdots & a_{1,N} \\ a_{2,1} & a_{2,2} & \cdots & a_{2,N} \\ \cdots & \cdots & \cdots & \cdots \\ a_{M,1} & a_{M,2} & \cdots & a_{M,N} \end{bmatrix};$$

the second data matrix is $$\begin{bmatrix} -b_{1,N} & \cdots & -b_{1,2} & -b_{1,1} \\ -b_{2,N} & \cdots & -b_{2,2} & -b_{2,1} \\ \cdots & \cdots & \cdots & \cdots \\ -b_{M,N} & \cdots & -b_{M,2} & -b_{M,1} \end{bmatrix};$$

the third data matrix is $$\begin{bmatrix} b_{1,1} & b_{1,2} & \cdots & b_{1,N} \\ b_{2,1} & b_{2,2} & \cdots & b_{2,N} \\ \cdots & \cdots & \cdots & \cdots \\ b_{M,1} & b_{M,2} & \cdots & b_{M,N} \end{bmatrix};$$

and
the fourth data matrix is $$\begin{bmatrix} a_{1,N} & \cdots & a_{1,2} & a_{1,1} \\ a_{2,1} & \cdots & a_{2,2} & a_{2,N} \\ \cdots & \cdots & \cdots & \cdots \\ a_{M,N} & \cdots & a_{M,2} & a_{M,1} \end{bmatrix}.$$

According to an eleventh aspect, an FBMC transmit diversity receiving method is provided, where the method includes: receiving transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1; performing a filter bank-based multi carrier FBMC signal demodulation operation on the transmit diversity signals to obtain a first signal; performing a decoding operation on the first signal according to Alamouti encoding to obtain a second signal; and according to the second signal, performing an interference cancellation operation on data on two adjacent subcarriers of the first data matrix and the second data matrix, and performing an interference cancellation operation on data on two adjacent subcarriers of the third data matrix and the fourth data matrix, to obtain an estimated value of the data sequence.

With reference to the eleventh aspect, in a first possible implementation manner, specific implementation is: all the 2*M*N pieces of data are pure-real-number data, or all are pure-imaginary-number data.

According to a twelfth aspect, an FBMC transmit diversity receiving method is provided, where the method includes: receiving transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna; and the first data matrix is equal to an M rows*N columns data matrix generated from M*N pieces of data in a to-be-transmitted data sequence of the transmit end or a data matrix obtained by multiplying data in a first group of specified positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of columns and multiplying all data by −1, and the fourth data matrix is equal to a data matrix obtained by arranging the first data matrix in reversed order of columns; and performing a filter bank-based multi carrier FBMC signal demodulation operation on the transmit diversity signals to obtain a first signal; performing a decoding operation on the first signal according to Alamouti encoding to obtain a second signal; and according to the second signal, performing an interference cancellation operation on data on two adjacent subcarriers of the first data matrix and the second data matrix, and performing an interference cancellation operation on data on two adjacent subcarriers of the third data matrix and the fourth data matrix, to obtain an estimated value of the data sequence.

With reference to the twelfth aspect, in a first possible implementation manner, specific implementation is: all the 2*M*N pieces of data are pure-real-number data, or all are pure-imaginary-number data.

According to a thirteenth aspect, a transmit end apparatus is provided, where the transmit end apparatus includes: an obtaining unit, configured to obtain a to-be-transmitted data sequence, where the to-be-transmitted data sequence includes 2*M*N pieces of data; a determining unit, configured to determine a first data matrix, a second data matrix, a third data matrix, and a fourth data matrix according to the data sequence, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1; and a mapping unit, configured to map the first data matrix onto N consecutive symbols*M consecutive subcarriers on a first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on a second antenna, and map the fourth data matrix onto a same time-frequency position as the second data matrix on the second antenna; a signal generation unit, configured to separately generate FBMC signals of the first antenna and the second antenna according to the mapped data matrices; and a transmitting unit, configured to transmit the FBMC signals of the first antenna and the second antenna.

With reference to the thirteenth aspect, in a first possible implementation manner, specific implementation is: all the 2*M*N pieces of data are pure-real-number data, or all are pure-imaginary-number data.

With reference to the thirteenth aspect or the first possible implementation manner of the thirteenth aspect, in a second possible implementation manner, specific implementation is: the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} -b_{M,1} & b_{M,2} & -b_{M,3} & \ldots & (-1)^N b_{M,N} \\ \ldots & \ldots & \ldots & \ldots & \ldots \\ -b_{2,1} & b_{2,2} & -b_{2,3} & \ldots & (-1)^N b_{2,N} \\ -b_{1,1} & b_{1,2} & -b_{1,3} & \ldots & (-1)^N b_{1,N} \end{bmatrix};$$

the third data matrix is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix};$$

and the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

With reference to the thirteenth aspect or the first possible implementation manner of the thirteenth aspect, in a third possible implementation manner, specific implementation is: the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} b_{M,1} & b_{M,2} & b_{M,3} & \ldots & b_{M,N} \\ \ldots & \ldots & \ldots & \ldots & \ldots \\ b_{2,1} & b_{2,2} & b_{2,3} & \ldots & b_{2,N} \\ b_{1,1} & b_{1,2} & b_{1,3} & \ldots & b_{1,N} \end{bmatrix};$$

the third data matrix is $$\begin{bmatrix} -b_{1,1} & b_{1,2} & -b_{1,3} & \ldots & (-1)^N b_{1,N} \\ -b_{2,1} & b_{2,2} & -b_{2,2} & \ldots & (-1)^N b_{2,N} \\ \ldots & \ldots & \ldots & \ldots & \ldots \\ -b_{M,1} & b_{M,2} & -b_{M,3} & \ldots & (-1)^N b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

According to a fourteenth aspect, a transmit end apparatus is provided, where the transmit end apparatus includes: an obtaining unit, configured to obtain a to-be-transmitted data sequence, where the data sequence includes 2*M*N pieces of data; a determining unit, configured to determine a first data matrix, a second data matrix, a third data matrix, and a fourth data matrix according to the data sequence, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns; a mapping unit, configured to map the first data matrix onto N consecutive symbols*M consecutive subcarriers on a first antenna, map the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map the third data matrix onto a same time-frequency position as the first data matrix on a second antenna, and map the fourth data matrix onto a same time-frequency position as the second data matrix on the second antenna; a signal generation unit, configured to separately generate FBMC signals of the first antenna and the second antenna according to the mapped data matrices; and a transmitting unit, configured to transmit the FBMC signals of the first antenna and the second antenna.

With reference to the fourteenth aspect, in a first possible implementation manner, specific implementation is: all the 2*M*N pieces of data are pure-real-number data, or all are pure-imaginary-number data.

With reference to the fourteenth aspect or the first possible implementation manner of the fourteenth aspect, in a second possible implementation manner, specific implementation is: the 2*M*N pieces of data include $a_{i,j}$, $1 \le i \le M$, $1 \le j \le N$ and $b_{k,l}$, $1 \le k \le M$, $1 \le l \le N$;

the first data matrix is $$\begin{bmatrix} a_{1,1} & a_{1,2} & \ldots & a_{1,N} \\ a_{2,1} & a_{2,2} & \ldots & a_{2,N} \\ \ldots & \ldots & \ldots & \ldots \\ a_{M,1} & a_{M,2} & \ldots & a_{M,N} \end{bmatrix};$$

the second data matrix is $$\begin{bmatrix} -b_{1,N} & \ldots & -b_{1,2} & -b_{1,1} \\ -b_{2,N} & \ldots & -b_{2,2} & -b_{2,1} \\ \ldots & \ldots & \ldots & \ldots \\ -b_{M,N} & \ldots & -b_{M,2} & -b_{M,1} \end{bmatrix};$$

the third data matrix is $$\begin{bmatrix} b_{1,1} & b_{1,2} & \ldots & b_{1,N} \\ b_{2,1} & b_{2,2} & \ldots & b_{2,N} \\ \ldots & \ldots & \ldots & \ldots \\ b_{M,1} & b_{M,2} & \ldots & b_{M,N} \end{bmatrix};$$

and
the fourth data matrix is $$\begin{bmatrix} a_{1,N} & \ldots & a_{1,2} & a_{1,1} \\ a_{2,1} & \ldots & a_{2,2} & a_{2,N} \\ \ldots & \ldots & \ldots & \ldots \\ a_{M,N} & \ldots & a_{M,2} & a_{M,1} \end{bmatrix}.$$

According to a fifteenth aspect, a receive end apparatus is provided, where the receive end apparatus includes: a receiving unit, configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1; a demodulation unit, configured to perform a filter bank-based multi carrier FBMC signal demodulation operation on the transmit diversity signals to obtain a first signal; and a decoding unit, configured to perform a decoding operation on the first signal according to Alamouti encoding to obtain a second signal, and according to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

With reference to the fifteenth aspect, in a first possible implementation manner, specific implementation is: all the 2*M*N pieces of data are pure-real-number data, or all are pure-imaginary-number data.

According to a sixteenth aspect, a receive end apparatus is provided, where the receive end apparatus includes: a receiving unit, configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of columns and multiplying all data by −1, and the fourth data matrix is equal to a data matrix obtained by arranging the first data matrix in reversed order of columns; a demodulation unit, configured to perform a filter bank-based multi carrier FBMC signal demodulation operation on the transmit diversity signals to obtain a first signal; and a decoding unit, configured to perform a decoding operation on the first signal according to Alamouti encoding to obtain a second signal, and according to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

With reference to the sixteenth aspect, in a first possible implementation manner, specific implementation is: all the 2*M*N pieces of data are pure-real-number data, or all are pure-imaginary-number data.

Based on the foregoing technical solution, according to the FBMC transmit diversity transmission method, the transmit end apparatus, and the receive end apparatus in the embodiments of the present invention, to-be-transmitted data is encoded according to a specific data encoding manner and then transmitted, which almost completely eliminates impact of imaginary part interference without using a guard interval, and improves system performance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
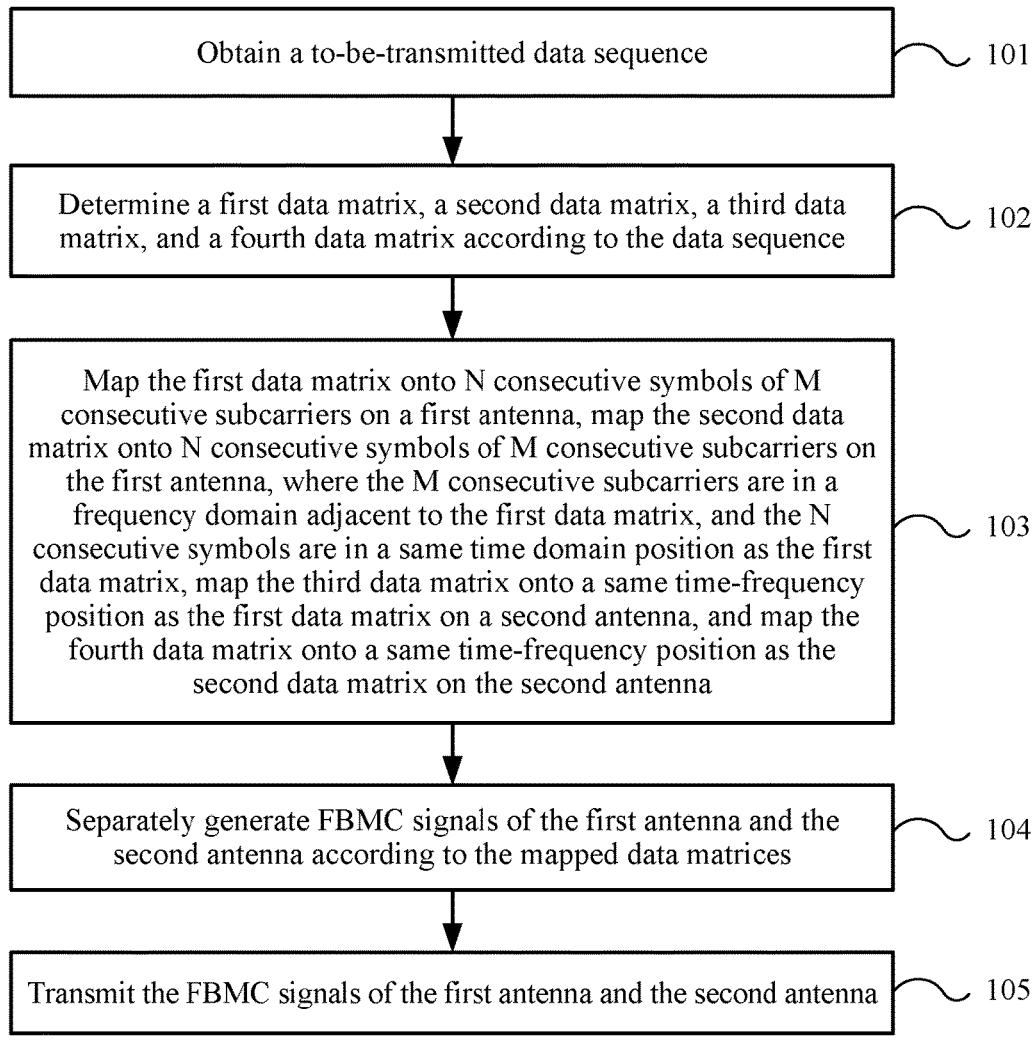
FIG. 1 is a flowchart of an FBMC transmit diversity transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To facilitate understanding of the embodiments of the present invention, several elements that may be cited in the embodiments of the present invention are described herein first.

Transmit diversity: A traditional diversity technology is a receive diversity technology, that is, a technology of receiving at a receive end by using multiple antennas separately. In the late 90s of the last century, S. M. Alamouti proposed a "transmit diversity" technology in which two antennas are used for transmission. This technology uses a simple orthogonal block coding method, and therefore, is called "orthogonal transmit diversity" or briefly called "transmit diversity". The transmit diversity technology enables multiple mobile stations to obtain transmit gains from one transmit signal, can support point-to-multipoint transmission, and therefore, caters for mobile communications development requirements.

Filter bank-based multi Carrier (Filter Bank-based Multi Carrier, FBMC): The FBMC belongs to a frequency division multiplexing technology, which divides a channel spectrum by using a group of filters to implement frequency multiplexing of a channel. Compared with orthogonal frequency division multiplexing (Orthogonal Frequency Division Multiplexing, OFDM), the FBMC can provide more effective pulse shaping filtering to obtain better time-frequency local characteristics, and can effectively reduce impact of ICI/ISI without inserting a cyclic prefix when transmitting a signal. An existing technology of an FBMC system may be roughly classified into a cosine modulation multi-frequency technology, a discrete wavelet multi-tone modulation technology, a filter multi-tone modulation technology, an offset quadrature amplitude modulation (Offset Quadrature Amplitude Modulation, OQAM)-based OFDM technology, and a complex exponential modulation filter bank (Exponential Modulate Filter Bank, EMFB) technology, and the like. The FBMC system includes a transmit end synthesis filter and a receive end analysis filter. An analysis filter bank decomposes an input signal into multiple subband signals, and a synthesis filter bank synthesizes all the subband signals and then reconstructs and outputs the signals.

A signal transmitted by a transmit end in an OFDM/OQAM system may be denoted by:

$$s(k) = \sum_m \sum_n d_{m,n} g\left(k - n\frac{M}{2}\right) e^{j2\pi mk/M} e^{j(m+n)\pi/2} \quad (1)$$

M is a quantity of subcarriers, g(k) is a shaping filter used by the transmit end in the system, $d_{m,n}$ is a real number symbol, m denotes the $m^{th}$ subcarrier, and n is the $n^{th}$ symbol period.

Assuming that a channel may be deemed invariable in a local time and frequency, after undergoing zero-forcing equalization, a receive end signal can approximately meet:

$d_{m,n}^{(c)} \approx d_{m,n} + jd_{m,n}^{(i)}$, where $jd_{m,n}^{(i)}$ denotes interference received by $d_{m,n}$ from data transmitted from a time-frequency point (m, n) neighborhood, and if the neighborhood is denoted by $\Omega_{\Delta m, \Delta n}$, which means that $d_{m,n}$ receives interference from data in a time-frequency point (m±Δm, n±Δn) position, $jd_{m,n}^{(i)}$ may be denoted by:

$$jd_{m,n}^{(i)} \approx \sum_{\substack{(p,q)\in\Omega_{\Delta m,\Delta n} \\ (p,q)\neq(0,0)}} d_{m+p,n+q} c_{p,q},$$

where $c_{p,q}$ is a pure imaginary number and denotes an imaginary part interference coefficient caused by data in a time-frequency point (m+p, n+q) position to data in a time-frequency point (m, n) position. The imaginary part interference coefficient is determined by using a prototype filter function. Table 1 gives imaginary part interference coefficients of a Phydyas filter that are obtained when n is an odd number, and Table 2 gives imaginary part interference coefficients of a Phydyas filter that are obtained when n is an even number. For unified description, $c_{pq}$ mentioned in the following comes from Table 1. When n is an even number, the imaginary part interference coefficient can be easily denoted by using $c_{pq}$ in Table 1.

TABLE 1

| $c_{pq}$ | 3 | 2 | 1 | 0 | −1 | −2 | −3 |
|---|---|---|---|---|---|---|---|
| 1 | 0.0429j | 0.1250j | 0.2058j | 0.2393j | 0.2058j | 0.1250j | 0.0429j |
| 0 | 0.0668j | 0 | 0.5644j | 0 | −0.5644j | 0 | −0.0668j |
| −1 | 0.0429j | −0.1250j | 0.2058j | −0.2393j | 0.2058j | −0.1250j | 0.0429j |

TABLE 2

| $c_{pq}$ | 3 | 2 | 1 | 0 | −1 | −2 | −3 |
|---|---|---|---|---|---|---|---|
| 1 | −0.0429j | −0.1250j | −0.2058j | −0.2393j | −0.2058j | −0.1250j | −0.0429j |
| 0 | 0.0668j | 0 | 0.5644j | 0 | −0.5644j | 0 | −0.0668j |
| −1 | −0.0429j | 0.1250j | −0.2058j | 0.2393j | −0.2058j | 0.1250j | −0.0429j |

A difficulty of combining the FBMC with Alamouti encoding lies in impact of imaginary part interference. How to reduce the impact of imaginary part interference without using a guard interval is a problem that the present invention intends to resolve.

FIG. 1 is a flowchart of an FBMC transmit diversity transmission method according to an embodiment of the present invention. The method in FIG. 1 is executed by an FBMC transmit diversity transmit end apparatus. In specific application, the transmit end apparatus may be a radio access device such as a base station; or may be user equipment of a terminal such as a mobile phone. The method includes the following steps.

101. Obtain a to-be-transmitted data sequence.

The data sequence includes 2*M*N pieces of data.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

102. Determine a first data matrix, a second data matrix, a third data matrix, and a fourth data matrix according to the data sequence.

The first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

It should be understood that in this embodiment of the present invention, a specified position is a position of a data element in an M rows*N columns data matrix, for example, a position in the $3^{rd}$ row and the $5^{th}$ column of the data matrix. The first group of specified positions in the M rows*N columns positions refer to a group of specified positions in the M rows*N columns data matrix, and may be positions of all or some data elements in the M rows*N columns data matrix. For example, the first group of specified positions may be the $1^{st}$ row of the data matrix, or the $3^{rd}$ column, the $5^{th}$ column, and the $6^{th}$ column of the data matrix, or all odd-numbered rows of the data matrix, or a set of irregular specified positions in the data matrix, or positions of all data elements of the data matrix, or the like. The second group of specified positions is similar to the first group of specified positions, and the second group of specified positions may be the same as or different from the first group of specified positions. The first group of specified positions and the second group of specified positions to be mentioned in the following are the same as those described in this embodiment of the present invention, and will not be described repeatedly any further.

It should be understood that in this embodiment of the present invention, when the first data matrix is equal to the data matrix obtained by multiplying the data in the first group of specified positions in the M rows*N columns positions of the M rows*N columns data matrix generated from the M*N pieces of data by −1, the first group of specified positions may be stipulated in a protocol or decided by the transmit end and the receive end by means of negotiation. For example, the first data matrix is equal to a data matrix obtained by multiplying data in odd-numbered columns of the M rows*N columns data matrix generated from the M*N pieces of data. Similarly, when the third data matrix is equal to the data matrix obtained by multiplying the data in the second group of specified positions in the M rows*N columns positions of the data matrix generated from the other M*N pieces of data by −1, the second group of specified positions may be stipulated in a protocol or decided by the transmit end and the receive end by means of negotiation.

103. Map the first data matrix onto N consecutive symbols*M consecutive subcarriers on a first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on a second antenna, and map the fourth data matrix onto a same time-frequency position as the second data matrix on the second antenna.

104. Separately generate FBMC signals of the first antenna and the second antenna according to the mapped data matrices.

105. Transmit the FBMC signals of the first antenna and the second antenna.

In this embodiment of the present invention, the FBMC technology is combined with Alamouti encoding according to a specific data encoding manner, to-be-transmitted data is encoded and then transmitted, which almost completely eliminates impact of imaginary part interference without using a guard interval, and improves system performance.

Certainly, it should be understood that in practical application, the action of determining the first data matrix, the second data matrix, the third data matrix, and the fourth data matrix may not exist. In this case, step 102 and step 103 may be combined into the following step:

map a first data matrix onto N consecutive symbols*M consecutive subcarriers on a first antenna, map a second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map a third data matrix onto a same time-frequency position as the first data matrix on a second antenna, and map a fourth data matrix onto a same time-frequency position as the second data matrix on the second antenna, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

Alternatively, steps 102, 103, and 104 may be replaced with the following step: perform transmit diversity processing on the to-be-transmitted data sequence to obtain FBMC signals of a first antenna and a second antenna, where data denoted by FBMC signals on the $0^{th}$ to the $(M-1)^{th}$ subcarriers and the $0^{th}$ to the $(N-1)^{th}$ symbols of the first antenna is that includes M*N pieces of data in the to-be-transmitted data sequence; data denoted by FBMC signals on the $0^{th}$ to the $(M-1)^{th}$ subcarriers and the $0^{th}$ to the $(N-1)^{th}$ symbols of the second antenna is that includes other M*N pieces of data in the to-be-transmitted data sequence; data denoted by an FBMC signal on the $(i+M)^{th}$ subcarrier and the $j^{th}$ symbol of the first antenna is equal to data obtained by multiplying data denoted by an FBMC signal on the $(M-i-1)^{th}$ subcarrier and the $j^{th}$ symbol of the second antenna by −1, where 0≤i<M, 0≤j<N, and j is an even number; data denoted by an FBMC signal on the $(i+M)^{th}$ subcarrier and the $j^{th}$ symbol of the first antenna is equal to data denoted by an FBMC signal on the $(M-i-1)^{th}$ subcarrier and the $j^{th}$ symbol of the second antenna, where 0≤i<M, 0≤j<N, and j is an odd number; data denoted by an FBMC signal on the $(i+M)^{th}$ subcarrier and the $j^{th}$ symbol of the second antenna is equal to data denoted by an FBMC signal on the $(M-i-1)^{th}$ subcarrier and the $j^{th}$ symbol of the first antenna, where 0≤i<M, 0≤j<N, and j is an even number; data denoted by an FBMC signal on the $(i+M)^{th}$ subcarrier and the $j^{th}$ symbol of the second antenna is equal to data obtained by multiplying data denoted by an FBMC signal on the $(M-i-1)^{th}$ subcarrier and the $j^{th}$ symbol of the first antenna, where 0≤i<M, 0≤j<N, and j is an odd number.

Certainly, it should be understood that the methods for obtaining the FBMC signals of the first antenna and the second antenna by means of transmit diversity processing in this embodiment of the present invention are essentially equivalent.

Optionally, in an embodiment, the 2*M*N pieces of data include $a_{i,j}$, 1≤i≤M, 1≤j≤N and $b_{k,l}$, 1≤k≤M, 1≤l≤N;

the first data matrix is $$\begin{bmatrix} a_{1,1} & a_{1,2} & a_{1,3} & \cdots & a_{1,N} \\ a_{2,1} & a_{2,2} & a_{2,3} & \cdots & a_{2,N} \\ \cdots & \cdots & \cdots & \cdots & \cdots \\ a_{M,1} & a_{M,2} & a_{M,3} & \cdots & a_{M,N} \end{bmatrix};$$

the second data matrix is $$\begin{bmatrix} -b_{M,1} & b_{M,2} & -b_{M,3} & \cdots & (-1)^N b_{M,N} \\ \cdots & \cdots & \cdots & \cdots & \cdots \\ -b_{2,1} & b_{2,2} & -b_{2,3} & \cdots & (-1)^N b_{2,N} \\ -b_{1,1} & b_{1,2} & -b_{1,3} & \cdots & (-1)^N b_{1,N} \end{bmatrix};$$

the third data matrix is $$\begin{bmatrix} b_{1,1} & b_{1,2} & b_{1,3} & \cdots & b_{1,N} \\ b_{2,1} & b_{2,2} & b_{2,3} & \cdots & b_{2,N} \\ \cdots & \cdots & \cdots & \cdots & \cdots \\ b_{M,1} & b_{M,2} & b_{M,3} & \cdots & b_{M,N} \end{bmatrix};$$

and the fourth data matrix is $$\begin{bmatrix} a_{M,1} & -a_{M,2} & a_{M,3} & \cdots & (-1)^{N+1} a_{M,N} \\ \cdots & \cdots & \cdots & \cdots & \cdots \\ a_{2,1} & -a_{2,2} & a_{2,3} & \cdots & (-1)^{N+1} a_{2,N} \\ a_{1,1} & -a_{1,2} & a_{1,3} & \cdots & (-1)^{N+1} a_{1,N} \end{bmatrix}.$$

Optionally, in another embodiment, the 2*M*N pieces of data include $a_{i,j}$, 1≤i≤M, 1≤j≤N and $b_{k,l}$, 1≤k≤M, 1≤l≤N; where the first data matrix is $$\begin{bmatrix} a_{1,1} & a_{1,2} & a_{1,3} & \cdots & a_{1,N} \\ a_{2,1} & a_{2,2} & a_{2,3} & \cdots & a_{2,N} \\ \cdots & \cdots & \cdots & \cdots & \cdots \\ a_{M,1} & a_{M,2} & a_{M,3} & \cdots & a_{M,N} \end{bmatrix};$$

the second data matrix is $$\begin{bmatrix} b_{M,1} & b_{M,2} & b_{M,3} & \cdots & b_{M,N} \\ \cdots & \cdots & \cdots & \cdots & \cdots \\ b_{2,1} & b_{2,2} & b_{2,3} & \cdots & b_{2,N} \\ b_{1,1} & b_{1,2} & b_{1,3} & \cdots & b_{1,N} \end{bmatrix};$$

the third data matrix is $$\begin{bmatrix} -b_{1,1} & b_{1,2} & -b_{1,3} & \ldots & (-1)^N b_{1,N} \\ -b_{2,1} & b_{2,2} & -b_{2,3} & \ldots & (-1)^N b_{2,N} \\ \ldots & \ldots & \ldots & \ldots & \ldots \\ -b_{M,1} & b_{M,2} & -b_{M,3} & \ldots & (-1)^N b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

The following further describes the method in this embodiment of the present invention with reference to specific examples. For ease of description, the method executed by the transmit end apparatus is described by using a base station as an example.

Specific Embodiment 1

Before transmitting a signal, a base station needs to perform amplitude modulation on the to-be-transmitted signal to generate several pieces of to-be-transmitted data, where the several pieces of to-be-transmitted data are complex numbers. The base station may select a data sequence of a preset length from the to-be-transmitted data, and transmit data sequences one by one, where the data sequence may include $2*M*N$ pieces of data (M and N are positive integers). When a quantity of to-be-transmitted data of the base station is less than $2*M*N$, 0 may be added to complete the data sequence. It should be understood that in this embodiment of the present invention, a data sequence that includes $2*M*N$ pieces of data may be regarded as a data processing unit, and the base station generates FBMC signals of transmit antennas one by one according to a size of each data sequence. Assuming that the $2*M*N$ pieces of data are divided into a data matrix 1 and a data matrix 2, which include $a_{i,j}$, $1 \leq i \leq M$, $1 \leq j \leq N$ and $b_{k,l}$, $1 \leq k \leq M$, $1 \leq l \leq N$ respectively, the data matrix 1 and the data matrix 2 are specifically as follows:
the data matrix 1 is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

and
the data matrix 2 is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix}.$$

In this case, the base station may transmit data on a first antenna and a second antenna separately by using a total of 2M subcarriers, and transmit N pieces of real-number data in total on N symbols on each subcarrier. That is, one piece of data is transmitted on each symbol on each subcarrier, and two groups of data need to be transmitted on each antenna.

According to the data sequence, that is, according to the data matrix 1 and the data matrix 2, the base station may determine a first data matrix, a second data matrix, a third data matrix, and a fourth data matrix.

The first data matrix is equal to the data matrix 1, the third data matrix is equal to the data matrix 2, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

Specifically,
the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} -b_{M,1} & b_{M,2} & -b_{M,3} & \ldots & (-1)^N b_{M,N} \\ \ldots & \ldots & \ldots & \ldots & \ldots \\ -b_{2,1} & b_{2,2} & -b_{2,3} & \ldots & (-1)^N b_{2,N} \\ -b_{1,1} & b_{1,2} & -b_{1,3} & \ldots & (-1)^N b_{1,N} \end{bmatrix};$$

the third data matrix is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

After determining the first data matrix, the second data matrix, the third data matrix, and the fourth data matrix, the base station may map the first data matrix onto N consecutive symbols*M consecutive subcarriers on the first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on the second antenna, and map the fourth data matrix onto a same time-frequency position as the second data matrix on the second antenna.

In this case, the data to be transmitted by the first antenna and the second antenna is as follows:
the first antenna: and $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \vdots & \vdots & \vdots & & \vdots \\ a_{M,1} & a_{M,2} & a_{M,3} & \ldots & a_{M,N} \\ -b_{M,1} & b_{M,2} & -b_{M,3} & \ldots & (-1)^N b_{M,N} \\ \vdots & \vdots & \vdots & & \vdots \\ -b_{2,1} & b_{2,2} & -b_{2,3} & \ldots & (-1)^N b_{2,N} \\ -b_{1,1} & b_{1,2} & -b_{1,3} & \ldots & (-1)^N b_{1,N} \end{bmatrix};$$

the second antenna:

$$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \vdots & \vdots & \vdots & & \vdots \\ b_{M,1} & b_{M,2} & b_{M,3} & \ldots & b_{M,N} \\ a_{M,1} & -a_{M,2} & a_{M,3} & \ldots & (-1)^{N+1} a_{M,N} \\ \vdots & \vdots & \vdots & & \vdots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

Data in a same row in a transmit matrix of a same antenna is transmitted by using a same subcarrier; and data in a same column is transmitted on a same symbol.

Finally, the base station may separately generate FBMC signals of the first antenna and the second antenna according to the mapped data matrices, and transmit the FBMC signals of the first antenna and the second antenna.

Optionally, in this embodiment of the present invention, all data in the data sequence may be pure real numbers, or all is pure imaginary numbers. By transmitting a signal that is all pure real numbers or a signal that is all pure imaginary numbers, interference caused between a real part and an imaginary part in a transmitted complex signal can be avoided.

In addition, it should be understood that, as mentioned in this embodiment of the present invention, the second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, where a frequency of a frequency domain resource on which the second data matrix is mapped is higher, or a frequency of a frequency domain resource on which the first data matrix is mapped is higher, either of which is allowed.

Specific Embodiment 2

Similar to the specific embodiment 1 of the present invention, the base station may select a data sequence of a preset length from to-be-transmitted data, and transmit data sequences one by one, where the data sequence may include 2*M*N pieces of data (M and N are positive integers). When a quantity of to-be-transmitted data of the base station is less than 2*M*N, 0 may be added to complete the data sequence. Likewise, assuming that the 2*M*N pieces of data are divided into a data matrix 1 and a data matrix 2, which include $a_{i,j}$, $1 \le i \le M$, $1 \le j \le N$ and $b_{k,l}$, $1 \le k \le M$, $1 \le l \le N$; respectively, the data matrix 1 and the data matrix 2 are specifically as follows:
the data matrix 1 is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

and
the data matrix 2 is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix}.$$

In this case, the base station may transmit data on a first antenna and a second antenna separately by using a total of 2M subcarriers, and transmit N pieces of real-number data in total on N symbols on each subcarrier. That is, one piece of data is transmitted on each symbol on each subcarrier, and two groups of data need to be transmitted on each antenna.

According to the data sequence, that is, according to the data matrix 1 and the data matrix 2, the base station may determine a first data matrix, a second data matrix, a third data matrix, and a fourth data matrix.

The first data matrix is equal to the data matrix 1, the third data matrix is equal to a data matrix obtained by multiplying data in odd-numbered columns of the data matrix 2 by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1. It should be understood that in practical application, the second data matrix may be obtained in multiple variation manners. For example, the second data matrix may also be obtained by arranging the data matrix 2 in reversed order of rows.

Specifically,
the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} b_{M,1} & b_{M,2} & b_{M,3} & \ldots & b_{M,N} \\ \ldots & \ldots & \ldots & \ldots & \ldots \\ b_{2,1} & b_{2,2} & b_{2,3} & \ldots & b_{2,N} \\ b_{1,1} & b_{1,2} & b_{1,3} & \ldots & b_{1,N} \end{bmatrix};$$

the third data matrix is $$\begin{bmatrix} -b_{1,1} & b_{1,2} & -b_{1,3} & \ldots & (-1)^N b_{1,N} \\ -b_{2,1} & b_{2,2} & -b_{2,3} & \ldots & (-1)^N b_{2,N} \\ \ldots & \ldots & \ldots & \ldots & \ldots \\ -b_{M,1} & b_{M,2} & -b_{M,3} & \ldots & (-1)^N b_{M,N} \end{bmatrix};$$

and
the fourth data matrix is $$\begin{bmatrix} a_{M,1} & -a_{M,2} & a_{M,3} & \ldots & (-1)^{N+1} a_{M,N} \\ \ldots & \ldots & \ldots & \ldots & \ldots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

After determining the first data matrix, the second data matrix, the third data matrix, and the fourth data matrix, the base station may map the first data matrix onto N consecutive symbols*M consecutive subcarriers on the first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on the second antenna, and map the fourth data matrix onto a same time-frequency position as the second data matrix on the second antenna.

In this case, the data to be transmitted by the first antenna and the second antenna is as follows:
the first antenna: and $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \vdots & \vdots & \vdots & & \vdots \\ a_{M,1} & a_{M,2} & a_{M,3} & \ldots & a_{M,N} \\ b_{M,1} & b_{M,2} & b_{M,3} & \ldots & b_{M,N} \\ \vdots & \vdots & \vdots & & \vdots \\ b_{2,1} & b_{2,2} & b_{2,3} & \ldots & b_{2,N} \\ b_{1,1} & b_{1,2} & b_{1,3} & \ldots & b_{1,N} \end{bmatrix};$$

the second antenna:

$$\begin{bmatrix} -b_{1,1} & b_{1,2} & -b_{1,3} & \ldots & (-1)^N b_{1,N} \\ -b_{2,1} & b_{2,2} & -b_{2,3} & \ldots & (-1)^N b_{2,N} \\ \vdots & \vdots & \vdots & & \vdots \\ -b_{M,1} & b_{M,2} & -b_{M,3} & \ldots & (-1)^N b_{M,N} \\ a_{M,1} & -a_{M,2} & a_{M,3} & \ldots & (-1)^{N+1} a_{M,N} \\ \vdots & \vdots & \vdots & & \vdots \\ a_{2,1} & -a_{2,2} & a_{2,3} & \ldots & (-1)^{N+1} a_{2,N} \\ a_{1,1} & -a_{1,2} & a_{1,3} & \ldots & (-1)^{N+1} a_{1,N} \end{bmatrix}.$$

Data in a same row in a transmit matrix of a same antenna is transmitted by using a same subcarrier; and data in a same column is transmitted on a same symbol.

Finally, the base station may separately generate FBMC signals of the first antenna and the second antenna according to the mapped data matrices, and transmit the FBMC signals of the first antenna and the second antenna.

Optionally, in this embodiment of the present invention, all data in the data sequence may be pure real numbers, or all is pure imaginary numbers. By transmitting a signal that is all pure real numbers or a signal that is all pure imaginary numbers, interference caused between a real part and an imaginary part in a transmitted complex signal can be avoided.

Similarly, in this embodiment of the present invention, a frequency of a frequency domain resource on which the second data matrix is mapped is higher, or a frequency of a frequency domain resource on which the first data matrix is mapped is higher, either of which is allowed.

It should be understood that in this embodiment of the present invention, the first data matrix, the second data matrix, the third data matrix, and the fourth data matrix are not limited to the matrices mentioned in the specific embodiment 1 and the specific embodiment 2, and may have other variations, which are not exemplified in this embodiment of the present invention exhaustively.

Figure 2:
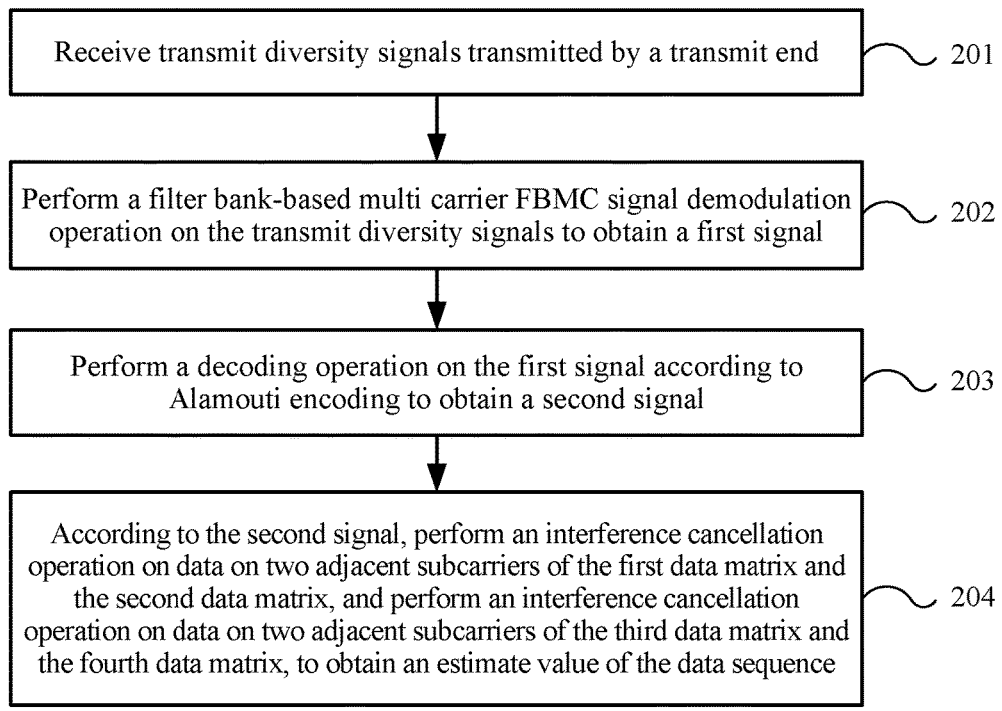
FIG. 2 is a flowchart of an FBMC transmit diversity receiving method according to an embodiment of the present invention.

FIG. 2 is a flowchart of an FBMC transmit diversity receiving method according to an embodiment of the present invention. The method in FIG. 2 is executed by an FBMC transmit diversity receive end apparatus. In specific application, the receive end apparatus may be a radio access device such as a base station; or may be user equipment of a terminal such as a mobile phone.

201. Receive transmit diversity signals transmitted by a transmit end.

The transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

202. Perform a filter bank-based multi carrier FBMC signal demodulation operation on the transmit diversity signals to obtain a first signal.

203. Perform a decoding operation on the first signal according to Alamouti encoding to obtain a second signal.

204. According to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

In this embodiment of the present invention, received data is decoded in an Alamouti manner according to a specific data encoding manner, and an interference cancellation operation is performed on signals received on two adjacent subcarriers of data matrices on a receive antenna, which almost completely eliminates impact of imaginary part interference without using a guard interval, and improves system performance.

Optionally, all the 2*M*N pieces of data are pure-real-number data, or all are pure-imaginary-number data.

Specifically, data on the $M^{th}$ subcarrier is $A=[a_{M,1}, a_{M,2}, \ldots, a_{M,N}]^T$, which meets the following formula:
$$A=(C^HC)^{-1}C_HR, \text{ where}$$

$R=[\text{Re}(R_{M,1}^{eq}), \text{Re}(R_{M,2}^{eq}), \ldots, \text{Re}(R_{M,N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,N}^{eq})]^T$ when the data sequence includes no pure real number, and $$C = \begin{bmatrix} \Lambda & d_1 & \cdots & d_k & & & & \\ & \ddots & & & & & & \\ d_{-k} & \cdots & d_{-1} & \Lambda & d_1 & \cdots & d_k & \\ & d_{-k} & \cdots & d_{-1} & \Lambda & d_1 & \cdots & d_k \\ & & d_{-k} & \cdots & d_{-1} & \Lambda & d_1 & \cdots & d_k \\ & & & & & & \ddots & \\ & & & & d_{-k} & \cdots & d_{-1} & \Lambda \end{bmatrix}_{N \times N},$$

where $\Lambda=|H_M^1|^2+|H_M^2|^2+d_0$, $H_M^1$ denotes a channel frequency domain response obtained when a channel transmitted by the first antenna at the transmit end reaches a receive end, $H_M^2$ denotes a channel frequency domain response obtained when a channel transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$R_{M,n}^{eq}=(H_M^1)^*R_{M,n}+H_M^2R_{M+1,n}^*=(|H_M^1|^2+|H_M^2|^2)$
$a_{M,n}+(|H_M^1|^2+|H_M^2|^2)(ja_{M,n}^1)+(|H_M^1|^2-|H_M^2|^2)$
$(ja_{M,n}^2)+2(H_M^1)^*H_M^2(jb_{M,n}^2),$ where $R_{M,n}$ denotes the data received on the $M^{th}$ subcarrier and the $n^{th}$ symbol, $n=1, 2 \ldots, N$, and the $M^{th}$ subcarrier is one of adjacent subcarriers in the first data matrix and the second data matrix.

The following further describes the method in this embodiment of the present invention with reference to a specific embodiment.

Specific Embodiment 3

When the transmit end transmits a signal according to the method in FIG. 1, four elements in each group of space frequency codes at the receive end come from four different data matrices. Distinguished according to formation, two types of space frequency codes exist in total. It is assumed that a base station transmits a signal in an encoding manner in the specific embodiment 1 of the present invention. In this case, $$\begin{bmatrix} a_{M,2} & b_{M,2} \\ b_{M,2} & -a_{M,2} \end{bmatrix}$$

is a group of space frequency codes, and $$\begin{bmatrix} a_{2,3} & b_{2,3} \\ -b_{2,3} & a_{2,3} \end{bmatrix}$$

is also a group of space frequency codes. If no interference exists between data of different data matrices, each group of space frequency codes can be transformed into orthogonal space frequency codes like $$\begin{bmatrix} S_1 & S_2 \\ S_2^* & -S_1^* \end{bmatrix}$$

or $$\begin{bmatrix} S_1 & S_2 \\ -S_2^* & S_1^* \end{bmatrix}$$

according to a data layout in the specific embodiment 1 of the present invention after imaginary part interference of other space frequency codes is applied. The receive antenna receives data transmitted from the first antenna and the second antenna, and an originally transmitted data sequence can be restored at the receive end by using orthogonality of Alamouti encoding. It is assumed that a data sequence at the transmit end is all real number data.

However, data on the $M^{th}$ subcarrier and data on the $(M+1)^{th}$ subcarrier interfere with each other. That is, data on the two subcarriers of the first data matrix and the second data matrix interfere with each other, and data on the two subcarriers of the third data matrix and the fourth data matrix also interfere with each other. Therefore, in this solution, an additional equalization approach is used when the data on the two subcarriers are being restored. The following gives description by using the first antenna as an example.

When n is an odd number, a form of space frequency codes on the two subcarriers is $$\begin{bmatrix} a_{M,n} & b_{M,n} \\ -b_{M,n} & -a_{M,n} \end{bmatrix}.$$

Interference received by $d_{m,n}$ from neighborhood $\Omega_{\Delta m,\Delta n}$ data is $$jd_{m,n}^{(i)} \approx \sum_{\substack{(p,q)\in\Omega_{\Delta m,\Delta n} \\ p\neq 0, q\neq 0}} d_{m+p,n+q}C_{p,q},$$

where $c_{p,q}$ comes from Table 1. $d_{m,n}$ denotes data in the $m^{th}$ row and the $n^{th}$ column of the first antenna. In the specific embodiment 1 of the present invention, $d_{M+1,n}$ represents $-b_{M,n}$. To distinguish interference between different data matrices, $jd_{m,n}^{(i)} = jd_{m,n}^{1} + jd_{m,n}^{2}$ is defined, where $jd_{m,n}^{1}$ denotes interference from the same data matrix as $d_{m,n}$, and $jd_{m,n}^{2}$ denotes interference from a data matrix different from a data matrix to which $d_{m,n}$ belongs.

It is assumed that a neighborhood range is $(\Delta m, \Delta n) = (1, k)$, where k is a positive integer, which may be set according to an actual requirement. According to the foregoing definition, interference received by $a_{M,n}$ on the first antenna from a same data matrix (that is, the first data matrix) is:

$$ja_{M,n}^{1} = \sum_{\substack{p \in [-1,0], q \in [-k,k] \\ (p,q) \neq (0,0)}} d_{M+p,n+q} c_{p,q}.$$

Interference received by $-b_{M,n}$ on the first antenna from a same data matrix (that is, the second data matrix) is:

$$jb_{M,n}^{1} = \sum_{\substack{p \in [-1,0], q \in [-k,k] \\ (p,q) \neq (0,0)}} d_{M+1+p,n+q} c_{p,q}.$$

Interference received by $a_{M,n}$ on the first antenna from the second data matrix is:

$$ja_{M,n}^{2} = \sum_{\substack{p=1 \\ q \in [-k,k]}} d_{M+p,n+q} c_{p,q}.$$

Interference received by $-b_{M,n}$ on the first antenna from the first data matrix is:

$$-jb_{M,n}^{2} = \sum_{\substack{p=-1 \\ q \in [-k,k]}} d_{M+1+p,n+q} c_{p,q}.$$

To facilitate analysis, it is assumed that if a channel on an antenna changes slowly, the channel may be regarded as approximately unchanged, and channel frequency responses of two antennas are denoted by $H_M^1$ and $H_M^2$ respectively.

After data passes through the channel, the receive end receives the data transmitted from the two transmit antennas. After passing through the filter, according to a relationship between imaginary part interference coefficients, data $R_{M,n}$ on the $M^{th}$ subcarrier and the $n^{th}$ symbol is:

$$R_{M,n} = H_M^1(a_{M,n} + ja_{M,n}^1 + ja_{M,n}^2) + H_M^2(b_{M,n} + jb_{M,n}^1 + jb_{M,n}^2).$$

Data $R_{M+1,n}$ received on the $(M+1)^{th}$ subcarrier and the $n^{th}$ symbol is:

$$R_{M+1,n} = H_M^1(-b_{M,n} - jb_{M,n}^1 - jb_{M,n}^2) + H_M^2(a_{M,n} - ja_{M,n}^1 + ja_{M,n}^2)$$

Traditional Alamouti equalization is performed on data $R_{M,n}$ on the $M^{th}$ subcarrier and the $n^{th}$ R symbol and the data $R_{M+1,n}$ received on the $(M+1)^{th}$ subcarrier and the $n^{th}$ symbol to obtain:

$$R_{M,n}^{eq} = (H_M^1)^* R_{M,n} + H_M^2 R_{M+1,n}^* = (|H_M^1|^2 + |H_M^2|^2) a_{M,n} + (|H_M^1|^2 + |H_M^2|^2)(ja_{M,n}^1) + (|H_M^1|^2 - |H_M^2|^2)(ja_{M,n}^2) + 2(H_M^1)^* H_M^2 (jb_{M,n}^2), \text{ and}$$

$$R_{M+1,n}^{eq} = (H_M^2)^* R_{M,n} - H_M^1 R_{M+1,n}^* = (|H_M^1|^2 + |H_M^2|^2) b_{M,n} - (|H_M^1|^2 + |H_M^2|^2)(jb_{M,n}^1) - (|H_M^1|^2 + |H_M^2|^2)(jb_{M,n}^2) + 2H_M^1(H_M^2)^*(ja_{M,n}^2).$$

Then an operation for acquiring a real part from a complex number is performed to obtain:

$$Re(R_{M,n}^{eq}) = (|H_M^1|^2 + |H_M^2|^2) a_{M,n} + Re\{2(H_M^1)^* H_M^2 (jb_{M,n}^2)\},$$

$$Re(R_{M+1,n}^{eq}) = (|H_M^1|^2 + |H_M^2|^2) b_{M,n} + Re\{2H_M^1(H_M^2)^*(ja_{M,n}^2)\} \quad (2)$$

Similarly, when n is an even number, a form of the space frequency codes on the two subcarriers is $$\begin{bmatrix} a_{M,n} & b_{M,n} \\ b_{M,n} & -a_{M,n} \end{bmatrix}.$$

According to the foregoing analysis manner, the following may be obtained:

$$Re(R_{M,n}^{eq}) = (|H_M^1|^2 + |H_M^2|^2) a_{M,n} + Re\{2(H_M^1)^* H_M^2 (jb_{M,n}^{2'})\},$$

$$Re(R_{M+1,n}^{eq}) = (|H_M^1|^2 + |H_M^2|^2) b_{M,n} + Re\{2H_M^1(H_M^2)^*(ja_{M,n}^{2'})\} \quad (3)$$

$ja_{M,n}^{2'}$ is interference received by $a_{M,n}$ on the first antenna from the second data matrix, and $jb_{M,n}^{2'}$ is interference received by $b_{M,n}$ on the first antenna from the first data matrix.

The following describes an equalization conception by using $a_{M,n}$ restoration as an example. In a case in which an imaginary part interference coefficient given in Table 1 is uniformly used (it can be seen from Table 1 and Table 2 that when P=−1, the imaginary part interference coefficients in Table 2 are opposite to the imaginary part interference coefficients in Table 1), according to the definition, it can be learned that:

$$jb_{M,n}^{2'} = \sum_{\substack{p=-1 \\ q \in (-k,k)}} d_{M+1+p,n+q} * (-c_{p,q})$$

$$= jb_{M,n}^{2}.$$

Therefore, the formula (2) and the formula (3) may be unified into:

$$Re(R_{M,n}^{eq}) = (|H_M^1|^2 + |H_M^2|^2) a_{M,n} + Re\{2(H_M^1)^* H_M^2 (jb_{M,n}^2)\}, n=1,2,\ldots,N \quad (4)$$

In addition:

$$jb_{M,n}^{2} = \sum_{\substack{p=-1 \\ q \in (-k,k)}} d_{M+1+p,n+q} c_{p,q} \quad (5)$$

$$= (-1) * (c_{-1,-k} a_{M,n-k} + c_{-1,-k+1} a_{M,n-k+1} + \ldots + c_{-1,k} a_{M,n+k})$$

It can be seen from the formula (4) and the formula (5) that for $a_{M,n}$, interference depends on only data on a subcarrier of $a_{M,n}$. Therefore, $a_{M,n}$ may be restored with reference to the data on the subcarrier.

The data on the subcarrier on which $a_{M,n}$ is located is denoted by $A = [a_{M,1}, a_{M,2}, \ldots, a_{M,N}]^T$, and $d_l = -Re\{2(H_M^1)^* H_M^2 c_{-1,l}\}$, and where $l = -k, -k+1, \ldots, k$.

According to the formula (2) and the formula (4), R=C*A, where $$R=[Re(R_{M,1}^{eq}), Re(R_{M,2}^{eq}), \ldots, Re(R_{M,N}^{eq})]^T, \text{ and}$$

$$C = \begin{bmatrix} \Lambda & d_1 & \ldots & d_k & & & & \\ & \ddots & & & & & & \\ d_{-k} & \ldots & d_{-1} & \Lambda & d_1 & \ldots & d_k & \\ & d_{-k} & \ldots & d_{-1} & \Lambda & d_1 & \ldots & d_k \\ & & d_{-k} & \ldots & d_{-1} & \Lambda & d_1 & \ldots & d_k \\ & & & & & & \ddots & \\ & & & & d_{-k} & \ldots & d_{-1} & \Lambda \end{bmatrix}_{N \times N},$$

where $$\Lambda = |H_M^1|^2 + |H_{M'}^2|^2 + d_0.$$

Therefore, by using ZF equalization, the following may be obtained:

$$A = (C^H C)^{-1} C^H R.$$

Alternatively, A may be restored by using equalization approaches such as MMSE.

According to the method in this embodiment of the present invention, received data is decoded in an Alamouti manner according to a specific data encoding manner, and an interference cancellation operation is performed on signals received on two adjacent subcarriers of data matrices on a receive antenna, which can almost completely eliminate impact of imaginary part interference without using a guard interval, and improve system performance.

It should be understood that when the data sequence transmitted by the transmit end includes no pure imaginary number, the matrix R is obtained by using a function for acquiring a real part from a complex number, and then the data A on the subcarrier on which $a_{M,n}$ is located is restored. Optionally, the data sequence transmitted by transmit end is all pure real numbers.

In addition, if the data sequence transmitted by the transmit end includes no pure real number, the function for acquiring a real part from a complex number may be changed to a function for acquiring an imaginary part from a complex number, so that a good data restoration effect can be achieved. Optionally, the data sequence transmitted by transmit end is all pure imaginary numbers. R may be represented by the following formula:

$$R = [Im(R_{M,1}^{eq}), Im(R_{M,2}^{eq}), \ldots, Im(R_{M,N}^{eq})]^T.$$

Figure 3:
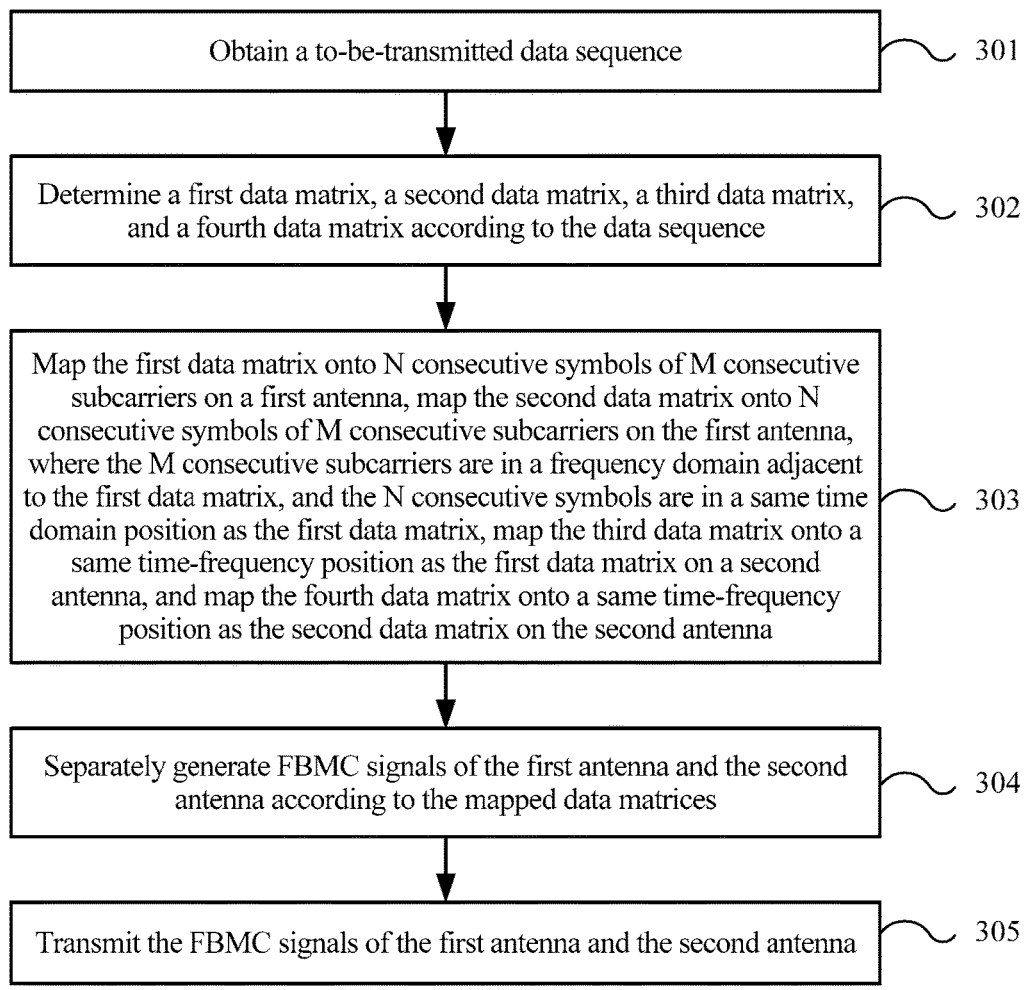
FIG. 3 is another flowchart of an FBMC transmit diversity transmission method according to an embodiment of the present invention.

FIG. 3 is a flowchart of an FBMC transmit diversity transmission method according to an embodiment of the present invention. The method in FIG. 3 is executed by an FBMC transmit diversity transmit end apparatus. In specific application, the transmit end apparatus may be a radio access device such as a base station; or may be user equipment of a terminal such as a mobile phone. The method includes the following steps.

301. Obtain a to-be-transmitted data sequence.

The data sequence includes 2*M*N pieces of data.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

302. Determine a first data matrix, a second data matrix, a third data matrix, and a fourth data matrix according to the data sequence.

The first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns.

It should be understood that in this embodiment of the present invention, when the first data matrix is equal to the data matrix obtained by multiplying the data in the first group of specified positions in the M rows*N columns positions of the M rows*N columns data matrix generated from the M*N pieces of data by −1, the first group of specified positions may be stipulated in a protocol or decided by the transmit end and the receive end by means of negotiation. For example, the first data matrix is equal to a data matrix obtained by multiplying data in odd-numbered columns of the M rows*N columns data matrix generated from the M*N pieces of data. Similarly, when the third data matrix is equal to the data matrix obtained by multiplying the data in the second group of specified positions in the M rows*N columns positions of the data matrix generated from the other M*N pieces of data by −1, the second group of specified positions may be stipulated in a protocol or decided by the transmit end and the receive end by means of negotiation.

303. Map the first data matrix onto N consecutive symbols*M consecutive subcarriers on a first antenna, map the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map the third data matrix onto a same time-frequency position as the first data matrix on a second antenna, and map the fourth data matrix onto a same time-frequency position as the second data matrix on the second antenna.

304. Separately generate FBMC signals of the first antenna and the second antenna according to the mapped data matrices.

305. Transmit the FBMC signals of the first antenna and the second antenna.

In this embodiment of the present invention, the FBMC technology is combined with Alamouti encoding according to a specific data encoding manner, to-be-transmitted data is encoded and then transmitted, which almost completely eliminates impact of imaginary part interference without using a guard interval, and improves system performance.

It should be understood that in practical application, similar to the embodiment shown in FIG. 1, the action of determining the first data matrix, the second data matrix, the third data matrix, and the fourth data matrix may be not exist. In this case, step 302 and step 303 may be combined into the following step:

map a first data matrix onto N consecutive symbols*M consecutive subcarriers on a first antenna, map a second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map a third data matrix onto a same time-frequency position as the first data matrix on a second antenna, and map a fourth data matrix onto a same time-frequency position as the second data matrix on the second antenna, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns.

Alternatively, steps 302, 303, and 304 may be replaced with the following step: perform transmit diversity processing on the to-be-transmitted data sequence to obtain FBMC signals of a first antenna and a second antenna, where data denoted by FBMC signals on the $0^{th}$ to the $(M-1)^{th}$ subcarriers and the $0^{th}$ to the $(N-1)^{th}$ symbols of the first antenna is that includes M*N pieces of data in the to-be-transmitted data sequence; data denoted by FBMC signals on the $0^{th}$ to the $(M-1)^{th}$ subcarriers and the $0^{th}$ to the $(N-1)^{th}$ symbols of the second antenna is that includes other M*N pieces of data in the to-be-transmitted data sequence; data denoted by an FBMC signal on the $i^{th}$ subcarrier and the $(j+N)^{th}$ symbol of the first antenna is equal to data obtained by multiplying data denoted by an FBMC signal on the $(M-i-1)^{th}$ subcarrier and the $j^{th}$ symbol of the second antenna by −1, where $0 \leq i < M$, and $0 \leq j < N$; data denoted by an FBMC signal on the $i^{th}$ subcarrier and the $(j+N)^{th}$ symbol of the second antenna is equal to data denoted by an FBMC signal on the $(M-i-1)^{th}$ subcarrier and the $j^{th}$ symbol of the first antenna, where $0 \leq i < M$, and $0 \leq j < N$.

Certainly, it should be understood that the methods for obtaining the FBMC signals of the first antenna and the second antenna by means of transmit diversity processing in this embodiment of the present invention are essentially equivalent.

Optionally, in an embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;
the first data matrix is $$\begin{bmatrix} a_{1,1} & a_{1,2} & \ldots & a_{1,N} \\ a_{2,1} & a_{2,2} & \ldots & a_{2,N} \\ \ldots & \ldots & \ldots & \ldots \\ a_{M,1} & a_{M,2} & \ldots & a_{M,N} \end{bmatrix};$$

the second data matrix is $$\begin{bmatrix} -b_{1,N} & \ldots & -b_{1,2} & -b_{1,1} \\ -b_{2,N} & \ldots & -b_{2,2} & -b_{2,1} \\ \ldots & \ldots & \ldots & \ldots \\ -b_{M,N} & \ldots & -b_{M,2} & -b_{M,1} \end{bmatrix};$$

the third data matrix is $$\begin{bmatrix} b_{1,1} & b_{1,2} & \ldots & b_{1,N} \\ b_{2,1} & b_{2,2} & \ldots & b_{2,N} \\ \ldots & \ldots & \ldots & \ldots \\ b_{M,1} & b_{M,2} & \ldots & b_{M,N} \end{bmatrix};$$

and
the fourth data matrix is $$\begin{bmatrix} a_{1,N} & \ldots & a_{1,2} & a_{1,1} \\ a_{2,1} & \ldots & a_{2,2} & a_{2,N} \\ \ldots & \ldots & \ldots & \ldots \\ a_{M,N} & \ldots & a_{M,2} & a_{M,1} \end{bmatrix}.$$

The following further describes the method in this embodiment of the present invention with reference to a specific example. For ease of description, the method executed by the transmit end apparatus is described by using a base station as an example.

Specific Embodiment 4

Similar to the specific embodiment 1 of the present invention, the base station may select a data sequence of a preset length from to-be-transmitted data, and transmit data sequences one by one, where the data sequence may include 2*M*N pieces of data (M and N are positive integers). When a quantity of to-be-transmitted data of the base station is less than 2*M*N, 0 may be added to complete the data sequence. Likewise, assuming that the 2*M*N pieces of data are divided into a data matrix 1 and a data matrix 2, which include $a_{i,j}$, $1 \leq i \leq M$, $1 \leq j \leq N$ and $b_{k,l}$, $1 \leq k \leq M$, $1 \leq l \leq N$ respectively, the data matrix 1 and the data matrix 2 are specifically as follows:
the data matrix 1 is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

and
the data matrix 2 is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix}.$$

In this case, the base station may transmit data on a first antenna and a second antenna separately by using a total of M subcarriers, and transmit 2N pieces of real-number data in total on 2N symbols on each subcarrier. That is, one piece of data is transmitted on each symbol on each subcarrier, and two groups of data need to be transmitted on each antenna.

According to the data sequence, that is, according to the data matrix 1 and the data matrix 2, the base station may determine a first data matrix, a second data matrix, a third data matrix, and a fourth data matrix.

The first data matrix is equal to the data matrix 1, the third data matrix is equal to the data matrix 2, the second data matrix is equal to a data matrix obtained by arranging the third data matrix in reversed order of columns and multiplying data in each column by −1, and the fourth data matrix is equal to a data matrix obtained by arranging the first data matrix in reversed order of columns.

Specifically,
the first data matrix is $$\begin{bmatrix} a_{1,1} & a_{1,2} & \ldots & a_{1,N} \\ a_{2,1} & a_{2,2} & \ldots & a_{2,N} \\ \ldots & \ldots & \ldots & \ldots \\ a_{M,1} & a_{M,2} & \ldots & a_{M,N} \end{bmatrix};$$

the second data matrix is $$\begin{bmatrix} -b_{1,N} & \ldots & -b_{1,2} & -b_{1,1} \\ -b_{2,N} & \ldots & -b_{2,2} & -b_{2,1} \\ \ldots & \ldots & \ldots & \ldots \\ -b_{M,N} & \ldots & -b_{M,2} & -b_{M,1} \end{bmatrix};$$

the third data matrix is $$\begin{bmatrix} b_{1,1} & b_{1,2} & \ldots & b_{1,N} \\ b_{2,1} & b_{2,2} & \ldots & b_{2,N} \\ \ldots & \ldots & \ldots & \ldots \\ b_{M,1} & b_{M,2} & \ldots & b_{M,N} \end{bmatrix};$$

and
the fourth data matrix is $$\begin{bmatrix} a_{1,N} & \ldots & a_{1,2} & a_{1,1} \\ a_{2,1} & \ldots & a_{2,2} & a_{2,N} \\ \ldots & \ldots & \ldots & \ldots \\ a_{M,N} & \ldots & a_{M,2} & a_{M,1} \end{bmatrix}.$$

After determining the first data matrix, the second data matrix, the third data matrix, and the fourth data matrix, the base station may map the first data matrix onto N consecutive symbols*M consecutive subcarriers on the first antenna, map the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map the third data matrix onto a same time-frequency position as the first data matrix on the second antenna, and map the fourth data matrix onto a same time-frequency position as the second data matrix on the second antenna.

In this case, the data to be transmitted by the first antenna and the second antenna is as follows:
the first antenna:

$$\begin{bmatrix} a_{1,1} & a_{1,2} & \ldots & a_{1,N} & -b_{1,N} & \ldots & -b_{1,2} & -b_{1,1} \\ a_{2,1} & a_{2,2} & \ldots & a_{2,N} & -b_{2,N} & \ldots & -b_{2,2} & -b_{2,1} \\ \vdots & \vdots & & \vdots & \vdots & & \vdots & \vdots \\ a_{M,1} & a_{M,2} & \ldots & a_{M,N} & -b_{M,N} & \ldots & -b_{M,2} & -b_{M,1} \end{bmatrix};$$

and
the second antenna:

$$\begin{bmatrix} b_{1,1} & b_{1,2} & \ldots & b_{1,N} & a_{1,N} & \ldots & a_{1,2} & a_{1,1} \\ b_{2,1} & b_{2,2} & \ldots & b_{2,N} & a_{2,N} & \ldots & a_{2,2} & a_{2,1} \\ \vdots & \vdots & & \vdots & \vdots & & \vdots & \vdots \\ b_{M,1} & b_{M,2} & \ldots & b_{M,N} & a_{M,N} & \ldots & a_{M,2} & a_{M,1} \end{bmatrix}.$$

Data in a same row in a transmit matrix of a same antenna is transmitted by using a same subcarrier; and data in a same column is transmitted on a same symbol.

Finally, the base station may separately generate FBMC signals of the first antenna and the second antenna according to the mapped data matrices, and transmit the FBMC signals of the first antenna and the second antenna.

Optionally, in this embodiment of the present invention, all data in the data sequence may be pure real numbers, or all is pure imaginary numbers. By transmitting a signal that is all pure real numbers or a signal that is all pure imaginary numbers, interference caused between a real part and an imaginary part in a transmitted complex signal can be avoided.

In addition, it should be understood that, as mentioned in this embodiment of the present invention, the second data matrix is mapped onto N consecutive symbols*M consecutive subcarriers on the first antenna, where the N consecutive symbols are in a time domain adjacent to the first data matrix, and the M consecutive subcarriers are in a same frequency domain position as the first data matrix, where the symbols of the second data matrix may be located before the symbols of the first data matrix or after the symbols of the first data matrix.

It should be understood that in this embodiment of the present invention, the first data matrix, the second data matrix, the third data matrix, and the fourth data matrix are not limited to the matrices mentioned in the specific embodiment 4, and may have other variations. For example, the second data matrix is changed to $$\begin{bmatrix} b_{1,N} & \ldots & b_{1,2} & b_{1,1} \\ b_{2,N} & \ldots & b_{2,2} & b_{2,1} \\ \ldots & \ldots & \ldots & \ldots \\ b_{M,N} & \ldots & b_{M,2} & b_{M,1} \end{bmatrix},$$

and the third data matrix is changed to $$\begin{bmatrix} -b_{1,1} & -b_{1,2} & \ldots & -b_{1,N} \\ -b_{2,1} & -b_{2,2} & \ldots & -b_{2,N} \\ \ldots & \ldots & \ldots & \ldots \\ -b_{M,1} & -b_{M,2} & \ldots & -b_{M,N} \end{bmatrix},$$

which are not exemplified exhaustively in this embodiment of the present invention.

Figure 4:
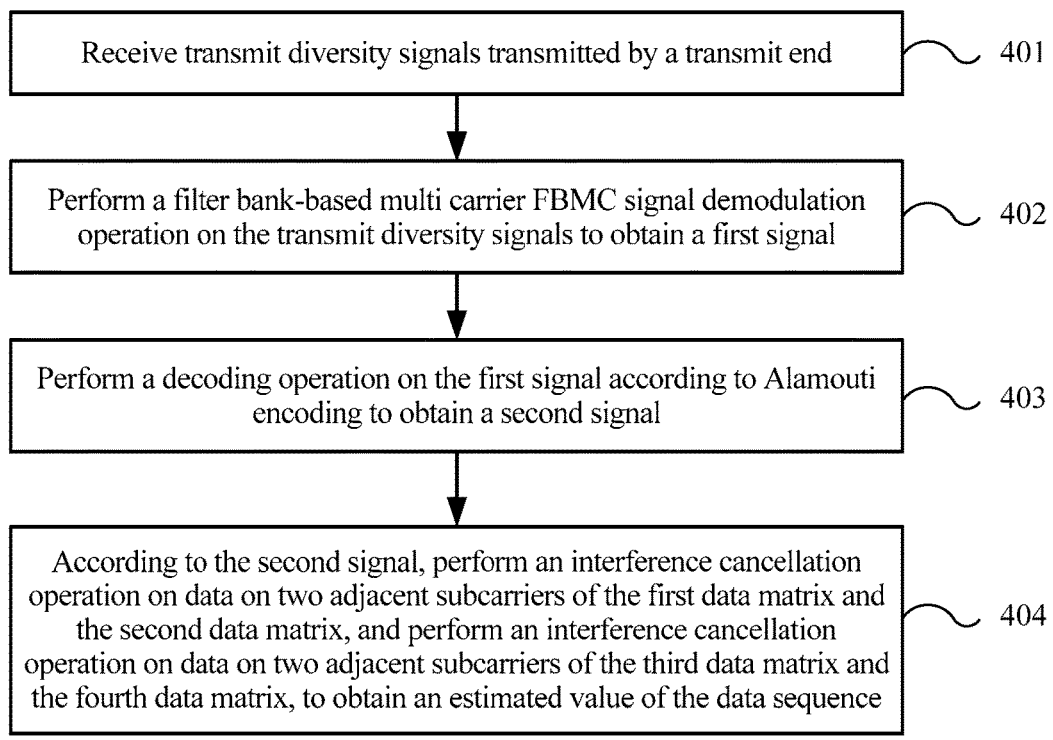
FIG. 4 is another flowchart of an FBMC transmit diversity receiving method according to an embodiment of the present invention.

FIG. 4 is a flowchart of an FBMC transmit diversity receiving method according to an embodiment of the present invention. The method in FIG. 4 is executed by an FBMC transmit diversity receive end apparatus. In specific application, the receive end apparatus may be a radio access device such as a base station; or may be user equipment of a terminal such as a mobile phone.

401. Receive transmit diversity signals transmitted by a transmit end.

The transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of columns and multiplying all data by −1, and the fourth data matrix is equal to a data matrix obtained by arranging the first data matrix in reversed order of columns.

402. Perform a filter bank-based multi carrier FBMC signal demodulation operation on the transmit diversity signals to obtain a first signal.

403. Perform a decoding operation on the first signal according to Alamouti encoding to obtain a second signal.

404. According to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

In this embodiment of the present invention, received data is decoded in an Alamouti manner according to a specific data encoding manner, and an interference cancellation operation is performed on signals received on the $M^{th}$ subcarrier and the $(M+1)^{th}$ subcarrier, which almost completely eliminates impact of imaginary part interference without using a guard interval, and improves system performance.

Optionally, all the 2*M*N pieces of data are pure-real-number data, or all are pure-imaginary-number data.

Specifically, data on the $M^{th}$ subcarrier is $A=[a_{M,1}, a_{M,2}, \ldots, a_{M,2N}]^T$, which meets the following formula:
$$A=(C^HC)^{-1}C^HR,\text{ where}$$

$R=[\text{Re}(R_{M,1}^{eq}), \text{Re}(R_{M,2}^{eq}), \ldots, \text{Re}(R_{M,2N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,2N}^{eq})]^T$ when the data sequence includes no pure real number, and $C=\text{diag}(|H_1|^2+|H_2|^2, |H_1|^2+|H_2|^2, \ldots, |H_1|^2+|H_2|^2)+D_{kM\times kM}$, where an element in the $(km+n-N)^{th}$ row and the $k(m+p)+N+1-n-q)^{th}$ column of $D_{kM\times kM}$ is $2\times(-1)^{p(2N+1-n)+1}c_{p,q}(H_1)^*H_2$, and remaining elements are 0s, where $c_{p,q}$ is a pure imaginary number and denotes an imaginary part interference coefficient caused by data in a time-frequency point $(m+p, n+q)$ position to data in a time-frequency point $(m, n)$ position, $m\in[1,M]$, $n\in[N-k+1,N]$, $p\in[-1,1]$, $q\in[-k,n-N-1]$, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{m,n}^{eq} = (H_1)^* R_{m,n} + H_2 R_{m,2N+1-n}^*$$
$$= (|H_1|^2 + |H_2|^2)a_{m,n} + (|H_1|^2 + |H_2|^2)(ja_{m,n}^1) +$$
$$(|H_1|^2 - |H_2|^2)(ja_{m,n}^2) + 2(H_1)^* H_2 (jb_{m,n}^2),$$

where $R_{M,n}$ denotes the data received on the $M^{th}$ subcarrier and the $n^{th}$ symbol, $n=1, 2 \ldots, 2N$ and the $M^{th}$ subcarrier is one of adjacent subcarriers in the first data matrix and the second data matrix.

The following further describes the method in this embodiment of the present invention with reference to a specific embodiment.

Specific Embodiment 5

When the transmit end transmits a signal according to the method in FIG. 3, four elements in each group of space time codes at the receive end come from four different data matrices. It is assumed that a base station transmits a signal in an encoding manner in the specific embodiment 3 of the present invention. In this case, $$\begin{bmatrix} a_{M,2} & -b_{M,2} \\ b_{M,2} & a_{M,2} \end{bmatrix}$$

is a group of space time codes. If no interference exists between data of different data matrices, each group of space time codes can be transformed into orthogonal space time codes like $$\begin{bmatrix} S_1 & -S_2 \\ S_2^* & S_1^* \end{bmatrix}$$

according to a data layout in the specific embodiment 3 of the present invention after imaginary part interference of other space time codes is applied. The receive antenna receives data transmitted from the first antenna and the second antenna, and originally transmitted real-number data can be restored at the receive end by using orthogonality of Alamouti encoding.

Assuming that interference exists between the data of the first data matrix and the data of the second data matrix, an additional equalization approach still needs to be used subsequently. A neighborhood range $(\Delta m, \Delta n) = (1, k)$ is given, where k is a positive integer. Interference received by $a_{m,n}$ on the first antenna from a same data matrix (that is, the first data matrix) is $ja_{m,n}^1$, and interference received by $-b_{m,n}$ on the first antenna from a same data matrix (that is, the second data matrix) is $-jb_{m,n}^1$, interference received by $a_{m,n}$ on the first antenna from the second data matrix is $ja_{m,n}^2$, and interference received by $-b_{m,n}$ on the first antenna from the first data matrix is $-jb_{m,n}^2$.

To facilitate analysis, it is assumed that if a channel on an antenna changes slowly, the channel may be regarded as approximately unchanged, and channel frequency responses of two antennas are denoted by $H_1$ and $H_2$ respectively.

After data passes through the channel, the receive end receives the data transmitted from the two transmit antennas. After passing through the filter, according to a relationship between imaginary part interference coefficients, data $R_{m,n}$ on the $m^{th}$ subcarrier and the $n^{th}$ symbol is:

$$R_{m,n} = H_1(a_{m,n} + ja_{m,n}^1 + ja_{m,n}^2) + H_2(b_{m,n} - jb_{m,n}^1 + jb_{m,n}^2)$$

Data $R_{m,2N+1-n}$ on the $m^{th}$ subcarrier and the $(2N+1-n)^{th}$ symbol is:

$$R_{m,2N+1-n} = H_1(-b_{m,n} - jb_{m,n}^1 - jb_{m,n}^2) + H_2(a_{m,n} - ja_{m,n}^1 + ja_{m,n}^2)$$

Traditional Alamouti equalization is performed to obtain:

$$R_{m,n}^{eq} = (H_1)^* R_{m,n} + H_2 R_{m,2N+1-n}^*$$
$$= (|H_1|^2 + |H_2|^2)a_{m,n} + (|H_1|^2 + |H_2|^2)(ja_{m,n}^1) +$$
$$(|H_1|^2 - |H_2|^2)(ja_{m,n}^2) + 2(H_1)^* H_2(jb_{m,n}^2)$$

and $$R_{m,2N+1-n}^{eq} = (H_2)^* R_{m,n} - H_1 R_{m,2N+1-n}^*$$
$$= (|H_1|^2 + |H_2|^2)b_{m,n} - (|H_1|^2 + |H_2|^2)(jb_{m,n}^1) -$$
$$(|H_1|^2 - |H_2|^2)(jb_{m,n}^2) + 2H_1(H_2)^*(ja_{m,n}^2)$$

Then an operation for acquiring a real part from a complex number is performed to obtain:

$$Re(R_{m,n}^{eq}) = (|H_1|^2 + |H_2|^2)a_{m,n} + Re\{2(H_1)^* H_2(jb_{m,n}^2)\},$$

$$Re(R_{m,2N+1-n}^{eq}) = (|H_1|^2 + |H_2|^2)b_{m,n} + Re\{2H_1(H_2)^*(ja_{m,n}^2)\}.$$

An equalization conception is described below still by using $a_{M,n}$ restoration as an example. According to the definition, $-jb_{m,n}^2$ is the interference received by $-b_{m,n}$ on the first antenna from the first data matrix, that is:

$$-jb_{m,n}^2 = \sum_{\substack{p \in [-1,1] \\ q \in [-k, n-N-1]}} (-1)^{p(2N+1-n)} a_{m+p, 2N+1-n+q} c_{p,q} \quad (6)$$

Subsequently, k symbols in $[N-k+1, N]$ need to be used together to restore $a_{m,n}$. A total of kM pieces of data on the k symbols are arranged successively in carrier order. That is, a $kM \times 1$ matrix A is defined, $a_{m,n}$ is mapped onto the $(km+n-N)^{th}$ element of A, where $m \in [1,M]$ and $n \in [N-k+1, N]$. In the same manner, $Re(R_{m,n}^{eq})$ is mapped onto the $kM \times 1$ matrix R.

Therefore, $R = C^*A$ may also be obtained, where C is a $kM \times kM$ square matrix and $C = diag(|H_1|^2 + |H_2|^2, |H_1|^2 + |H_2|^2, \ldots, |H_1|^2 + |H_2|^2) + D_{kM \times kM}$. Elements in the $(km+n-N)^{th}$ row of $D_{kM \times kM}$ are used to restore $a_{m,n}$, where $m \in [1,M]$ and $n \in [N-k+1, N]$. From the formula (6), $a_{m,n}$ may receive interference from $a_{m+p, 2N+1-n+q}$, where $p \in [-1, 1]$ and $q \in [-k, n-N-1]$. Therefore, an element in the $(km+n-N)^{th}$ row and the $(k(m+p)+2N+1-n-q-N)^{th}$ column of $D_{kM \times kM}$ is $2 \times (-1)^{p(2N+1-n)+1} c_{p,q}(H_1)^* H_2$.

In summary, $R = C^*A$ may be learned according to all data that is on the first data matrix and receives interference from the second data matrix, where $C = diag(|H_1|^2 + |H_2|^2, |H_1|^2 + |H_2|^2, \ldots, |H_1|^2 + |H_2|^2) + D_{kM \times kM}$. An element in the $(km+n-N)^{th}$ row and the $(k(m+p)+N+1-n-q)^{th}$ column of $D_{kM \times kM}$ is $2 \times (-1)^{p(2N+1-n)+1} c_{p,q}(H_1)^* H_2$, and other elements are 0s, where $m \in [1, M]$, $n \in [N-k+1, N]$, $p \in [-1, 1]$, and $q \in [-k, n-N-1]$. Then A may be restored by using an equalization approach such as ZF or MMSE.

According to the method in this embodiment of the present invention, received data is decoded in an Alamouti manner according to a specific data encoding manner, and an interference cancellation operation is performed on signals received on two adjacent subcarriers of data matrices on a receive antenna, which can almost completely eliminate impact of imaginary part interference without using a guard interval, and improve system performance.

Figure 5:
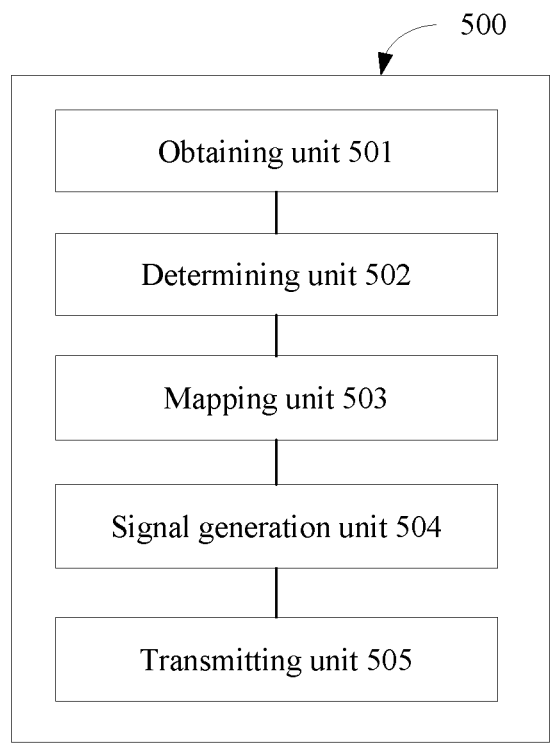
FIG. 5 is a schematic structural diagram of a transmit end apparatus according to an embodiment of the present invention.

FIG. 5 is a schematic structural diagram of a transmit end apparatus 500 according to an embodiment of the present invention. The transmit end apparatus 500 may include: an obtaining unit 501, a determining unit 502, a mapping unit 503, a signal generation unit 504, and a transmitting unit 505. In specific application, the transmit end apparatus 500 may be a radio access device such as a base station; or may be user equipment of a terminal such as a mobile phone.

The obtaining unit 501 is configured to obtain a to-be-transmitted data sequence, where the to-be-transmitted data sequence includes 2*M*N pieces of data.

The determining unit 502 is configured to determine a first data matrix, a second data matrix, a third data matrix, and a fourth data matrix according to the data sequence, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

The mapping unit 503 is configured to map the first data matrix onto N consecutive symbols*M consecutive subcarriers on a first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on a second antenna, and map the fourth data matrix onto a same time-frequency position as the second data matrix on the second antenna.

The signal generation unit 504 is configured to separately generate FBMC signals of the first antenna and the second antenna according to the mapped data matrices.

The transmitting unit 505 is configured to transmit the FBMC signals of the first antenna and the second antenna.

In this embodiment of the present invention, the transmit end apparatus 500 combines the FBMC technology with Alamouti encoding according to a specific data encoding manner, and encodes to-be-transmitted data and then transmits the data, which almost completely eliminates impact of imaginary part interference without using a guard interval, and improves system performance.

It should be understood that in specific application, the determining unit 502, the mapping unit 503, and the signal generation unit 504 may be combined into an encoding unit or an encoder.

For example, the encoding unit or encoder may be configured to: map a first data matrix onto N consecutive symbols*M consecutive subcarriers on the first antenna, map a second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map a third data matrix onto a same time-frequency position as the first data matrix on the second antenna, and map a fourth data matrix onto a same time-frequency position as the second data matrix on the second antenna, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1; map the first data matrix onto N consecutive symbols*M consecutive subcarriers on the first antenna, map the second data matrix onto N consecutive symbols*M consecutive subcarriers on the first antenna, where the M consecutive subcarriers are in a frequency domain adjacent to the first data matrix, and the N consecutive symbols are in a same time domain position as the first data matrix, map the third data matrix onto a same time-frequency position as the first data matrix on the second antenna, and map the fourth data matrix onto a same time-frequency position as the second data matrix on the second antenna.

Alternatively, the encoding unit or encoder may be configured to: perform transmit diversity processing on the to-be-transmitted data sequence to obtain FBMC signals of the first antenna and the second antenna, where data denoted by FBMC signals on the $0^{th}$ to the $(M-1)^{th}$ subcarriers and the $0^{th}$ to the $(N-1)^{th}$ symbols of the first antenna is that includes M*N pieces of data in the to-be-transmitted data sequence; data denoted by FBMC signals on the $0^{th}$ to the $(M-1)^{th}$ subcarriers and the $0^{th}$ to the $(N-1)^{th}$ symbols of the second antenna is that includes other M*N pieces of data in the to-be-transmitted data sequence; data denoted by an FBMC signal on the $(i+M)^{th}$ subcarrier and the $j^{th}$ symbol of the first antenna is equal to data obtained by multiplying data denoted by an FBMC signal on the $(M-i-1)^{th}$ subcarrier and the $j^{th}$ symbol of the second antenna by −1, where $0 \leq i < M$, $0 \leq j < N$, and j is an even number; data denoted by an FBMC signal on the $(i+M)^{th}$ subcarrier and the $j^{th}$ symbol of the first antenna is equal to data denoted by an FBMC signal on the $(M-i-1)^{th}$ subcarrier and the $j^{th}$ symbol of the second antenna, where $0 \leq i < M$, $0 \leq j < N$, and j is an odd number; data denoted by an FBMC signal on the $(i+M)^{th}$ subcarrier and the $j^{th}$ symbol of the second antenna is equal to data denoted by an FBMC signal on the $(M-i-1)^{th}$ subcarrier and the $j^{th}$ symbol of the first antenna, where $0 \leq i < M$, $0 \leq j < N$, and j is an even number; and data denoted by an FBMC signal on the $(i+M)^{th}$ subcarrier and the $j^{th}$ symbol of the second antenna is equal to data obtained by multiplying data denoted by an FBMC signal on the $(M-i-1)^{th}$ subcarrier and the $j^{th}$ symbol of the first antenna by −1, where $0 \leq i < M$, $0 \leq j < N$, and j is an odd number.

Certainly, it should be understood that the unit modules or encoders for obtaining the FBMC signals of the first antenna and the second antenna by means of transmit diversity processing in this embodiment of the present invention are essentially equivalent.

Optionally, all the 2*M*N pieces of data are pure-real-number data, or all are pure-imaginary-number data.

Optionally, in an embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \cdots & a_{1,N} \\ a_{2,1} & a_{2,2} & a_{2,3} & \cdots & a_{2,N} \\ \cdots & \cdots & \cdots & \cdots & \cdots \\ a_{M,1} & a_{M,2} & a_{M,3} & \cdots & a_{M,N} \end{bmatrix};$$

the second data matrix is $$\begin{bmatrix} -b_{M,1} & b_{M,2} & -b_{M,3} & \cdots & (-1)^N b_{M,N} \\ \cdots & \cdots & \cdots & \cdots & \cdots \\ -b_{2,1} & b_{2,2} & -b_{2,3} & \cdots & (-1)^N b_{2,N} \\ -b_{1,1} & b_{1,2} & -b_{1,3} & \cdots & (-1)^N b_{1,N} \end{bmatrix};$$

the third data matrix is $$\begin{bmatrix} b_{1,1} & b_{1,2} & b_{1,3} & \ldots & b_{1,N} \\ b_{2,1} & b_{2,2} & b_{2,3} & \ldots & b_{2,N} \\ \ldots & \ldots & \ldots & \ldots & \ldots \\ b_{M,1} & b_{M,2} & b_{M,3} & \ldots & b_{M,N} \end{bmatrix};$$

and
the fourth data matrix is $$\begin{bmatrix} a_{M,1} & -a_{M,2} & a_{M,3} & \ldots & (-1)^{N+1}a_{M,N} \\ \ldots & \ldots & \ldots & \ldots & \ldots \\ a_{2,1} & -a_{2,2} & a_{2,3} & \ldots & (-1)^{N+1}a_{2,N} \\ a_{1,1} & -a_{1,2} & a_{1,3} & \ldots & (-1)^{N+1}a_{1,N} \end{bmatrix}.$$

Optionally, in another embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;
the first data matrix is $$\begin{bmatrix} a_{1,1} & a_{1,2} & a_{1,3} & \ldots & a_{1,N} \\ a_{2,1} & a_{2,2} & a_{2,3} & \ldots & a_{2,N} \\ \ldots & \ldots & \ldots & \ldots & \ldots \\ a_{M,1} & a_{M,2} & a_{M,3} & \ldots & a_{M,N} \end{bmatrix};$$

the second data matrix is $$\begin{bmatrix} b_{M,1} & b_{M,2} & b_{M,3} & \ldots & b_{M,N} \\ \ldots & \ldots & \ldots & \ldots & \ldots \\ b_{2,1} & b_{2,2} & b_{2,3} & \ldots & b_{2,N} \\ b_{1,1} & b_{1,2} & b_{1,3} & \ldots & b_{1,N} \end{bmatrix};$$

the third data matrix is $$\begin{bmatrix} -b_{1,1} & b_{1,2} & -b_{1,3} & \ldots & (-1)^{N}b_{1,N} \\ -b_{2,1} & b_{2,2} & -b_{2,3} & \ldots & (-1)^{N}b_{2,N} \\ \ldots & \ldots & \ldots & \ldots & \ldots \\ -b_{M,1} & b_{M,2} & -b_{M,3} & \ldots & (-1)^{N}b_{M,N} \end{bmatrix};$$

and
the fourth data matrix is $$\begin{bmatrix} a_{M,1} & -a_{M,2} & a_{M,3} & \ldots & (-1)^{N+1}a_{M,N} \\ \ldots & \ldots & \ldots & \ldots & \ldots \\ a_{2,1} & -a_{2,2} & a_{2,3} & \ldots & (-1)^{N+1}a_{2,N} \\ a_{1,1} & -a_{1,2} & a_{1,3} & \ldots & (-1)^{N+1}a_{1,N} \end{bmatrix}.$$

The transmit end apparatus 500 may further execute the method in FIG. 1, and have functions of the transmit end apparatus (such as a base station) in the embodiment shown in FIG. 1 and the specific embodiments 1 and 2 of the present invention, and details are not described herein again in this embodiment of the present invention.

Figure 6:
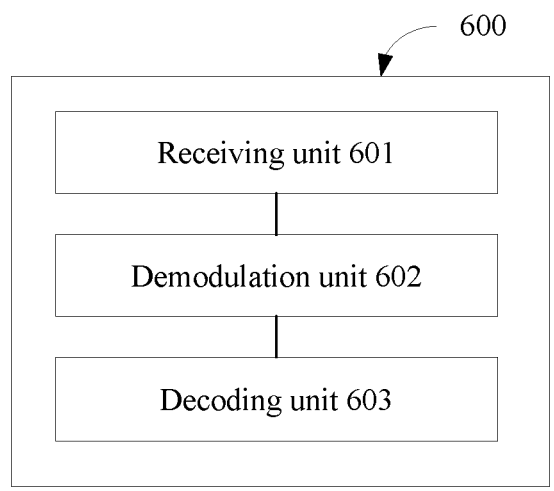
FIG. 6 is a schematic structural diagram of a receive end apparatus according to an embodiment of the present invention.

FIG. 6 is a schematic structural diagram of a receive end apparatus 600 according to an embodiment of the present invention. The receive end apparatus 600 may include: a receiving unit 601, a demodulation unit 602, and a decoding unit 603. In specific application, the receive end apparatus 600 may be a radio access device such as a base station; or may be user equipment of a terminal such as a mobile phone.

The receiving unit 601 is configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1.

The demodulation unit 602 is configured to perform a filter bank-based multi carrier FBMC signal demodulation operation on the transmit diversity signals to obtain a first signal.

The decoding unit 603 is configured to perform a decoding operation on the first signal according to Alamouti encoding to obtain a second signal, and according to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

In this embodiment of the present invention, the receive end apparatus 600 decodes received data in an Alamouti manner according to a specific data encoding manner, and performs an interference cancellation operation on signals received on two adjacent subcarriers of data matrices on a receive antenna, which almost completely eliminates impact of imaginary part interference without using a guard interval, and improves system performance.

Optionally, all the 2*M*N pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$$A=(C^H C)^{-1} C^H R, \text{ where}$$

$R=[\text{Re}(R_{M,1}^{eq}), \text{Re}(R_{M,2}^{eq}), \ldots, \text{Re}(R_{M,N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,N}^{eq})]^T$ when the data sequence includes no pure real number, and $$C = \begin{bmatrix} \Lambda & d_1 & \cdots & d_k & & & & \\ & \ddots & & & & & & \\ d_{-k} & \cdots & d_{-1} & \Lambda & d_1 & \cdots & d_k & \\ & d_{-k} & \cdots & d_{-1} & \Lambda & d_1 & \cdots & d_k \\ & & d_{-k} & \cdots & d_{-1} & \Lambda & d_1 & \cdots & d_k \\ & & & & & \ddots & & \\ & & & & d_{-k} & \cdots & d_{-1} & \Lambda \end{bmatrix}_{N \times N},$$

where $\Lambda=|H_M^1|+|H_M^2|^2+d_0$, $H_M^1$ denotes a channel frequency domain response obtained when a channel transmitted by the first antenna at the transmit end reaches a receive end, $H_M^2$ denotes a channel frequency domain response obtained when a channel transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{M,n}^{eq} = (H_M^1)^* R_{M,n} + H_M^2 R_{M+1,n}^*$$
$$= (|H_M^1|^2 + |H_M^2|^2) a_{M,n} + (|H_M^1|^2 + |H_M^2|^2)(ja_{M,n}^1) +$$
$$(|H_M^1|^2 - |H_M^2|^2)(ja_{M,n}^2) + 2(H_M^1)^* H_M^2 (jb_{M,n}^2),$$

where $R_{M,n}$ denotes the data received on the $M^{th}$ subcarrier and the $n^{th}$ symbol, n=1, 2 . . . , 2N, and the $M^{th}$ subcarrier is one of adjacent subcarriers in the first data matrix and the second data matrix.

The receive end apparatus 600 may further execute the method in FIG. 2, and have functions of the receive end apparatus (such as user equipment) in the embodiment shown in FIG. 2 and the specific embodiment 3 of the present invention, and details are not described herein again in this embodiment of the present invention.

Figure 7:
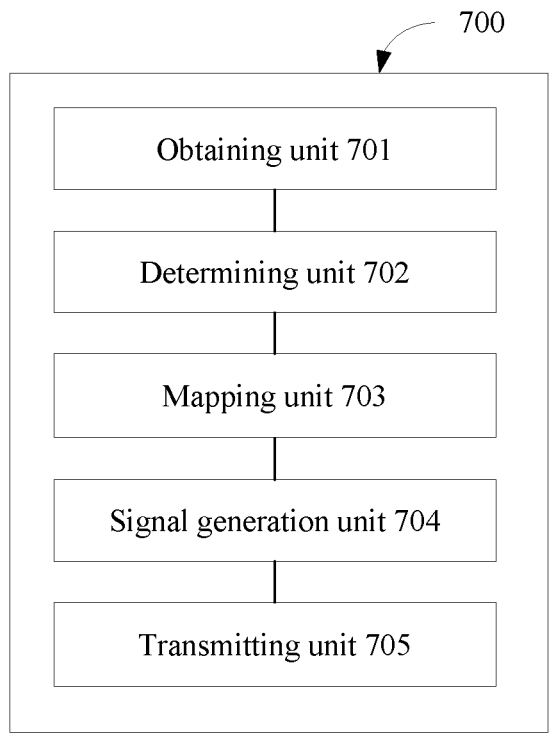
FIG. 7 is another schematic structural diagram of a transmit end apparatus according to an embodiment of the present invention.

FIG. 7 is a schematic structural diagram of a transmit end apparatus 700 according to an embodiment of the present invention. The transmit end apparatus 700 may include: an obtaining unit 701, a determining unit 702, a mapping unit 703, a signal generation unit 704, and a transmitting unit 705. In specific application, the transmit end apparatus 700 may be a radio access device such as a base station; or may be user equipment of a terminal such as a mobile phone.

The obtaining unit 701 is configured to obtain a to-be-transmitted data sequence, where the data sequence includes 2*M*N pieces of data.

The determining unit 702 is configured to determine a first data matrix, a second data matrix, a third data matrix, and a fourth data matrix according to the data sequence, where the first data matrix includes M*N pieces of data in the data sequence or data obtained by multiplying data in a first group of specified positions of M*N pieces of data by −1, the third data matrix includes other M*N pieces of data in the data sequence or data obtained by multiplying data in a second group of specified positions of other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns.

The mapping unit 703 is configured to map the first data matrix onto N consecutive symbols*M consecutive subcarriers on a first antenna, map the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map the third data matrix onto a same time-frequency position as the first data matrix on a second antenna, and map the fourth data matrix onto a same time-frequency position as the second data matrix on the second antenna.

The signal generation unit 704 is configured to separately generate FBMC signals of the first antenna and the second antenna according to the mapped data matrices.

The transmitting unit 705 is configured to transmit the FBMC signals of the first antenna and the second antenna.

In this embodiment of the present invention, the transmit end apparatus 700 combines the FBMC technology with Alamouti encoding according to a specific data encoding manner, and encodes to-be-transmitted data and then transmits the data, which almost completely eliminates impact of imaginary part interference without using a guard interval, and improves system performance.

It should be understood that in specific application, the determining unit 702, the mapping unit 703, and the signal generation unit 704 may be combined into an encoding unit or an encoder.

For example, the encoding unit or encoder may be configured to: map a first data matrix onto N consecutive symbols*M consecutive subcarriers on the first antenna, map a second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map a third data matrix onto a same time-frequency position as the first data matrix on the second antenna, and map a fourth data matrix onto a same time-frequency position as the second data matrix on the second antenna, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to a data matrix generated from other M*N pieces of data in the data sequence or a data matrix obtained by multiplying data in a second group of specified positions in M rows*N columns positions of a data matrix generated from other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns; and map the first data matrix onto N consecutive symbols*M consecutive subcarriers on the first antenna, map the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, map the third data matrix onto a same time-frequency position as the first data matrix on the second antenna, and map the fourth data matrix onto a same time-frequency position as the second data matrix on the second antenna.

Alternatively, the encoding unit or encoder may be configured to: perform transmit diversity processing on the to-be-transmitted data sequence to obtain FBMC signals of the first antenna and the second antenna, where data denoted by FBMC signals on the $0^{th}$ to the $(M-1)^{th}$ subcarriers and the 0th to the $(N-1)^{th}$ symbols of the first antenna is that includes M*N pieces of data in the to-be-transmitted data sequence; data denoted by FBMC signals on the $0^{th}$ to the $(M-1)^{th}$ subcarriers and the $0^{th}$ to the $(N-1)^{th}$ symbols of the second antenna is that includes other M*N pieces of data in the to-be-transmitted data sequence; data denoted by an FBMC signal on the $i^{th}$ subcarrier and the $(j+N)^{th}$ symbol of the first antenna is equal to data obtained by multiplying data denoted by an FBMC signal on the $(M-i-1)^{th}$ subcarrier and the $j^{th}$ symbol of the second antenna by $-1$, where $0 \leq i < M$, and $0 \leq j < N$; data denoted by an FBMC signal on the $i^{th}$ subcarrier and the $(j+N)^{th}$ symbol of the second antenna is equal to data denoted by an FBMC signal on the $(M-i-1)^{th}$ subcarrier and the $j^{th}$ symbol of the first antenna, where $0 \leq i < M$, and $0 \leq j < N$.

Certainly, it should be understood that the unit modules or encoders for obtaining the FBMC signals of the first antenna and the second antenna by means of transmit diversity processing in this embodiment of the present invention are essentially equivalent.

Optionally, all the 2*M*N pieces of data are pure-real-number data, or all are pure-imaginary-number data.

Optionally, in an embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & \cdots & a_{1,N} \\ a_{2,1} & a_{2,2} & \cdots & a_{2,N} \\ \cdots & \cdots & \cdots & \cdots \\ a_{M,1} & a_{M,2} & \cdots & a_{M,N} \end{bmatrix};$$

the second data matrix is $$\begin{bmatrix} -b_{1,N} & \cdots & -b_{1,2} & -b_{1,1} \\ -b_{2,N} & \cdots & -b_{2,2} & -b_{2,1} \\ \cdots & \cdots & \cdots & \cdots \\ -b_{M,N} & \cdots & -b_{M,2} & -b_{M,1} \end{bmatrix};$$

the third data matrix is $$\begin{bmatrix} b_{1,1} & b_{1,2} & \cdots & b_{1,N} \\ b_{2,1} & b_{2,2} & \cdots & b_{2,N} \\ \cdots & \cdots & \cdots & \cdots \\ b_{M,1} & b_{M,2} & \cdots & b_{M,N} \end{bmatrix};$$

and the fourth data matrix is $$\begin{bmatrix} a_{1,N} & \cdots & a_{1,2} & a_{1,1} \\ a_{2,1} & \cdots & a_{2,2} & a_{2,N} \\ \cdots & \cdots & \cdots & \cdots \\ a_{M,N} & \cdots & a_{M,2} & a_{M,1} \end{bmatrix}.$$

The transmit end apparatus 700 may further execute the method in FIG. 3, and have functions of the transmit end apparatus (such as a base station) in the embodiment shown in FIG. 3 and the specific embodiment 4 of the present invention, and details are not described herein again in this embodiment of the present invention.

Figure 8:
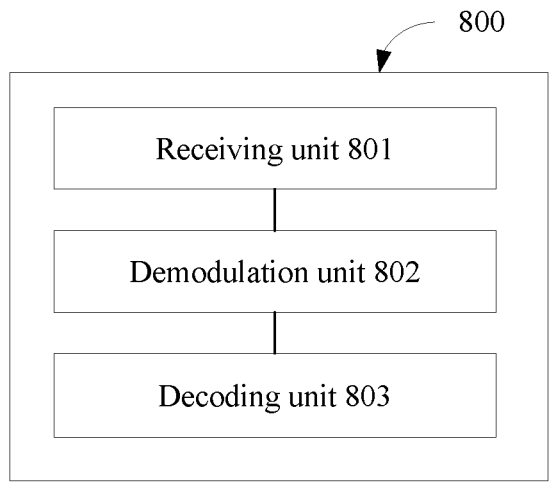
FIG. 8 is another schematic structural diagram of a receive end apparatus according to an embodiment of the present invention.

FIG. 8 is a schematic structural diagram of a receive end apparatus 800 according to an embodiment of the present invention. The receive end apparatus 800 may include: a receiving unit 801, a demodulation unit 802, and a decoding unit 803. In specific application, the receive end apparatus 800 may be a radio access device such as a base station; or may be user equipment of a terminal such as a mobile phone.

The receiving unit 801 is configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by $-1$, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by $-1$, the data sequence includes 2*M*N pieces of data, the second data matrix is equal to a data matrix obtained by arranging the third data matrix in reversed order of columns and multiplying all data by $-1$, and the fourth data matrix is equal to a data matrix obtained by arranging the first data matrix in reversed order of columns.

The demodulation unit 802 is configured to perform a filter bank-based multi carrier FBMC signal demodulation operation on the transmit diversity signals to obtain a first signal.

The decoding unit 803 is configured to perform a decoding operation on the first signal according to Alamouti encoding to obtain a second signal, and according to the second signal, perform an interference cancellation operation on data on two adjacent subcarriers of the first data matrix and the second data matrix, and perform an interference cancellation operation on data on two adjacent subcarriers of the third data matrix and the fourth data matrix, to obtain an estimated value of the data sequence.

In this embodiment of the present invention, the receive end apparatus 800 decodes received data in an Alamouti manner according to a specific data encoding manner, and performs an interference cancellation operation on signals received on two adjacent subcarriers of data matrices on a receive antenna, which almost completely eliminates impact of imaginary part interference without using a guard interval, and improves system performance.

Optionally, all the 2*M*N pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$$A=(C^H C)^{-1} C^H R, \text{ where}$$

$R=[\text{Re}(R_{M,1}^{eq}), \text{Re}(R_{M,2}^{eq}), \ldots, \text{Re}(R_{M,2N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,2N}^{eq})]^T$ when the data sequence includes no pure real number, and $C=\text{diag}(|H_1|^2+|H_2|^2, |H_1|^2+|H_2|^2, \ldots, |H_1|^2+|H_2|^2)+D_{kM\times kM}$, where an element in the $(km+n-N)^{th}$ row and the $(k(m+p)+N+1-n-q)^{th}$ column of $D_{kM\times kM}$ is $2\times(-1)^{p(2N+1-n)+1}c_{p,q}(H_1)^*H_2$, and remaining elements are 0s, where $c_{p,q}$ is a pure imaginary number and denotes an imaginary part interference coefficient caused by data in a time-frequency point (m+p, n+q) position to data in a time-frequency point (m, n) position $m\in[1,M]$, $n\in[N-k+1, N]$, $p\in[-1,1]$, $q\in[-k,n-N-1]$, $H_1$ denotes a channel frequency response obtained when a signal transmitted by the first antenna at the transmit end reaches a receive end, $H_2$ denotes a channel frequency response obtained when a signal transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{m,n}^{eq} = (H_1)^* R_{m,n} + H_2 R_{m,2N+1-n}^*$$
$$= (|H_1|^2 + |H_2|^2)a_{m,n} + (|H_1|^2 + |H_2|^2)(ja_{m,n}^1) +$$
$$(|H_1|^2 - |H_2|^2)(ja_{m,n}^2) + 2(H_1)^* H_2(jb_{m,n}^2),$$

where $R_{M,n}$ denotes the data received on the $M^{th}$ subcarrier and the $n^{th}$ symbol, $n=1, 2 \ldots, 2N$, and the $M^{th}$ subcarrier is one of adjacent subcarriers in the first data matrix and the second data matrix.

The receive end apparatus 800 may further execute the method in FIG. 4, and have functions of the receive end apparatus (such as user equipment) in the embodiment shown in FIG. 4 and the specific embodiment 5 of the present invention, and details are not described herein again in this embodiment of the present invention.

Figure 9:
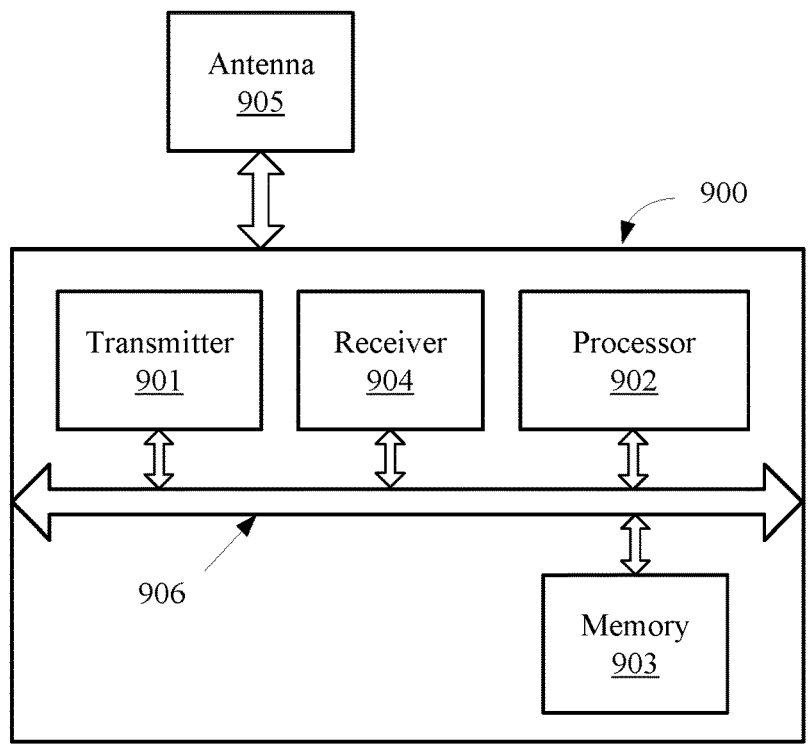
FIG. 9 is another schematic structural diagram of a transmit end apparatus according to an embodiment of the present invention.

FIG. 9 is a schematic structural diagram of a transmit end apparatus 900 according to an embodiment of the present invention. The transmit end apparatus 900 may include a processor 902, a memory 903, a transmitter 901, and a receiver 904. In specific application, the transmit end apparatus 900 may be a radio access device such as a base station; or may be user equipment of a terminal such as a mobile phone.

The receiver 904, the transmitter 901, the processor 902, and the memory 903 are connected to each other by using a bus 906 system. The bus 906 may be an ISA bus, a PCI bus, or an EISA bus, or the like. The bus may be classified into an address bus, a data bus, a control bus, and the like. For ease of denoting, FIG. 9 uses only one bidirectional arrow to denote the bus, but it does not mean that there is only one bus or only one type of bus. In specific application, the transmitter 901 and the receiver 904 may be coupled to an antenna 905.

The memory 903 is configured to store a program. Specifically, the program may include program code, and the program code includes a computer operation instruction. The memory 903 may include a read-only memory and a random access memory, and provides an instruction and data to the processor 902. The memory 903 may include a high-speed RAM memory, and may further include a non-volatile memory (non-volatile memory) such as at least one disk memory.

The processor 902 executes the program stored in the memory 903, and is specifically configured to execute the following operations:

obtaining a to-be-transmitted data sequence, where the to-be-transmitted data sequence includes 2*M*N pieces of data;

determining a first data matrix, a second data matrix, a third data matrix, and a fourth data matrix according to the data sequence, where the first data matrix is equal to an M rows*N columns data matrix generated from M*N pieces of data in the data sequence or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1;

separately generating FBMC signals of the first antenna and the second antenna according to the mapped data matrices; and transmitting the FBMC signals of the first antenna and the second antenna by using the transmitter 901.

The method executed by the transmit end apparatus (such as a base station) disclosed in any embodiment in FIG. 1 and the specific embodiments 1 and 2 of the present invention may be applicable to the processor 902 or may be implemented by the processor 902. The processor 902 may be an integrated circuit chip with a signal processing capability. In an implementation process, the steps of the method may be implemented by an integrated logical circuit of hardware in the processor 902, or by a software instruction. The processor 902 may be a general processor, including a central processing unit (central processing unit, CPU for short), a network processor (network processor, NP for short), and the like; or may be a digital signal processor (DSP), an application-specific integrated circuit (ASIC), a field programmable gate array (FPGA) or another programmable logical device, a discrete gate or a transistor logical device, or a discrete hardware component. The processor 902 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 903, and the processor 902 reads information in the memory 903 and implements, in combination with its hardware, the steps of the foregoing methods.

In this embodiment of the present invention, the transmit end apparatus 900 combines the FBMC technology with Alamouti encoding according to a specific data encoding manner, and encodes to-be-transmitted data and then transmits the data, which almost completely eliminates impact of imaginary part interference without using a guard interval, and improves system performance.

Optionally, all the 2*M*N pieces of data are pure-real-number data, or all are pure-imaginary-number data.

Optionally, in an embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \dots & a_{1,N} \\ a_{2,1} & a_{2,2} & a_{2,3} & \dots & a_{2,N} \\ \dots & \dots & \dots & \dots & \dots \\ a_{M,1} & a_{M,2} & a_{M,3} & \dots & a_{M,N} \end{bmatrix};$$

the second data matrix is $$\begin{bmatrix} -b_{M,1} & b_{M,2} & -b_{M,3} & \dots & (-1)^N b_{M,N} \\ \dots & \dots & \dots & \dots & \dots \\ -b_{2,1} & b_{2,2} & -b_{2,3} & \dots & (-1)^N b_{2,N} \\ -b_{1,1} & b_{1,2} & -b_{1,3} & \dots & (-1)^N b_{1,N} \end{bmatrix};$$

the third data matrix is $$\begin{bmatrix} b_{1,1} & b_{1,2} & b_{1,3} & \dots & b_{1,N} \\ b_{2,1} & b_{2,2} & b_{2,3} & \dots & b_{2,N} \\ \dots & \dots & \dots & \dots & \dots \\ b_{M,1} & b_{M,2} & b_{M,3} & \dots & b_{M,N} \end{bmatrix};$$

and
the fourth data matrix is $$\begin{bmatrix} a_{M,1} & -a_{M,2} & a_{M,3} & \dots & (-1)^{N+1} a_{M,N} \\ \dots & \dots & \dots & \dots & \dots \\ a_{2,1} & -a_{2,2} & a_{2,3} & \dots & (-1)^{N+1} a_{2,N} \\ a_{1,1} & -a_{1,2} & a_{1,3} & \dots & (-1)^{N+1} a_{1,N} \end{bmatrix}.$$

Optionally, in another embodiment, the 2*M*N pieces of data include $a_{i,j}$, $1 \leq i \leq M$, $1 \leq j \leq N$ and $b_{k,l}$, $1 \leq k \leq M$, $1 \leq l \leq N$;

the first data matrix is $$\begin{bmatrix} a_{1,1} & a_{1,2} & a_{1,3} & \dots & a_{1,N} \\ a_{2,1} & a_{2,2} & a_{2,3} & \dots & a_{2,N} \\ \dots & \dots & \dots & \dots & \dots \\ a_{M,1} & a_{M,2} & a_{M,3} & \dots & a_{M,N} \end{bmatrix};$$

the second data matrix is $$\begin{bmatrix} b_{M,1} & b_{M,2} & b_{M,3} & \dots & b_{M,N} \\ \dots & \dots & \dots & \dots & \dots \\ b_{2,1} & b_{2,2} & b_{2,3} & \dots & b_{2,N} \\ b_{1,1} & b_{1,2} & b_{1,3} & \dots & b_{1,N} \end{bmatrix};$$

the third data matrix is $$\begin{bmatrix} -b_{1,1} & b_{1,2} & -b_{1,3} & \dots & (-1)^N b_{1,N} \\ -b_{2,1} & b_{2,2} & -b_{2,3} & \dots & (-1)^N b_{2,N} \\ \dots & \dots & \dots & \dots & \dots \\ -b_{M,1} & b_{M,2} & -b_{M,3} & \dots & (-1)^N b_{M,N} \end{bmatrix};$$

and
the fourth data matrix is $$\begin{bmatrix} a_{M,1} & -a_{M,2} & a_{M,3} & \dots & (-1)^{N+1} a_{M,N} \\ \dots & \dots & \dots & \dots & \dots \\ a_{2,1} & -a_{2,2} & a_{2,3} & \dots & (-1)^{N+1} a_{2,N} \\ a_{1,1} & -a_{1,2} & a_{1,3} & \dots & (-1)^{N+1} a_{1,N} \end{bmatrix}.$$

The transmit end apparatus 900 may further execute the method in FIG. 1, and have functions of the transmit end apparatus (such as a base station) in the embodiment shown in FIG. 1 and the specific embodiments 1 and 2 of the present invention, and details are not described herein again in this embodiment of the present invention.

Figure 10:
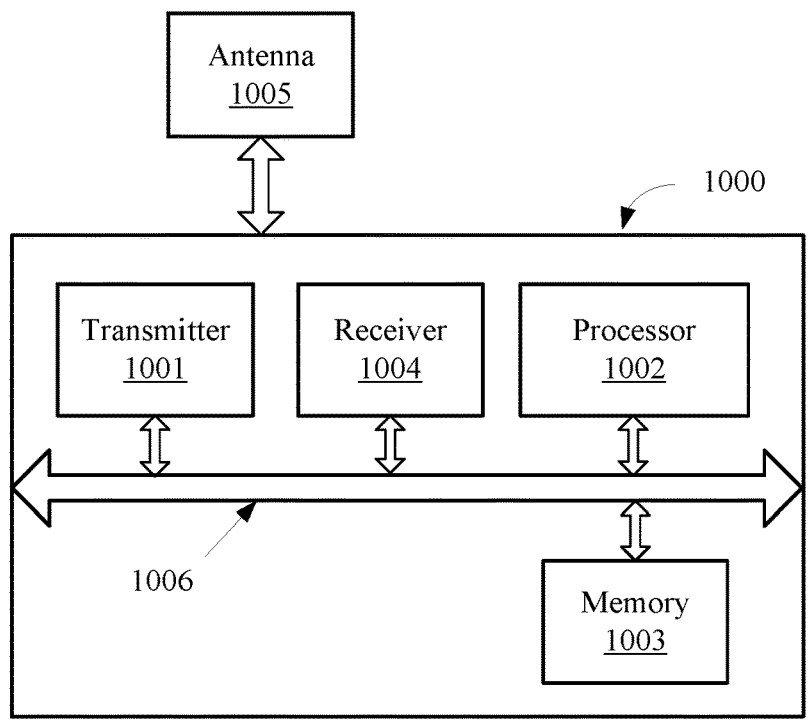
FIG. 10 is another schematic structural diagram of a receive end apparatus according to an embodiment of the present invention.

FIG. 10 is a schematic structural diagram of a receive end apparatus 1000 according to an embodiment of the present invention. The receive end apparatus 1000 may include a processor 1002, a memory 1003, a transmitter 1001, and a receiver 1004. In specific application, the receive end apparatus 1000 may be a radio access device such as a base station; or may be user equipment of a terminal such as a mobile phone.

The receiver 1004, the transmitter 1001, the processor 1002, and the memory 1003 are connected to each other by using a bus 1006 system. The bus 1006 may be an ISA bus, a PCI bus, or an EISA bus, or the like. The bus may be classified into an address bus, a data bus, a control bus, and the like. For ease of denoting, FIG. 10 uses only one bidirectional arrow to denote the bus, but it does not mean that there is only one bus or only one type of bus. In specific application, the transmitter 1001 and the receiver 1004 may be coupled to an antenna 1005.

The memory 1003 is configured to store a program. Specifically, the program may include program code, and the program code includes a computer operation instruction.

The memory 1003 may include a read-only memory and a random access memory, and provides an instruction and data to the processor 1002. The memory 1003 may include a high-speed RAM memory, and may further include a non-volatile memory (non-volatile memory) such as at least one disk memory.

The processor 1002 executes the program stored in the memory 1003, and is specifically configured to execute the following operations:

receiving, by using the receiver 1004, transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of rows and multiplying data in odd-numbered columns by −1, and the fourth data matrix is equal to a data matrix obtained by arranging the first data matrix in reversed order of rows and multiplying data in even-numbered columns by −1;

performing a filter bank-based multi carrier FBMC signal demodulation operation on the transmit diversity signals to obtain a first signal; and performing a decoding operation on the first signal according to Alamouti encoding to obtain a second signal, and according to the second signal, performing an interference cancellation operation on data on two adjacent subcarriers of the first data matrix and the second data matrix, and performing an interference cancellation operation on data on two adjacent subcarriers of the third data matrix and the fourth data matrix, to obtain an estimated value of the data sequence.

The method executed by the receive end apparatus (such as user equipment) disclosed in any embodiment in FIG. 2 and the specific embodiment 3 of the present invention may be applicable to the processor 1002 or may be implemented by the processor 1002. The processor 1002 may be an integrated circuit chip with a signal processing capability. In an implementation process, the steps of the method may be implemented by an integrated logical circuit of hardware in the processor 1002, or by a software instruction. The processor 1002 may be a general processor, including a central processing unit (central processing unit, CPU for short), a network processor (network processor, NP for short), and the like; or may be a digital signal processor (DSP), an application-specific integrated circuit (ASIC), a field programmable gate array (FPGA) or another programmable logical device, a discrete gate or a transistor logical device, or a discrete hardware component. The processor 1002 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1003, and the processor 1002 reads information in the memory 1003 and implements, in combination with its hardware, the steps of the foregoing methods.

In this embodiment of the present invention, the receive end apparatus 1000 decodes received data in an Alamouti manner according to a specific data encoding manner, and performs an interference cancellation operation on signals received on two adjacent subcarriers of data matrices on a receive antenna, which almost completely eliminates impact of imaginary part interference without using a guard interval, and improves system performance.

Optionally, all the 2*M*N pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$A=(C^H C)^{-1} C^H R$, where $R=[\text{Re}(R_{M,1}^{eq}), \text{Re}(R_{M,2}^{eq}), \ldots, \text{Re}(R_{M,N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,N}^{eq})]^T$ when the data sequence includes no pure real number, and $$C = \begin{bmatrix} \Lambda & d_1 & \ldots & d_k & & & & \\ & \ddots & & & & & & \\ d_{-k} & \ldots & d_{-1} & \Lambda & d_1 & \ldots & d_k & \\ & d_{-k} & \ldots & d_{-1} & \Lambda & d_1 & \ldots & d_k \\ & & d_{-k} & \ldots & d_{-1} & \Lambda & d_1 & \ldots & d_k \\ & & & & & & \ddots & \\ & & & & d_{-k} & \ldots & d_{-1} & \Lambda \end{bmatrix}_{N \times N},$$

where $\Lambda=|H_M^1|^2+|H_M^2|^2+d_0$, $H_M^1$ denotes a channel frequency domain response obtained when a channel transmitted by the first antenna at the transmit end reaches a receive end, $H_M^2$ denotes a channel frequency domain response obtained when a channel transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{M,n}^{eq} = (H_M^1)^* R_{M,n} + H_M^2 R_{M+1,n}^*$$
$$= (|H_M^1|^2 + |H_M^2|^2)a_{M,n} + (|H_M^1|^2 + |H_M^2|^2)(ja_{M,n}^1) +$$
$$(|H_M^1|^2 - |H_M^2|^2)(ja_{M,n}^2) + 2(H_M^1)^* H_M^2 (jb_{M,n}^2),$$

where $R_{M,n}$ denotes the data received on the $M^{th}$ subcarrier and the $n^{th}$ symbol, n=1, 2 . . . , 2N, and the $M^{th}$ subcarrier is one of adjacent subcarriers in the first data matrix and the second data matrix.

The receive end apparatus 1000 may further execute the method in FIG. 2, and have functions of the receive end apparatus (such as user equipment) in the embodiment shown in FIG. 2 and the specific embodiment 3 of the present invention, and details are not described herein again in this embodiment of the present invention.

Figure 11:
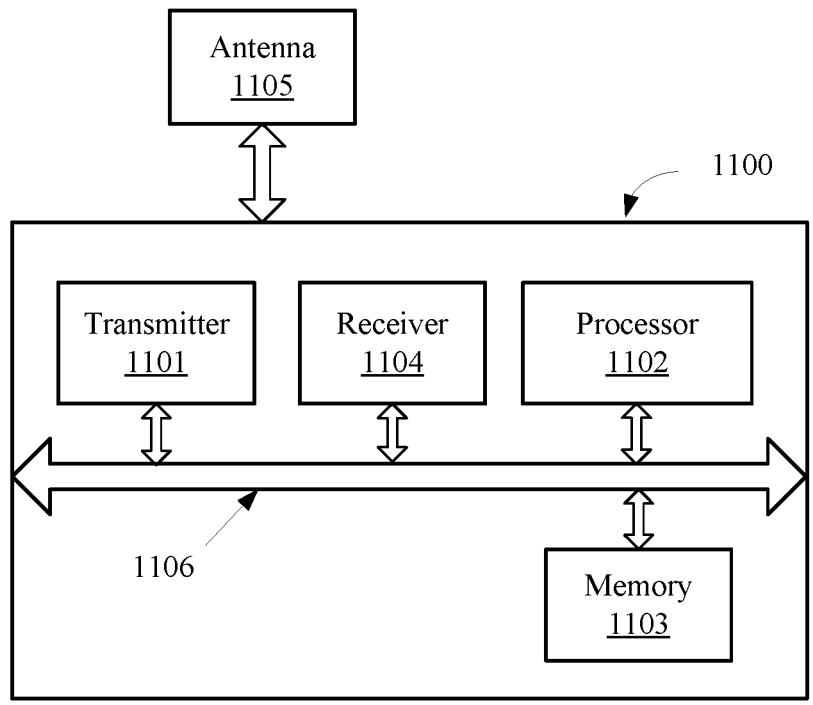
FIG. 11 is another schematic structural diagram of a transmit end apparatus according to an embodiment of the present invention.

FIG. 11 is a schematic structural diagram of a transmit end apparatus 1100 according to an embodiment of the present invention. The transmit end apparatus 1100 may include a processor 1102, a memory 1103, a transmitter 1101, and a receiver 1104. In specific application, the transmit end apparatus 1100 may be a radio access device such as a base station; or may be user equipment of a terminal such as a mobile phone.

The receiver 1104, the transmitter 1101, the processor 1102, and the memory 1103 are connected to each other by using a bus 1106 system. The bus 1106 may be an ISA bus, a PCI bus, or an EISA bus, or the like. The bus may be classified into an address bus, a data bus, a control bus, and the like. For ease of denoting, FIG. 11 uses only one bidirectional arrow to denote the bus, but it does not mean that there is only one bus or only one type of bus. In specific application, the transmitter 1101 and the receiver 1104 may be coupled to an antenna 1105.

The memory 1103 is configured to store a program. Specifically, the program may include program code, and the program code includes a computer operation instruction. The memory 1103 may include a read-only memory and a random access memory, and provides an instruction and data to the processor 1102. The memory 1103 may include a high-speed RAM memory, and may further include a non-volatile memory (non-volatile memory) such as at least one disk memory.

The processor 1102 executes the program stored in the memory 1103, and is specifically configured to execute the following operations:

obtaining a to-be-transmitted data sequence, where the data sequence includes 2*M*N pieces of data;

determining a first data matrix, a second data matrix, a third data matrix, and a fourth data matrix according to the data sequence, where the first data matrix includes M*N pieces of data in the data sequence or data obtained by multiplying data in a first group of specified positions of M*N pieces of data by −1, the third data matrix includes other M*N pieces of data in the data sequence or data obtained by multiplying data in a second group of specified positions of other M*N pieces of data by −1, the second data matrix is equal to a data matrix obtained by arranging the third data matrix in reversed order of columns and multiplying all data by −1, and the fourth data matrix is equal to a data matrix obtained by arranging the first data matrix in reversed order of columns;

mapping the first data matrix onto N consecutive symbols*M consecutive subcarriers on a first antenna, mapping the second data matrix onto N consecutive symbols*M consecutive subcarriers on the first antenna, where the N consecutive symbols are in a time domain adjacent to the first data matrix, and the M consecutive subcarriers are in a same frequency domain position as the first data matrix, mapping the third data matrix onto a same time-frequency position as the first data matrix on a second antenna, and mapping the fourth data matrix onto a same time-frequency position as the second data matrix on the second antenna;

separately generating FBMC signals of the first antenna and the second antenna according to the mapped data matrices; and transmitting the FBMC signals of the first antenna and the second antenna by using the transmitter 1101.

The method executed by the transmit end apparatus (such as a base station) disclosed in any embodiment in FIG. 3 and the specific embodiment 4 of the present invention may be applicable to the processor 1102 or may be implemented by the processor 1102. The processor 1102 may be an integrated circuit chip with a signal processing capability. In an implementation process, the steps of the method may be implemented by an integrated logical circuit of hardware in the processor 1102, or by a software instruction. The processor 1102 may be a general processor, including a central processing unit (central processing unit, CPU for short), a network processor (network processor, NP for short), and the like; or may be a digital signal processor (DSP), an application-specific integrated circuit (ASIC), a field programmable gate array (FPGA) or another programmable logical device, a discrete gate or a transistor logical device, or a discrete hardware component. The processor 1102 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1103, and the processor 1102 reads information in the memory 1103 and implements, in combination with its hardware, the steps of the foregoing methods.

In this embodiment of the present invention, the transmit end apparatus 1100 combines the FBMC technology with Alamouti encoding according to a specific data encoding manner, and encodes to-be-transmitted data and then transmits the data, which almost completely eliminates impact of imaginary part interference without using a guard interval, and improves system performance.

Optionally, all the 2*M*N pieces of data are pure-real-number data, or all are pure-imaginary-number data.

Optionally, in an embodiment, the 2*M*N pieces of data include $a_{i,j}$, 1≤i≤M, 1≤j≤N and $b_{k,l}$, 1≤k≤M, 1≤l≤N;

the first data matrix is $$\begin{bmatrix} a_{1,1} & a_{1,2} & \cdots & a_{1,N} \\ a_{2,1} & a_{2,2} & \cdots & a_{2,N} \\ \cdots & \cdots & \cdots & \cdots \\ a_{M,1} & a_{M,2} & \cdots & a_{M,N} \end{bmatrix};$$

the second data matrix is $$\begin{bmatrix} -b_{1,N} & \ldots & -b_{1,2} & -b_{1,1} \\ -b_{2,N} & \ldots & -b_{2,2} & -b_{2,1} \\ \ldots & \ldots & \ldots & \ldots \\ -b_{M,N} & \ldots & -b_{M,2} & -b_{M,1} \end{bmatrix};$$

the third data matrix is $$\begin{bmatrix} b_{1,1} & b_{1,2} & \ldots & b_{1,N} \\ b_{2,1} & b_{2,2} & \ldots & b_{2,N} \\ \ldots & \ldots & \ldots & \ldots \\ b_{M,1} & b_{M,2} & \ldots & b_{M,N} \end{bmatrix};$$

and
the fourth data matrix is $$\begin{bmatrix} a_{1,N} & \ldots & a_{1,2} & a_{1,1} \\ a_{2,1} & \ldots & a_{2,2} & a_{2,N} \\ \ldots & \ldots & \ldots & \ldots \\ a_{M,N} & \ldots & a_{M,2} & a_{M,1} \end{bmatrix}.$$

The transmit end apparatus 1100 may further execute the method in FIG. 3, and have functions of the transmit end apparatus (such as a base station) in the embodiment shown in FIG. 3 and the specific embodiment 4 of the present invention, and details are not described herein again in this embodiment of the present invention.

Figure 12:
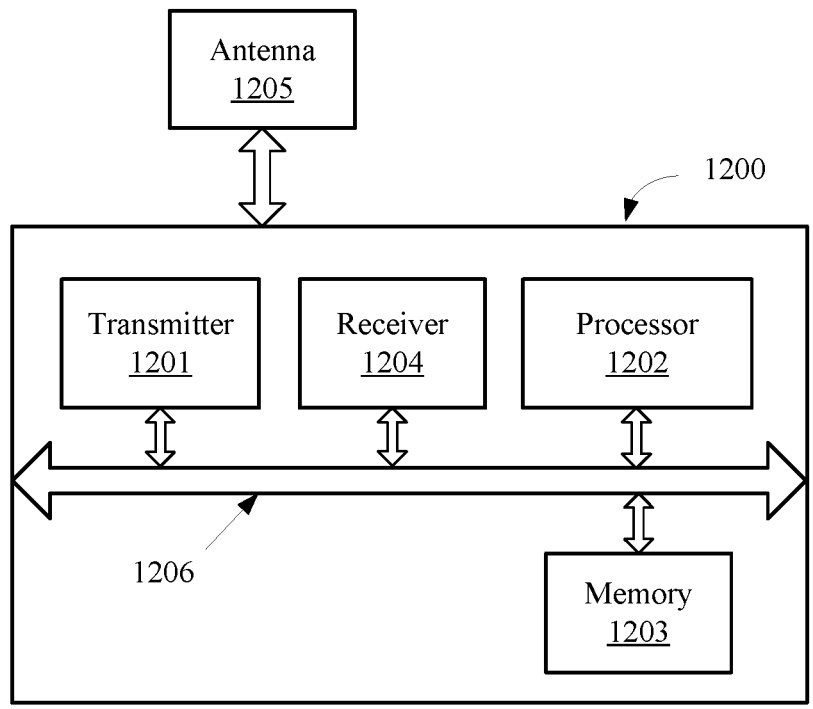
FIG. 12 is another schematic structural diagram of a receive end apparatus according to an embodiment of the present invention.

FIG. 12 is a schematic structural diagram of a receive end apparatus 1200 according to an embodiment of the present invention. The receive end apparatus 1200 may include a processor 1202, a memory 1203, a transmitter 1201, and a receiver 1204. In specific application, the receive end apparatus 600 may be a radio access device such as a base station; or may be user equipment of a terminal such as a mobile phone.

The receiver 1204, the transmitter 1201, the processor 1202, and the memory 1203 are connected to each other by using a bus 1206 system. The bus 1206 may be an ISA bus, a PCI bus, or an EISA bus, or the like. The bus may be classified into an address bus, a data bus, a control bus, and the like. For ease of denoting, FIG. 12 uses only one bidirectional arrow to denote the bus, but it does not mean that there is only one bus or only one type of bus. In specific application, the transmitter 1201 and the receiver 1204 may be coupled to an antenna 1205.

The memory 1203 is configured to store a program. Specifically, the program may include program code, and the program code includes a computer operation instruction. The memory 1203 may include a read-only memory and a random access memory, and provides an instruction and data to the processor 1202. The memory 1203 may include a high-speed RAM memory, and may further include a non-volatile memory (non-volatile memory) such as at least one disk memory.

The processor 1202 executes the program stored in the memory 1203, and is specifically configured to execute the following operations:

receiving, by using the receiver 1204, transmit diversity signals transmitted by a transmit end, where the transmit diversity signals at the transmit end include a first FBMC signal transmitted by a first antenna of the transmit end and a second FBMC signal transmitted by a second antenna of the transmit end, the first FBMC signal and the second FBMC signal are respectively generated from data matrices mapped onto the first antenna and data matrices mapped onto the second antenna, a first data matrix is mapped onto N consecutive symbols*M consecutive subcarriers on the first antenna, a second data matrix is mapped onto N consecutive symbols*M consecutive subcarriers on the first antenna, where the M consecutive subcarriers are in a frequency domain adjacent to the first data matrix, and the N consecutive symbols are in a same time domain position as the first data matrix, a third data matrix is mapped onto a same time-frequency position as the first data matrix on the second antenna, and a fourth data matrix is mapped onto a same time-frequency position as the second data matrix on the second antenna, the first data matrix is equal to an M rows*N columns data matrix generated from M*N pieces of data in a to-be-transmitted data sequence of the transmit end or a data matrix obtained by multiplying data in a first group of specified positions in M rows*N columns positions of an M rows*N columns data matrix generated from M*N pieces of data by −1, the third data matrix is equal to an M rows*N columns data matrix generated from other M*N pieces of data in the data sequence or a data matrix obtained by multiplying data in a second group of specified positions in M rows*N columns positions of an M rows*N columns data matrix generated from other M*N pieces of data by −1, the data sequence includes 2*M*N pieces of data, the second data matrix is equal to a data matrix obtained by arranging the third data matrix in reversed order of columns and multiplying all data by −1, and the fourth data matrix is equal to a data matrix obtained by arranging the first data matrix in reversed order of columns;

performing a filter bank-based multi carrier FBMC signal demodulation operation on the transmit diversity signals to obtain a first signal; and performing a decoding operation on the first signal according to Alamouti encoding to obtain a second signal, and according to the second signal, performing an interference cancellation operation on data on two adjacent subcarriers of the first data matrix and the second data matrix, and performing an interference cancellation operation on data on two adjacent subcarriers of the third data matrix and the fourth data matrix, to obtain an estimated value of the data sequence.

The method executed by the receive end apparatus (such as user equipment) disclosed in any embodiment in FIG. 4 and the specific embodiment 5 of the present invention may be applicable to the processor 1202 or may be implemented by the processor 1202. The processor 1202 may be an integrated circuit chip with a signal processing capability. In an implementation process, the steps of the method may be implemented by an integrated logical circuit of hardware in the processor 1202, or by a software instruction. The processor 1202 may be a general processor, including a central processing unit (central processing unit, CPU for short), a network processor (network processor, NP for short), and the like; or may be a digital signal processor (DSP), an application-specific integrated circuit (ASIC), a field programmable gate array (FPGA) or another programmable logical device, a discrete gate or a transistor logical device, or a discrete hardware component. The processor 1202 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1203, and the processor 1202 reads information in the memory 1203 and implements, in combination with its hardware, the steps of the foregoing methods.

In this embodiment of the present invention, the receive end apparatus 1200 decodes received data in an Alamouti manner according to a specific data encoding manner, and performs an interference cancellation operation on signals received on two adjacent subcarriers of data matrices on a receive antenna, which almost completely eliminates impact of imaginary part interference without using a guard interval, and improves system performance.

Optionally, all the 2*M*N pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$$A=(C^H C)^{-1} C^H R, \text{ where}$$

$R=[\text{Re}(R_{M,1}^{eq}), \text{Re}(R_{M,2}^{eq}), \ldots, \text{Re}(R_{M,2N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,2N}^{eq})]^T$ when the data sequence includes no pure real number, and
$C=\text{diag}(|H_1|^2+|H_2|^2, |H_1|^2+|H_2|^2, \ldots, |H_1|^2+|H_2|^2)+D_{kM \times kM}$, where an element in the $(km+n-N)^{th}$ row and the $(k(m+p)+N+1-n-q)^{th}$ column of $D_{kM \times kM}$ is $2 \times (-1)^{p(2N+1-n)+1} c_{p,q}(H_1)^* H_2$, and remaining elements are 0s, where $c_{p,q}$ is a pure imaginary number and denotes an imaginary part interference coefficient caused by data in a time-frequency point (m+p, n+q) position to data in a time-frequency point (m, n) position, $m \in [1,M]$, $n \in [N-k+1,N]$, $p \in [-1,1]$, $q \in [-k,n-N-1]$, $H_1$ denotes a channel frequency response obtained when a signal transmitted by the first antenna at the transmit end reaches a receive end, $H_2$ denotes a channel frequency response obtained when a signal transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{M,n}^{eq} = (H_1)^* R_{m,n} + H_2 R_{m,2N+1-n}^*$$
$$= (|H_1|^2 + |H_2|^2) a_{m,n} + (|H_1|^2 + |H_2|^2)(ja_{m,n}^1) +$$
$$(|H_1|^2 - |H_2|^2)(ja_{m,n}^2) + 2(H_1)^* H_2 (jb_{m,n}^2),$$

where $R_{M,n}$ denotes the data received on the $M^{th}$ subcarrier and the $n^{th}$ symbol, $n=1, 2 \ldots, 2N$, and the $M^{th}$ subcarrier is one of adjacent subcarriers in the first data matrix and the second data matrix.

The receive end apparatus 1200 may further execute the method in FIG. 4, and have functions of the receive end apparatus (such as user equipment) in the embodiment shown in FIG. 4 and the specific embodiment 5 of the present invention, and details are not described herein again in this embodiment of the present invention.

Figure 13:
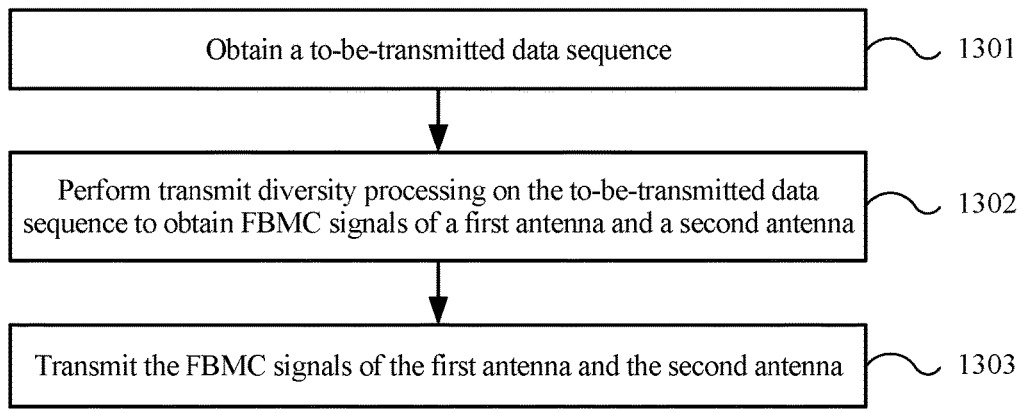
FIG. 13 is another flowchart of an FBMC transmit diversity transmission method according to an embodiment of the present invention.

FIG. 13 is a flowchart of an FBMC transmit diversity transmission method according to an embodiment of the present invention. The method in FIG. 13 is executed by an FBMC transmit diversity transmit end apparatus. In specific application, the transmit end apparatus may be a radio access device such as a base station; or may be user equipment of a terminal such as a mobile phone. The method includes the following steps.

1301. Obtain a to-be-transmitted data sequence.

The data sequence includes 2*M*N pieces of data.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

1302. Perform transmit diversity processing on the to-be-transmitted data sequence to obtain FBMC signals of a first antenna and a second antenna.

$$Y=WX.$$

A precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N-1$, the 2*M*N pieces of data of the to-be-transmitted data sequence are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq 2M-1$, and $0 \leq s \leq N-1$.

It should be understood that in this embodiment of the present invention, numbering of both the subcarriers and the symbols starts from 0.

It should be understood that the formula Y=WX in this embodiment of the present invention may have another equivalent substitution. For example, order of rows in $$Y = \begin{bmatrix} y^{(0)}(i, j) \\ y^{(1)}(i, j) \\ y^{(0)}(i+M, j) \\ y^{(1)}(i+M, j) \end{bmatrix}$$

may be adjusted, and order of corresponding rows in W is adjusted accordingly, and a serial number of a row adjusted in W is the same as a serial number of a row adjusted in Y. For example, the first row and the second row in Y are interchanged, and the first row and the second row in W are also interchanged to obtain $$Y = \begin{bmatrix} y^{(1)}(i, j) \\ y^{(0)}(i, j) \\ y^{(0)}(i+M, j) \\ y^{(1)}(i+M, j) \end{bmatrix}, W = \begin{bmatrix} 0 & 1 & 0 & 0 \\ 1 & 0 & 0 & 0 \\ 0 & 0 & 0 & (-1)^{j+1} \\ 0 & 0 & (-1)^{j} & 0 \end{bmatrix},$$

and X remains unchanged. For another example, the first row and the second row in Y are interchanged and then the interchanged second row is exchanged with the third row, and the first row and the second row in W are interchanged and then the interchanged second row is exchanged with the third row to obtain $$Y = \begin{bmatrix} y^{(1)}(i, j) \\ y^{(0)}(i+M, j) \\ y^{(0)}(i, j) \\ y^{(1)}(i+M, j) \end{bmatrix}, \text{ and } W = \begin{bmatrix} 0 & (-1)^{j+1} & 0 & 0 \\ 0 & 0 & 0 & 1 \\ 1 & 0 & 0 & 0 \\ 0 & 0 & (-1)^{j} & 0 \end{bmatrix},$$

and so on. Alternatively, order of rows in $$X = \begin{bmatrix} x^{(0)}(i, j) \\ x^{(1)}(i, j) \\ x^{(0)}(M-i-1, j) \\ x^{(1)}(M-i-1, j) \end{bmatrix}$$

is adjusted, and order of corresponding columns in W is adjusted accordingly, and a serial number of a column adjusted in W is the same as a serial number of a row adjusted in X. For example, the second row and the fourth row in X are interchanged, and the second column and the fourth column in W are interchanged to obtain $$X = \begin{bmatrix} x^{(0)}(i, j) \\ x^{(1)}(M-i-1, j) \\ x^{(0)}(M-i-1, j) \\ x^{(1)}(i, j) \end{bmatrix}, \text{ and } W = \begin{bmatrix} 1 & 0 & 0 & 0 \\ 0 & 0 & (-1)^{j} & 1 \\ 0 & 0 & 0 & (-1)^{j+1} \\ 0 & 1 & 0 & 0 \end{bmatrix},$$

and Y remains unchanged, and so on. Alternatively, order of rows in both $$Y = \begin{bmatrix} y^{(0)}(i, j) \\ y^{(1)}(i, j) \\ y^{(0)}(i+M, j) \\ y^{(1)}(i+M, j) \end{bmatrix} \text{ and } X = \begin{bmatrix} x^{(0)}(i, j) \\ x^{(1)}(i, j) \\ x^{(0)}(M-i-1, j) \\ x^{(1)}(M-i-1, j) \end{bmatrix}$$

is adjusted, and corresponding rows in W are adjusted first in the foregoing manner, and then corresponding columns in W are adjusted; or corresponding columns in W are adjusted first, and then corresponding rows in W are adjusted, which is not limited in this embodiment of the present invention.

1303. Transmit the FBMC signals of the first antenna and the second antenna.

In this embodiment of the present invention, the FBMC technology is combined with Alamouti encoding according to a specific data encoding manner, to-be-transmitted data is encoded and then transmitted, which almost completely eliminates impact of imaginary part interference without using a guard interval, and improves system performance.

In this embodiment of the present invention, transmit diversity processing is performed by using the foregoing formula, so that the FBMC signals of the first antenna and the second antenna are obtained. For a relationship between the FBMC signals of the first antenna and the second antenna and the to-be-transmitted data sequence, reference may be made to the specific embodiment 1 and the specific embodiment 2 of the present invention.

Figure 14:
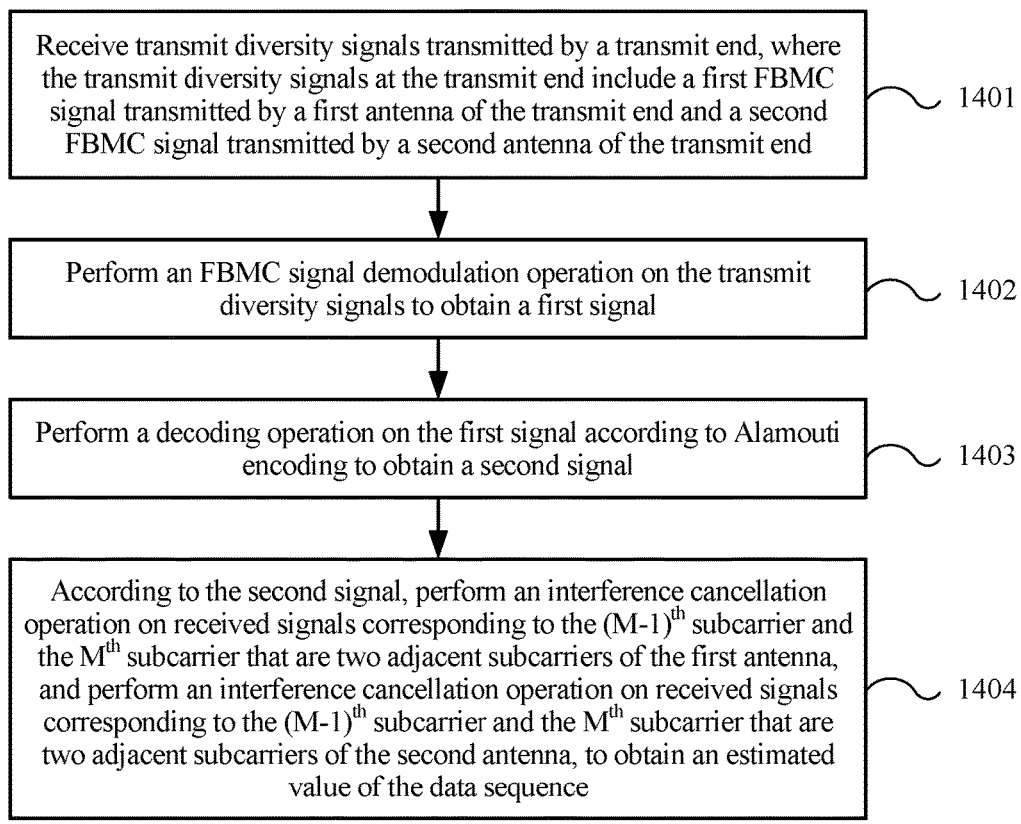
FIG. 14 is another flowchart of an FBMC transmit diversity receiving method according to an embodiment of the present invention.

FIG. 14 is another flowchart of an FBMC transmit diversity receiving method according to an embodiment of the present invention. The method in FIG. 14 is executed by an FBMC transmit diversity receive end apparatus. In specific application, the receive end apparatus may be a radio access device such as a base station; or may be user equipment of a terminal such as a mobile phone. The method includes the following steps.

1401. Receive transmit diversity signals transmitted by a transmit end, where the transmit diversity signals at the transmit end include a first FBMC signal transmitted by a first antenna of the transmit end and a second FBMC signal transmitted by a second antenna of the transmit end.

The transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^{j} & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^{j} & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N-1$, $Y=WX$, $2*M*N$ pieces of data of the data sequence at the transmit end are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq 2M-1$, and $0 \leq s \leq N-1$.

It should be understood that in this embodiment of the present invention, numbering of both the subcarriers and the symbols starts from 0.

It should be understood that if row positions of the matrices Y and X at the transmit end change, the receive end should perform an adaptive adjustment according to the change of the transmit end.

1402. Perform an FBMC signal demodulation operation on the transmit diversity signals to obtain a first signal.

1403. Perform a decoding operation on the first signal according to Alamouti encoding to obtain a second signal.

1404. According to the second signal, perform an interference cancellation operation on received signals corresponding to the $(M-1)^{th}$ subcarrier and the $M^{th}$ subcarrier that are two adjacent subcarriers of the first antenna, and perform an interference cancellation operation on received signals corresponding to the $(M-1)^{th}$ subcarrier and the $M^{th}$ subcarrier that are two adjacent subcarriers of the second antenna, to obtain an estimated value of the data sequence.

In this embodiment of the present invention, received data is decoded in an Alamouti manner according to a specific data encoding manner, and an interference cancellation operation is performed on received signals on a receive antenna that correspond to the $(M-1)^{th}$ subcarrier and the $M^{th}$ subcarrier that are two adjacent subcarriers of the first antenna and the second antenna, which almost completely eliminates impact of imaginary part interference without using a guard interval and improves system performance.

In this embodiment of the present invention, for specific implementation of obtaining the data sequence at the transmit end by decoding according to the FBMC signals of the first antenna and the second antenna, reference may be made to the specific embodiment 3 of the present invention.

Figure 15:
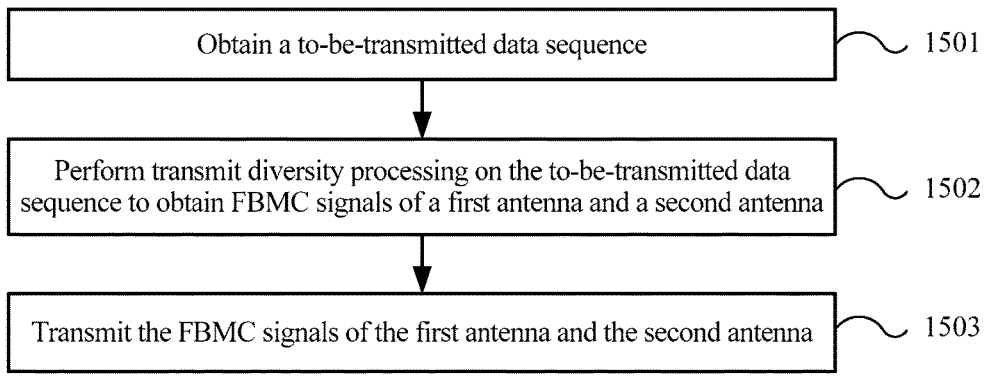
FIG. 15 is another flowchart of an FBMC transmit diversity transmission method according to an embodiment of the present invention.

FIG. 15 is a flowchart of an FBMC transmit diversity transmission method according to an embodiment of the present invention. The method in FIG. 15 is executed by an FBMC transmit diversity transmit end apparatus. In specific application, the transmit end apparatus may be a radio access device such as a base station; or may be user equipment of a terminal such as a mobile phone. The method includes the following steps

1501. Obtain a to-be-transmitted data sequence.

The data sequence includes $2*M*N$ pieces of data.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

1502. Perform transmit diversity processing on the to-be-transmitted data sequence to obtain FBMC signals of a first antenna and a second antenna.

$Y=WX$.

A precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \leq i \leq M-1$, $0 \leq j \leq N-1$, the $2*M*N$ pieces of data of the to-be-transmitted data sequence are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq M-1$, and $0 \leq s \leq 2N-1$.

It should be understood that in this embodiment of the present invention, numbering of both the subcarriers and the symbols starts from 0.

It should be understood that the formula $Y=WX$ in this embodiment of the present invention may have another equivalent substitution. For example, order of rows in $$Y = \begin{bmatrix} y^{(0)}(i,j) \\ y^{(1)}(i,j) \\ y^{(0)}(i,j+N) \\ y^{(1)}(i,j+N) \end{bmatrix}$$

may be adjusted, and order of corresponding rows in W is adjusted accordingly, and a serial number of a row adjusted in W is the same as a serial number of a row adjusted in Y. For example, the first row and the second row in Y are interchanged, and the first row and the second row in W are also interchanged to obtain $$Y = \begin{bmatrix} y^{(1)}(i,j) \\ y^{(0)}(i,j) \\ y^{(0)}(i,j+N) \\ y^{(1)}(i,j+N) \end{bmatrix}, \text{ and } W = \begin{bmatrix} 0 & 1 & 0 & 0 \\ 1 & 0 & 0 & 0 \\ 0 & 0 & 0 & (-1)^{j+1} \\ 0 & 0 & (-1)^{j} & 0 \end{bmatrix},$$

and X remains unchanged. For another example, the first row and the second row in Y are interchanged and then the interchanged second row is exchanged with the third row, and the first row and the second row in W are interchanged and then the interchanged second row is exchanged with the third row to obtain $$Y = \begin{bmatrix} y^{(1)}(i,j) \\ y^{(0)}(i,j+N) \\ y^{(0)}(i,j) \\ y^{(1)}(i,j+N) \end{bmatrix}, \text{ and } W = \begin{bmatrix} 0 & (-1)^{j+1} & 0 & 0 \\ 0 & 0 & 0 & 1 \\ 1 & 0 & 0 & 0 \\ 0 & 0 & (-1)^{j} & 0 \end{bmatrix},$$

X remains unchanged, and so on. Alternatively, order of rows in $$X = \begin{bmatrix} x^{(0)}(i,j) \\ x^{(1)}(i,j) \\ x^{(0)}(i,N-j-1) \\ x^{(1)}(i,N-j-1) \end{bmatrix}$$

is adjusted, and order of corresponding columns in W is adjusted accordingly, and a serial number of a column adjusted in W is the same as a serial number of a row adjusted in X. For example, the second row and the fourth row in X are interchanged, and the second column and the fourth column in W are interchanged to obtain such as $$X = \begin{bmatrix} x^{(0)}(i,j) \\ x^{(1)}(i,N-j-1) \\ x^{(0)}(i,N-j-1) \\ x^{(1)}(i,j) \end{bmatrix} \text{ and } W = \begin{bmatrix} 1 & 0 & 0 & 0 \\ 0 & 0 & 0 & 1 \\ 0 & -1 & 0 & 0 \\ 0 & 0 & 1 & 0 \end{bmatrix},$$

and Y remains unchanged, and so on. Alternatively, order of rows in both $$Y = \begin{bmatrix} y^{(0)}(i,j) \\ y^{(1)}(i,j) \\ y^{(0)}(i+M,j) \\ y^{(1)}(i+M,j) \end{bmatrix} \text{ and } X = \begin{bmatrix} x^{(0)}(i,j) \\ x^{(1)}(i,j) \\ x^{(0)}(i,N-j-1) \\ x^{(1)}(i,N-j-1) \end{bmatrix}$$

is adjusted, and corresponding rows in W are adjusted first in the foregoing manner, and then corresponding columns in W are adjusted; or corresponding columns in W are adjusted first, and then corresponding rows in W are adjusted, which is not limited in this embodiment of the present invention.

1503. Transmit the FBMC signals of the first antenna and the second antenna.

In this embodiment of the present invention, the FBMC technology is combined with Alamouti encoding according to a specific data encoding manner, to-be-transmitted data is encoded and then transmitted, which almost completely eliminates impact of imaginary part interference without using a guard interval, and improves system performance.

In this embodiment of the present invention, transmit diversity processing is performed by using the foregoing formula, so that the FBMC signals of the first antenna and the second antenna are obtained. For a relationship between the FBMC signals of the first antenna and the second antenna and the to-be-transmitted data sequence, reference may be made to the specific embodiment 4 of the present invention.

Figure 16:
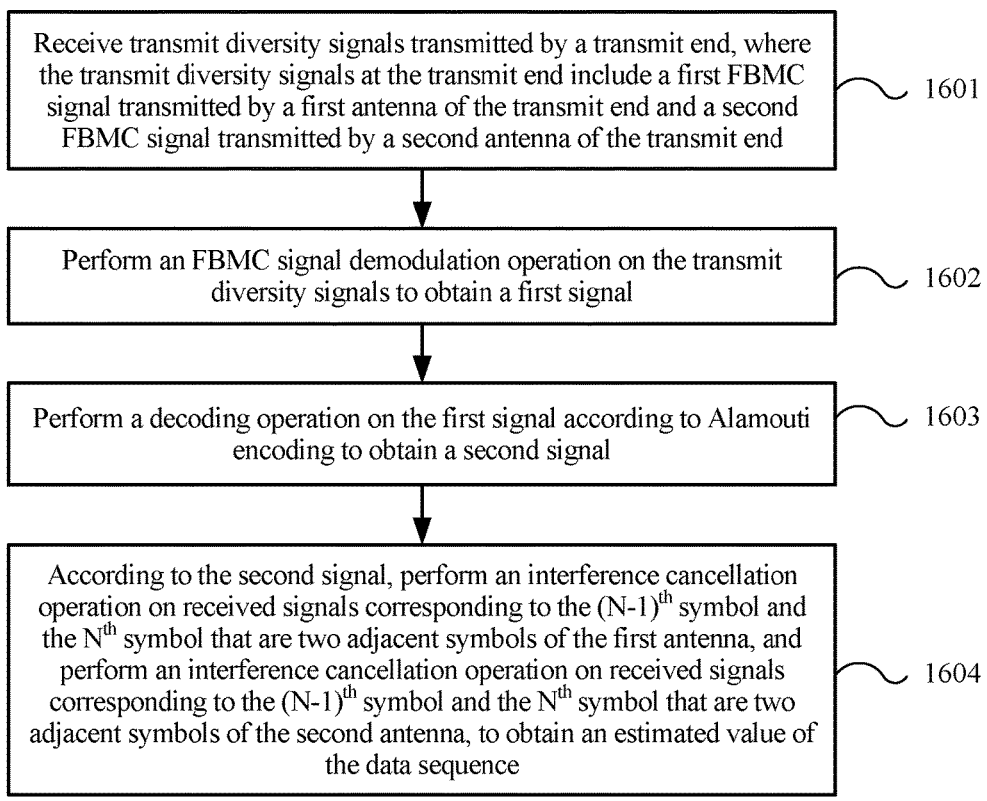
FIG. 16 is another flowchart of an FBMC transmit diversity receiving method according to an embodiment of the present invention.

FIG. 16 is another flowchart of an FBMC transmit diversity receiving method according to an embodiment of the present invention. The method in FIG. 16 is executed by an FBMC transmit diversity receive end apparatus. In specific application, the receive end apparatus may be a radio access device such as a base station; or may be user equipment of a terminal such as a mobile phone. The method includes the following steps.

1601. Receive transmit diversity signals transmitted by a transmit end, where the transmit diversity signals at the transmit end include a first FBMC signal transmitted by a first antenna of the transmit end and a second FBMC signal transmitted by a second antenna of the transmit end.

The transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the first FBMC signal and the second FBMC signal is $$Y = \begin{bmatrix} y^{(0)}(i,j) \\ y^{(1)}(i,j) \\ y^{(0)}(i,j+N) \\ y^{(1)}(i,j+N) \end{bmatrix},$$

a matrix that includes the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, $Y=WX$, $2*M*N$ pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ sub carrier and an $s^{th}$ symbol are denoted by $y^{(0)}(r,s)$ and $y^{(1)}(r,s)$ respectively, $0 \le r \le M-1$, and $0 \le s \le 2N-1$.

It should be understood that in this embodiment of the present invention, numbering of both the subcarriers and the symbols starts from 0.

It should be understood that if row positions of the matrices Y and X at the transmit end change, the receive end should perform an adaptive adjustment according to the change of the transmit end.

1602. Perform an FBMC signal demodulation operation on the transmit diversity signals to obtain a first signal.

1603. Perform a decoding operation on the first signal according to Alamouti encoding to obtain a second signal.

1604. According to the second signal, perform an interference cancellation operation on received signals corresponding to the $(N-1)^{th}$ symbol and the $N^{th}$ symbol that are two adjacent symbols of the first antenna, and perform an interference cancellation operation on received signals corresponding to the $(N-1)^{th}$ symbol and the $N^{th}$ symbol that are two adjacent symbols of the second antenna, to obtain an estimated value of the data sequence.

In this embodiment of the present invention, received data is decoded in an Alamouti manner according to a specific data encoding manner, and an interference cancellation operation is performed on received signals on a receive antenna that correspond to the $(N-1)^{th}$ symbol and the $N^{th}$ symbol that are two adjacent symbols of the first antenna and the second antenna, which almost completely eliminates impact of imaginary part interference without using a guard interval and improves system performance.

In this embodiment of the present invention, for specific implementation of obtaining the data sequence at the transmit end by decoding according to the FBMC signals of the first antenna and the second antenna, reference may be made to the specific embodiment 5 of the present invention.

Figure 17:
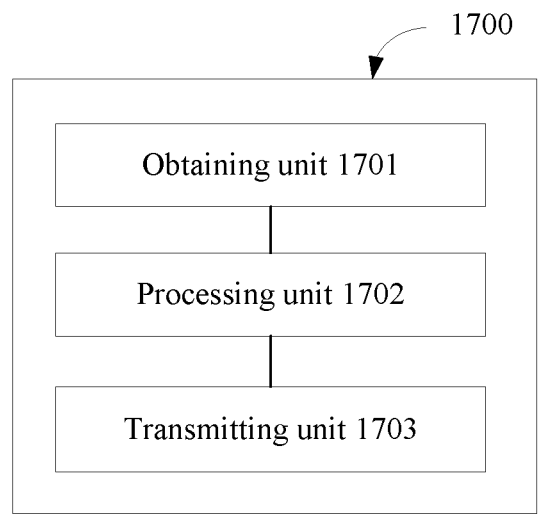
FIG. 17 is another schematic structural diagram of a transmit end apparatus according to an embodiment of the present invention.

FIG. 17 is a schematic structural diagram of a transmit end apparatus 1700 according to an embodiment of the present invention. The transmit end apparatus 1700 may include: an obtaining unit 1701, a processing unit 1702, and a transmitting unit 1703. In specific application, the transmit end apparatus 1700 may be a radio access device such as a base station; or may be user equipment of a terminal such as a mobile phone.

The obtaining unit 1701 is configured to obtain a to-be-transmitted data sequence, where the to-be-transmitted data sequence includes $2*M*N$ pieces of data.

The processing unit 1702 is configured to perform transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^{j} & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^{j} & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \le i \le M-1$, $0 \le j \le N-1$, $Y=WX$, the $2*M*N$ pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \le r \le 2M-1$, and $0 \le s \le N-1$.

It should be understood that in this embodiment of the present invention, numbering of both the subcarriers and the symbols starts from 0.

The transmitting unit 1703 is configured to transmit the FBMC signals of the first antenna and the second antenna.

In this embodiment of the present invention, the transmit end apparatus 1700 combines the FBMC technology with Alamouti encoding according to a specific data encoding manner, and encodes to-be-transmitted data and then transmits the data, which almost completely eliminates impact of imaginary part interference without using a guard interval, and improves system performance.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

The transmit end apparatus 1700 may further execute the method in FIG. 13, and have functions of the transmit end apparatus (such as a base station) in the embodiment shown in FIG. 13 and the specific embodiments 1 and 2 of the present invention, and details are not described herein again in this embodiment of the present invention.

Figure 18:
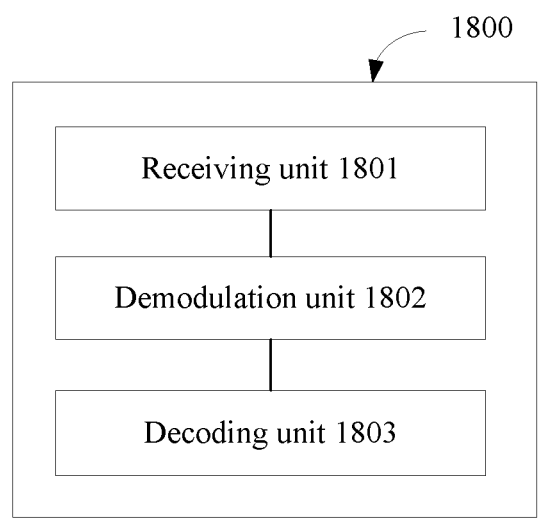
FIG. 18 is another schematic structural diagram of a receive end apparatus according to an embodiment of the present invention.

FIG. 18 is a schematic structural diagram of a receive end apparatus 1800 according to an embodiment of the present invention. The receive end apparatus 1800 may include: a receiving unit 1801, a demodulation unit 1802, and a decoding unit 1803. In specific application, the receive end apparatus 1800 may be a radio access device such as a base station; or may be user equipment of a terminal such as a mobile phone.

The receiving unit 1801 is configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N-1$, $Y=WX$, $2*M*N$ pieces of data of the data sequence at the transmit end are denoted by $x^{(0)}(k,l)$ and $x^{(1)}(k,l)$ $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq 2M-1$, and $0 \leq s \leq N-1$.

It should be understood that in this embodiment of the present invention, numbering of both the subcarriers and the symbols starts from 0.

The demodulation unit 1802 is configured to perform an FBMC signal demodulation operation on the transmit diversity signals to obtain a first signal.

The decoding unit 1803 is configured to: perform a decoding operation on the first signal according to Alamouti encoding to obtain a second signal; and according to the second signal, perform an interference cancellation operation on received signals corresponding to the $(M-1)^{th}$ subcarrier and the $M^{th}$ subcarrier that are two adjacent subcarriers of the first antenna, and perform an interference cancellation operation on received signals corresponding to the $(M-1)^{th}$ subcarrier and the $M^{th}$ subcarrier that are two adjacent subcarriers of the second antenna, to obtain an estimated value of the data sequence.

In this embodiment of the present invention, the receive end apparatus 1800 decodes received data in an Alamouti manner according to a specific data encoding manner, and performs an interference cancellation operation on received signals on a receive antenna that correspond to the $(M-1)^{th}$ subcarrier and the $M^{th}$ subcarrier that are two adjacent subcarriers of the first antenna and the second antenna, which almost completely eliminates impact of imaginary part interference without using a guard interval and improves system performance.

Optionally, all the $2*M*N$ pieces of data are pure-real-number data, or all are pure-imaginary-number data.

Optionally, in an embodiment of the present invention, data on the $M^{th}$ subcarrier is $A=[a_{M,1}, a_{M,2}, \ldots a_{M,2N}]^T$, which meets the following formula:

$A=(C^HC)^{-1}C^HR$, where $R=[\text{Re}(R_{M,1}^{eq}), \text{Re}(R_{M,2}^{eq}), \ldots, \text{Re}(R_{M,N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,N}^{eq})]^T$ when the data sequence includes no pure real number, and $$C = \begin{bmatrix} \Lambda & d_1 & \ldots & d_k & & & & \\ & \ddots & & & & & & \\ d_{-k} & \ldots & d_{-1} & \Lambda & d_1 & \ldots & d_k & \\ & d_{-k} & \ldots & d_{-1} & \Lambda & d_1 & \ldots & d_k \\ & & d_{-k} & \ldots & d_{-1} & \Lambda & d_1 & \ldots & d_k \\ & & & & & & \ddots & \\ & & & & d_{-k} & \ldots & d_{-1} & \Lambda \end{bmatrix}_{N \times N},$$

where $\Lambda=|H_M^1|^2+|H_M^2|^2+d_0$, $H_M^1$ denotes a channel frequency domain response obtained when a channel transmitted by the first antenna at the transmit end reaches a receive end, $H_M^2$ denotes a channel frequency domain response obtained when a channel transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{M,n}^{eq} = (H_M^1)^* R_{M,n} + H_M^2 R_{M+1,n}^*$$
$$= (|H_M^1|^2 + |H_M^2|^2)a_{M,n} + (|H_M^1|^2 + |H_M^2|^2)(ja_{M,n}^1) +$$
$$(|H_M^1|^2 - |H_M^2|^2)(ja_{M,n}^2) + 2(H_M^1)^* H_M^2 (jb_{M,n}^2),$$

where $R_{M,n}$ denotes data received on the $M^{th}$ subcarrier and the $n^{th}$ symbol, $n=1, 2 \ldots, 2N$.

The receive end apparatus 1800 may further execute the method in FIG. 14, and have functions of the receive end apparatus (such as user equipment) in the embodiment shown in FIG. 14 and the specific embodiment 3 of the present invention, and details are not described herein again in this embodiment of the present invention.

Figure 19:
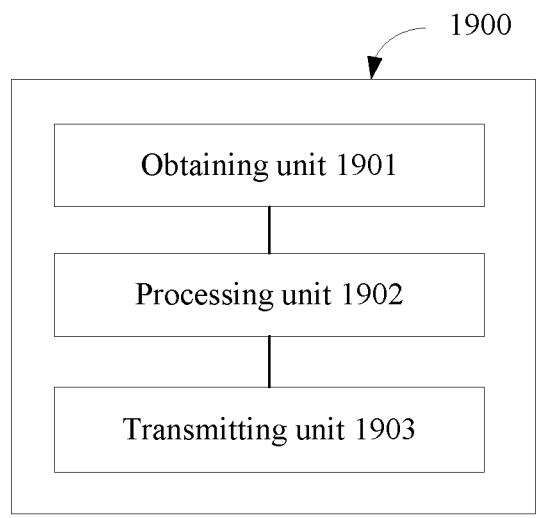
FIG. 19 is another schematic structural diagram of a transmit end apparatus according to an embodiment of the present invention.

FIG. 19 is a schematic structural diagram of a transmit end apparatus 1900 according to an embodiment of the present invention. The transmit end apparatus 1900 may include: an obtaining unit 1901, a processing unit 1902, and a transmitting unit 1903. In specific application, the transmit end apparatus 1900 may be a radio access device such as a base station; or may be user equipment of a terminal such as a mobile phone.

The obtaining unit 1901 is configured to obtain a to-be-transmitted data sequence, where the data sequence includes 2*M*N pieces of data.

The processing unit 1902 is configured to perform transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, Y=WX, the 2*M*N pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \le r \le M-1$, and $0 \le s \le 2N-1$.

It should be understood that in this embodiment of the present invention, numbering of both the subcarriers and the symbols starts from 0.

The transmitting unit 1903 is configured to transmit the FBMC signals of the first antenna and the second antenna.

In this embodiment of the present invention, the transmit end apparatus 1900 combines the FBMC technology with Alamouti encoding according to a specific data encoding manner, and encodes to-be-transmitted data and then transmits the data, which almost completely eliminates impact of imaginary part interference without using a guard interval, and improves system performance.

Optionally, all the 2*M*N pieces of data are pure-real-number data, or all are pure-imaginary-number data.

The transmit end apparatus 1900 may further execute the method in FIG. 15, and have functions of the transmit end apparatus (such as a base station) in the embodiment shown in FIG. 15 and the specific embodiment 4 of the present invention, and details are not described herein again in this embodiment of the present invention.

Figure 20:
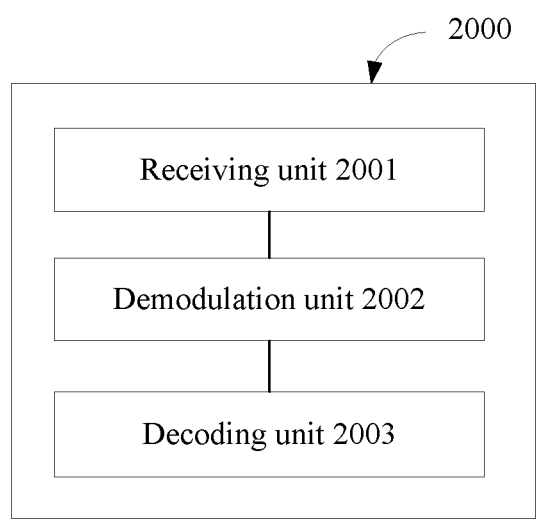
FIG. 20 is another schematic structural diagram of a receive end apparatus according to an embodiment of the present invention.

FIG. 20 is a schematic structural diagram of a receive end apparatus 2000 according to an embodiment of the present invention. The receive end apparatus 2000 may include: a receiving unit 2001, a demodulation unit 2002, and a decoding unit 2003. In specific application, the receive end apparatus 2000 may be a radio access device such as a base station; or may be user equipment of a terminal such as a mobile phone.

The receiving unit 2001 is configured to receive transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, Y=WX, 2*M*N pieces of data of the data sequence at the transmit end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \le r \le M-1$, and $0 \le s \le 2N-1$.

The demodulation unit 2002 is configured to perform an FBMC signal demodulation operation on the transmit diversity signals to obtain a first signal.

The decoding unit 2003 is configured to: perform a decoding operation on the first signal according to Alamouti encoding to obtain a second signal; and according to the second signal, perform an interference cancellation operation on received signals corresponding to the $(N-1)^{th}$ symbol and the $N^{th}$ symbol that are two adjacent symbols of the first antenna, and perform an interference cancellation operation on received signals corresponding to the $(N-1)^{th}$ symbol and the $N^{th}$ symbol that are two adjacent symbols of the second antenna, to obtain an estimated value of the data sequence.

It should be understood that in this embodiment of the present invention, numbering of both the subcarriers and the symbols starts from 0.

In this embodiment of the present invention, the receive end apparatus 2000 decodes received data in an Alamouti manner according to a specific data encoding manner, and performs an interference cancellation operation on received signals on a receive antenna that correspond to the $(N-1)^{th}$ symbol and the $N^{th}$ symbol that are two adjacent symbols of the first antenna and the second antenna, which almost completely eliminates impact of imaginary part interference without using a guard interval and improves system performance.

Optionally, all the 2*M*N pieces of data are pure-real-number data, or all are pure-imaginary-number data.

Optionally, in an embodiment of the present invention, data on the $M^{th}$ subcarrier is, $A=[a_{M,1}, a_{M,2}, \ldots, a_{M,2N}]^T$, which meets the following formula:

$$A=(C^H C)^{-1} C^H R, \text{ where}$$

$R=[\text{Re}(R_{M,1}^{eq}), \text{Re}(R_{M,2}^{eq}), \ldots, \text{Re}(R_{M,2N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,2N}^{eq})]^T$ when the data sequence includes no pure real number, and $c=\text{diag}(|H_1|^2+|H_2|^2, |H_1|^2+|H_2|^2, \ldots, |H_1|^2+|H_2|^2)+ D_{kM \times kM}$, where an element in the $(km+n-N)^{th}$ row and the $(k(m+p)+N+1-n-q)^{th}$ column of $D_{kM \times kM}$ is $2 \times (-1)^{p(2N+1-n)+1} c_{p,q}(H_1)^* H_2$, and remaining elements are 0s, where $c_{p,q}$ is a pure imaginary number and denotes an imaginary part interference coefficient caused by data in a time-frequency point (m+p, n+q) position to data in a time-frequency point (m, n) position $m \in [1,M]$, $n \in [N-k+1, N]$, $p \in [-1,1]$, $q \in [-k, n-N-1]$, $H_1$ denotes a channel frequency response obtained when a signal transmitted by the first antenna at the transmit end reaches a receive end, $H_2$ denotes a channel frequency response obtained when a signal transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{m,n}^{eq} = (H_1)^* R_{m,n} + H_2 R_{m,2N+1-n}^*$$
$$= (|H_1|^2 + |H_2|^2) a_{m,n} + (|H_1|^2 + |H_2|^2)(ja_{m,n}^1) +$$
$$(|H_1|^2 - |H_2|^2)(ja_{m,n}^2) + 2(H_1)^* H_2 (jb_{m,n}^2),$$

where $R_{M,n}$ denotes data received on the $M^{th}$ subcarrier and the $n^{th}$ symbol, n=1, 2 ..., 2N.

The receive end apparatus 2000 may further execute the method in FIG. 16, and have functions of the receive end apparatus (such as user equipment) in the embodiment shown in FIG. 16 and the specific embodiment 5 of the present invention, and details are not described herein again in this embodiment of the present invention.

Figure 21:
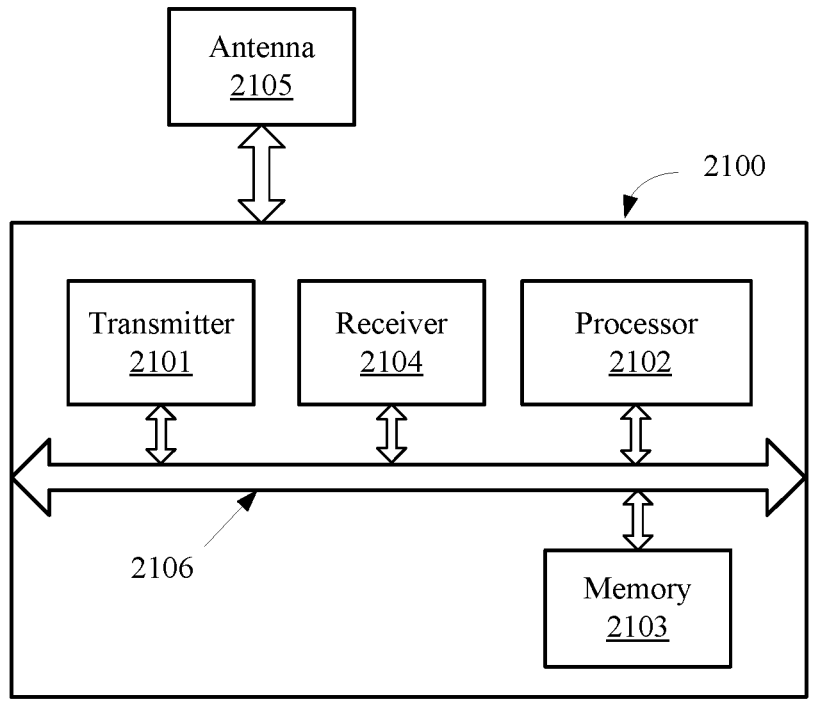
FIG. 21 is another schematic structural diagram of a transmit end apparatus according to an embodiment of the present invention.

FIG. 21 is a schematic structural diagram of a transmit end apparatus 2100 according to an embodiment of the present invention. The transmit end apparatus 2100 may include a processor 2102, a memory 2103, a transmitter 2101, and a receiver 2104. In specific application, the transmit end apparatus 2100 may be a radio access device such as a base station; or may be user equipment of a terminal such as a mobile phone.

The receiver 2104, the transmitter 2101, the processor 2102, and the memory 2103 are connected to each other by using a bus 2106 system. The bus 2106 may be an ISA bus, a PCI bus, an EISA bus, or the like. The bus may be classified into an address bus, a data bus, a control bus, and the like. For ease of denoting, FIG. 21 uses only one bidirectional arrow to denote the bus, but it does not mean that there is only one bus or only one type of bus. In specific application, the transmitter 2101 and the receiver 2104 may be coupled to an antenna 2105.

The memory 2103 is configured to store a program. Specifically, the program may include program code, and the program code includes a computer operation instruction. The memory 2103 may include a read-only memory and a random access memory, and provides an instruction and data to the processor 2102. The memory 2103 may include a high-speed RAM memory, and may further include a non-volatile memory (non-volatile memory), such as at least one magnetic disk memory.

The processor 2102 executes the program stored in the memory 2103, and is specifically configured to execute the following operations:

obtaining a to-be-transmitted data sequence, where the to-be-transmitted data sequence includes 2*M*N pieces of data;

performing transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or }$$

$$W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N-1$, Y=WX, the 2*M*N pieces of data of the to-be-transmitted data sequence are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq 2M-1$, and $0 \leq s \leq N-1$; and transmitting the FBMC signals of the first antenna and the second antenna by using the transmitter 2101.

The method executed by the transmit end apparatus (such as a base station) disclosed in any embodiment in FIG. 13 and the specific embodiments 1 and 2 of the present invention may be applicable to the processor 2102 or may be implemented by the processor 2102. The processor 2102 may be an integrated circuit chip and has a signal processing capability. In an implementation process, the steps of the method may be implemented by an integrated logical circuit of hardware in the processor 2102, or by a software instruction. The processor 2102 may be a general purpose processor, including a central processing unit (Central Processing Unit, CPU for short), a network processor (Network Processor, NP for short), and the like, or may also be a digital signal processor (DSP), an application-specific integrated circuit (ASIC), a field programmable gate array (FPGA) or another programmable logic device, discrete gate or transistor logic device, or discrete hardware component. The processor 2102 may implement or execute methods, steps and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 2103, and the processor 2102 reads information in the memory 2103 and completes the steps in the foregoing methods in combination with hardware of the processor 2102.

In this embodiment of the present invention, the transmit end apparatus 2100 combines the FBMC technology with Alamouti encoding according to a specific data encoding manner, and encodes to-be-transmitted data and then transmits the data, which almost completely eliminates impact of imaginary part interference without using a guard interval, and improves system performance.

It should be understood that the to-be-transmitted data sequence is signals to be transmitted by transmit antennas on subcarriers.

It should be understood that, for specific implementation of obtaining the to-be-transmitted data sequence, reference may be made to the prior art, and this embodiment of the present invention sets no limitation thereto.

Optionally, the data sequence is all pure real numbers, or the data sequence is all pure imaginary numbers. In the prior art, multiple modulation modes may exist, so that the to-be-transmitted data sequence is all pure real numbers or all pure imaginary numbers, for example, an OQAM modulation mode.

The transmit end apparatus 2100 may further execute the method in FIG. 13, and have functions of the transmit end apparatus (such as a base station) in the embodiment shown in FIG. 13 and the specific embodiments 1 and 2 of the present invention, and details are not described herein again in this embodiment of the present invention.

Figure 22:
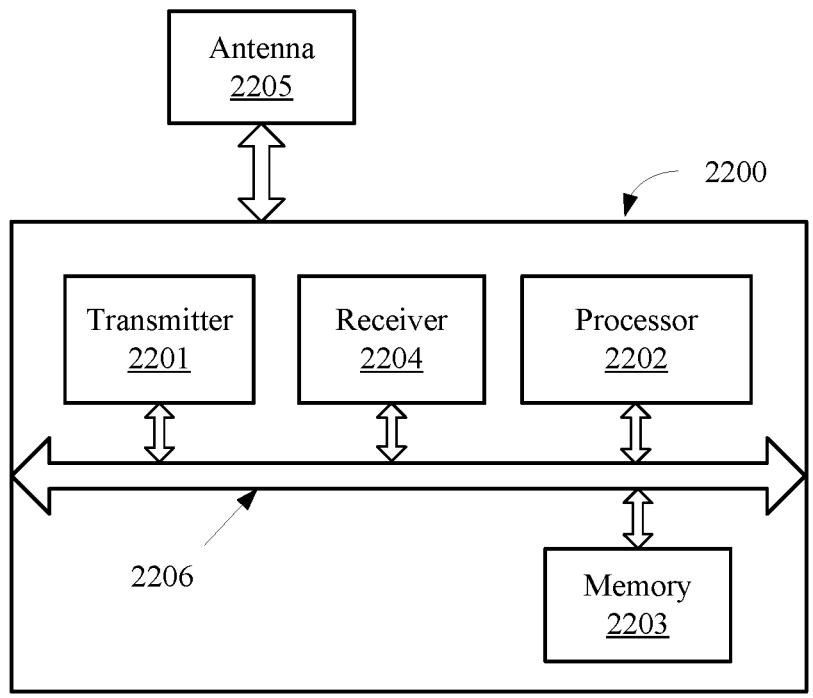
FIG. 22 is another schematic structural diagram of a receive end apparatus according to an embodiment of the present invention.

FIG. 22 is a schematic structural diagram of a receive end apparatus 2200 according to an embodiment of the present invention. The receive end apparatus 2200 may include a processor 2202, a memory 2203, a transmitter 2201, and a receiver 2204. In specific application, the receive end apparatus 2200 may be a radio access device such as a base station; or may be user equipment of a terminal such as a mobile phone.

The receiver 2204, the transmitter 2201, the processor 2202, and the memory 2203 are connected to each other by using a bus 2206 system. The bus 2206 may be an ISA bus, a PCI bus, an EISA bus, or the like. The bus may be classified into an address bus, a data bus, a control bus, and the like. For ease of denoting, FIG. 22 uses only one bidirectional arrow to denote the bus, but it does not mean that there is only one bus or only one type of bus. In specific application, the transmitter 2201 and the receiver 2204 may be coupled to an antenna 2205.

The memory 2203 is configured to store a program. Specifically, the program may include program code, and the program code includes a computer operation instruction. The memory 2203 may include a read-only memory and a random access memory, and provides an instruction and data to the processor 2202. The memory 2203 may include a high-speed RAM memory, and may further include a non-volatile memory (non-volatile memory), such as at least one magnetic disk memory.

The processor 2202 executes the program stored in the memory 2203, and is specifically configured to execute the following operations:

receiving, by using the receiver 2204, transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix that includes the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N-1$, $Y=WX$, $2*M*N$ pieces of data of the data sequence at the transmit end are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$, respectively, $0 \leq r \leq 2M-1$, and $0 \leq s \leq N-1$;

performing an FBMC signal demodulation operation on the transmit diversity signals to obtain a first signal; and performing a decoding operation on the first signal according to Alamouti encoding to obtain a second signal; and according to the second signal, performing an interference cancellation operation on received signals corresponding to the $(M-1)^{th}$ subcarrier and the $M^{th}$ subcarrier that are two adjacent subcarriers of the first antenna, and performing an interference cancellation operation on received signals corresponding to the $(M-1)^{th}$ subcarrier and the $M^{th}$ subcarrier that are two adjacent subcarriers of the second antenna, to obtain an estimated value of the data sequence.

It should be understood that in this embodiment of the present invention, numbering of both the subcarriers and the symbols starts from 0.

The method executed by the receive end apparatus (such as user equipment) disclosed in any embodiment in FIG. 14 and the specific embodiment 3 of the present invention may be applicable to the processor 2202 or may be implemented by the processor 2202. The processor 2202 may be an integrated circuit chip and has a signal processing capability. In an implementation process, the steps of the method may be implemented by an integrated logical circuit of hardware in the processor 2202, or by a software instruction. The processor 2202 may be a general purpose processor, including a central processing unit (Central Processing Unit, CPU for short), a network processor (Network Processor, NP for short), and the like, or may also be a digital signal processor (DSP), an application-specific integrated circuit (ASIC), a field programmable gate array (FPGA) or another programmable logic device, discrete gate or transistor logic device, or discrete hardware component. The processor 2202 may implement or execute methods, steps and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 2203, and the processor 2202 reads information in the memory 2203 and completes the steps in the foregoing methods in combination with hardware of the processor 2202.

In this embodiment of the present invention, the receive end apparatus 2200 decodes received data in an Alamouti manner according to a specific data encoding manner, and performs an interference cancellation operation on received signals on a receive antenna that correspond to the $(M-1)^{th}$ subcarrier and the $M^{th}$ subcarrier that are two adjacent subcarriers of the first antenna and the second antenna whose data matrices are adjacent in the receive antennas, which almost completely eliminates impact of imaginary part interference without using a guard interval and improves system performance.

Optionally, all the $2*M*N$ pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$A=(C^HC)^{-1}C^HR$, where $R=[\text{Re}(R_{M,1}^{eq}), \text{Re}(R_{M,2}^{eq}), \ldots, \text{Re}(R_{M,N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,N}^{eq})]^T$ when the data sequence includes no pure real number, and $$C = \begin{bmatrix} \Lambda & d_1 & \ldots & d_k & & & & & \\ & \ddots & & & & & & & \\ d_{-k} & \ldots & d_{-1} & \Lambda & d_1 & \ldots & d_k & & \\ & d_{-k} & \ldots & d_{-1} & \Lambda & d_1 & \ldots & d_k & \\ & & d_{-k} & \ldots & d_{-1} & \Lambda & d_1 & \ldots & d_k \\ & & & & & & & \ddots & \\ & & & & & d_{-k} & \ldots & d_{-1} & \Lambda \end{bmatrix}_{N \times N},$$

where $\Lambda=|H_M^1|^2+|H_M^2|^2+d_0$, $H_M^1$ denotes a channel frequency domain response obtained when a channel transmitted by the first antenna at the transmit end reaches a receive end, $H_M^2$ denotes a channel frequency domain response obtained when a channel transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{M,n}^{eq} = (H_M^1)^* R_{M,n} + H_M^2 R_{M+1,n}^*$$

$$= (|H_M^1|^2 + |H_M^2|^2) a_{M,n} + (|H_M^1|^2 + |H_M^2|^2)(ja_{M,n}^1) +$$

$$(|H_M^1|^2 - |H_M^2|^2)(ja_{M,n}^2) + 2(H_M^1)^* H_M^2 (jb_{M,n}^2),$$

where $R_{M,n}$ denotes data received on the $M^{th}$ subcarrier and the $n^{th}$ symbol, $n=1, 2 \ldots, 2N$.

The receive end apparatus 2200 may further execute the method in FIG. 14, and have functions of the receive end apparatus (such as user equipment) in the embodiment shown in FIG. 14 and the specific embodiment 3 of the present invention, and details are not described herein again in this embodiment of the present invention.

Figure 23:
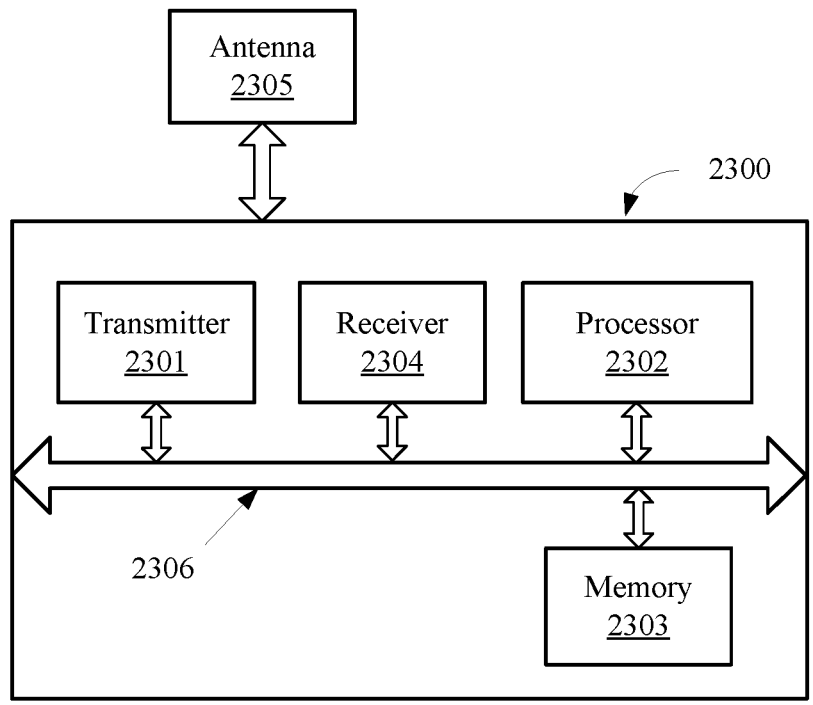
FIG. 23 is another schematic structural diagram of a transmit end apparatus according to an embodiment of the present invention.

FIG. 23 is a schematic structural diagram of a transmit end apparatus 2300 according to an embodiment of the present invention. The transmit end apparatus 2300 may include a processor 2302, a memory 2303, a transmitter 2301, and a receiver 2304. In specific application, the transmit end apparatus 2300 may be a radio access device such as a base station; or may be user equipment of a terminal such as a mobile phone.

The receiver 2304, the transmitter 2301, the processor 2302, and the memory 2303 are connected to each other by using a bus 2306 system. The bus 2306 may be an ISA bus, a PCI bus, an EISA bus, or the like. The bus may be classified into an address bus, a data bus, a control bus, and the like. For ease of denoting, FIG. 23 uses only one bidirectional arrow to denote the bus, but it does not mean that there is only one bus or only one type of bus. In specific application, the transmitter 2301 and the receiver 2304 may be coupled to an antenna 2305.

The memory 2303 is configured to store a program. Specifically, the program may include program code, and the program code includes a computer operation instruction. The memory 2303 may include a read-only memory and a random access memory, and provides an instruction and data to the processor 2302. The memory 2303 may include a high-speed RAM memory, and may further include a non-volatile memory (non-volatile memory), such as at least one magnetic disk memory.

The processor 2302 executes the program stored in the memory 2303, and is specifically configured to execute the following operations:

obtaining a to-be-transmitted data sequence, where the data sequence includes 2*M*N pieces of data;

performing transmit diversity processing on the to-be-transmitted data sequence to obtain FBMC signals of a first antenna and a second antenna, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \leq i \leq M-1$, $0 \leq j \leq N-1$, Y=WX, the 2*M*N pieces of data of the to-be-transmitted data sequence are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq M-1$, and $0 \leq s \leq 2N-1$; and transmitting the FBMC signals of the first antenna and the second antenna by using the transmitter 2301.

It should be understood that in this embodiment of the present invention, numbering of both the subcarriers and the symbols starts from 0.

The method executed by the transmit end apparatus (such as a base station) disclosed in any embodiment in FIG. 15 and the specific embodiment 4 of the present invention may be applicable to the processor 2302 or may be implemented by the processor 2302. The processor 2302 may be an integrated circuit chip and has a signal processing capability. In an implementation process, the steps of the method may be implemented by an integrated logical circuit of hardware in the processor 2302, or by a software instruction. The processor 2302 may be a general purpose processor, including a central processing unit (Central Processing Unit, CPU for short), a network processor (Network Processor, NP for short), and the like, or may also be a digital signal processor (DSP), an application-specific integrated circuit (ASIC), a field programmable gate array (FPGA) or another programmable logic device, discrete gate or transistor logic device, or discrete hardware component. The processor 2302 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 2303, and the processor 2302 reads information in the memory 2303 and completes the steps in the foregoing methods in combination with hardware of the processor 2302.

In this embodiment of the present invention, the transmit end apparatus 2300 combines the FBMC technology with Alamouti encoding according to a specific data encoding manner, and encodes to-be-transmitted data and then transmits the data, which almost completely eliminates impact of imaginary part interference without using a guard interval, and improves system performance.

Optionally, all the 2*M*N pieces of data are pure-real-number data, or all are pure-imaginary-number data.

The transmit end apparatus 2300 may further execute the method in FIG. 15, and have functions of the transmit end apparatus (such as a base station) in the embodiment shown in FIG. 15 and the specific embodiment 4 of the present invention, and details are not described herein again in this embodiment of the present invention.

Figure 24:
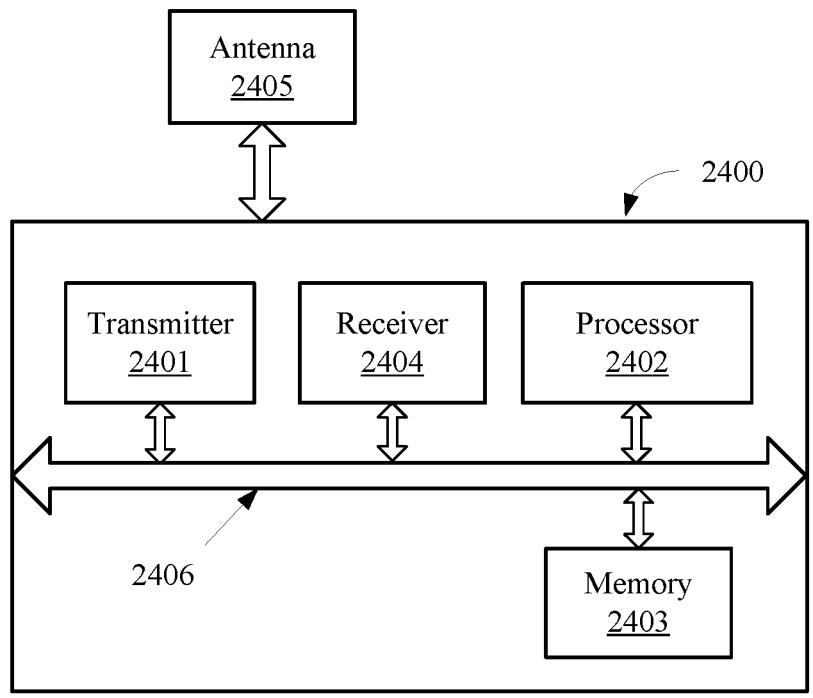
FIG. 24 is another schematic structural diagram of a receive end apparatus according to an embodiment of the present invention.

FIG. 24 is a schematic structural diagram of a receive end apparatus 2400 according to an embodiment of the present invention. The receive end apparatus 2400 may include a processor 2402, a memory 2403, a transmitter 2401, and a receiver 2404. In specific application, the receive end apparatus 2400 may be a radio access device such as a base station; or may be user equipment of a terminal such as a mobile phone.

The receiver 2404, the transmitter 2401, the processor 2402, and the memory 2403 are connected to each other by using a bus 2406 system. The bus 2406 may be an ISA bus, a PCI bus, an EISA bus, or the like. The bus may be classified into an address bus, a data bus, a control bus, and the like. For ease of denoting, FIG. 24 uses only one bidirectional arrow to denote the bus, but it does not mean that there is only one bus or only one type of bus. In specific application, the transmitter 2401 and the receiver 2404 may be coupled to an antenna 2405.

The memory 2403 is configured to store a program. Specifically, the program may include program code, and the program code includes a computer operation instruction. The memory 2403 may include a read-only memory and a random access memory, and provides an instruction and data to the processor 2402. The memory 2403 may include a high-speed RAM memory, and may further include a non-volatile memory (non-volatile memory), such as at least one magnetic disk memory.

The processor 2402 executes the program stored in the memory 2403, and is specifically configured to execute the following operations:

receiving, by using the receiver 2404, transmit diversity signals transmitted by a transmit end, where the transmit diversity signals at the transmit end include a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, where a precoding matrix is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix that includes the first FBMC signal and the second FBMC signal is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix that includes the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \leq i \leq M-1$, $0 \leq j \leq N-1$, $Y=WX$, $2*M*N$ pieces of data of the data sequence at the transmit end are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ sub carrier and an $s^{th}$ symbol are denoted by $y^{(0)}(r,s)$ and $y^{(1)}(r,s)$ respectively, $0 \leq r \leq M-1$, and $0 \leq s \leq 2N-1$;

performing an FBMC signal demodulation operation on the transmit diversity signals to obtain a first signal; and performing a decoding operation on the first signal according to Alamouti encoding to obtain a second signal; and according to the second signal, performing an interference cancellation operation on received signals corresponding to the $(N-1)^{th}$ symbol and the $N^{th}$ symbol that are two adjacent symbols of the first antenna, and performing an interference cancellation operation on received signals corresponding to the $(N-1)^{th}$ symbol and the $N^{th}$ symbol that are two adjacent symbols of the second antenna, to obtain an estimated value of the data sequence.

The method executed by the receive end apparatus (such as user equipment) disclosed in any embodiment in FIG. 16 and the specific embodiment 5 of the present invention may be applicable to the processor 2402 or may be implemented by the processor 2402. The processor 2402 may be an integrated circuit chip and has a signal processing capability. In an implementation process, the steps of the method may be implemented by an integrated logical circuit of hardware in the processor 2402, or by a software instruction. The processor 2402 may be a general purpose processor, including a central processing unit (Central Processing Unit, CPU for short), a network processor (Network Processor, NP for short), and the like, or may also be a digital signal processor (DSP), an application-specific integrated circuit (ASIC), a field programmable gate array (FPGA) or another programmable logic device, discrete gate or transistor logic device, or discrete hardware component. The processor 2402 may implement or execute methods, steps and logical block diagrams disclosed in the embodiments of the present invention. The general-purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 2403, and the processor 2402 reads information in the memory 2403 and completes the steps in the foregoing methods in combination with hardware of the processor 2402.

In this embodiment of the present invention, the receive end apparatus 2400 decodes received data in an Alamouti manner according to a specific data encoding manner, and performs an interference cancellation operation on received signals on a receive antenna that correspond to the $(M-1)^{th}$ subcarrier and the $M^{th}$ subcarrier that are two adjacent subcarriers of the first antenna and the second antenna whose data matrices are adjacent in the receive antennas, which almost completely eliminates impact of imaginary part interference without using a guard interval and improves system performance.

Optionally, all the $2*M*N$ pieces of data are pure-real-number data, or all are pure-imaginary-number data.

Optionally, in an embodiment of the present invention, data on the $M^{th}$ subcarrier is $A=[a_{M,1}, a_{M,2}, \ldots, a_{M,2N}]^T$, which meets the following formula:

$A=(C^H C)^{-1} C^H R$, where $R=[\text{Re}(R_{M,1}^{eq}), \text{Re}(R_{M,2}^{eq}), \ldots, \text{Re}(R_{M,2N}^{eq})]^T$ when the data sequence includes no pure imaginary number, or $R=[\text{Im}(R_{M,1}^{eq}), \text{Im}(R_{M,2}^{eq}), \ldots, \text{Im}(R_{M,2N}^{eq})]^T$ when the data sequence includes no pure real number, and $C=\text{diag}(|H_1|^2+|H_2|^2, |H_1|^2+|H_2|^2, \ldots, |H_1|^2+|H_2|^2)+D_{kM \times kM}$, where an element in the $(km+n-N)^{th}$ row and the $k(m+p)+N+1-n-q)^{th}$ column of $D_{kM \times kM}$ is $2 \times (-1)^{p(2N+1-n)+1} c_{p,q}(H_1)^* H_2$, and remaining elements are 0s, where $c_{p,q}$ is a pure imaginary number and denotes an imaginary part interference coefficient caused by data in a time-frequency point (m+p, n+q) position to data in a time-frequency point (m, n) position, m∈[1,M], n∈[N−k+1,N], p∈[−1,1], q∈[−k,n−N−1], $H_1$ denotes a channel frequency response obtained when a signal transmitted by the first antenna at the transmit end reaches a receive end, $H_2$ denotes a channel frequency response obtained when a signal transmitted by the second antenna at the transmit end reaches the receive end, Re denotes a function for acquiring a real part from a complex number, Im denotes a function for acquiring an imaginary part from a complex number, $R_{M,n}^{eq}$ denotes data received on the $M^{th}$ subcarrier and the $n^{th}$ symbol after traditional Alamouti equalization is performed, and meets the following formula:

$$R_{m,n}^{eq} = (H_1)^* R_{m,n} + H_2 R_{m,2N+1-n}^* = (|H_1|^2 + |H_2|^2) a_{m,n} +$$
$$(|H_1|^2 + |H_2|^2)(ja_{m,n}^1) + (|H_1|^2 - |H_2|^2)(ja_{m,n}^2) + 2(H_1)^* H_2(jb_{m,n}^2),$$

where $R_{M,n}$ denotes data received on the $M^{th}$ subcarrier and the $n^{th}$ symbol, n=1, 2 . . . , 2N.

The receive end apparatus 2400 may further execute the method in FIG. 16, and have functions of the receive end apparatus (such as user equipment) in the embodiment shown in FIG. 16 and the specific embodiment 5 of the present invention, and details are not described herein again in this embodiment of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A filter bank-based multi carrier (FBMC) transmit diversity transmission method, comprising:
   obtaining a to-be-transmitted data sequence, wherein the to-be-transmitted data sequence comprises 2*M*N pieces of data;
   performing transmit diversity processing on the to-be-transmitted data sequence to obtain FBMC signals of a first antenna and a second antenna, wherein $Y=WX$, a precoding matrix, W, is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix, Y, that comprises the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix, X, that comprises the to-be-transmitted data sequence is $$X = \begin{bmatrix} x^{(0)}(i, j) \\ x^{(1)}(i, j) \\ x^{(0)}(M-i-1, j) \\ x^{(1)}(M-1-1, j) \end{bmatrix},$$

$0 \le i \le M-1$, $0 \le j \le N-1$, the $2*M*N$ pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le N-1$; and transmitting the FBMC signals of the first antenna and the second antenna.

2. The method according to claim 1, wherein
all the $2*M*N$ pieces of data are pure-real-number data, or all are pure-imaginary-number data.

3. A filter bank-based multi carrier (FBMC) transmit diversity transmission method, comprising:
obtaining a to-be-transmitted data sequence, wherein the to-be-transmitted data sequence comprises $2*M*N$ pieces of data;
performing transmit diversity processing on the to-be-transmitted data sequence to obtain FBMC signals of a first antenna and a second antenna, wherein $Y=WX$, a precoding matrix, W, is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix, Y, that comprises the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix, X, that comprises the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, the $2*M*N$ pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le M-1$, and $0 \le s \le 2N-1$; and transmitting the FBMC signals of the first antenna and the second antenna.

4. The method according to claim 3, wherein
all the $2*M*N$ pieces of data are pure-real-number data, or all are pure-imaginary-number data.

5. A filter bank-based multi carrier (FBMC) transmit diversity receiving method, comprising:
receiving transmit diversity signals transmitted by a transmit end, wherein the transmit diversity signals at the transmit end comprise a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, wherein a precoding matrix, W, is $$W = \begin{bmatrix} 1 & 0 & 0 & 0 \\ 0 & 1 & 0 & 0 \\ 0 & 0 & 0 & (-1)^{j+1} \\ 0 & 0 & (-1)^{j} & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^{j} & 0 \end{bmatrix},$$

a matrix, Y, that comprises the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix, X, that comprises the data sequence at the transmit end is $$X = \begin{bmatrix} x^{(0)}(i, j) \\ x^{(1)}(i, j) \\ x^{(0)}(M-i-1, j) \\ x^{(1)}(M-1-1, j) \end{bmatrix},$$

$0 \le i \le M-1$, $0 \le j \le N-1$, $Y=WX$, $2*M*N$ pieces of data of the data sequence at the end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le 2M-1$, and $0 \le s \le 2N-1$;

performing a filter bank-based multi carrier FBMC signal demodulation operation on the transmit diversity signals to obtain a first signal;

performing a decoding operation on the first signal according to Alamouti encoding to obtain a second signal; and according to the second signal, performing an interference cancellation operation on received signals corresponding to the $(M-1)^{th}$ subcarrier and the $M^{th}$ subcarrier that are two adjacent subcarriers of the first antenna, and performing an interference cancellation operation on received signals corresponding to the $(M-1)^{th}$ subcarrier and the $M^{th}$ subcarrier that are two adjacent subcarriers of the second antenna, to obtain an estimated value of the data sequence.

6. The method according to claim 5, wherein all the $2*M*N$ pieces of data are pure-real-number data, or all are pure-imaginary-number data.

7. A filter bank-based multi carrier (FBMC) transmit diversity receiving method, comprising:

receiving transmit diversity signals transmitted by a transmit end, wherein the transmit diversity signals at the transmit end comprise a first FBMC signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, wherein a precoding matrix, W, is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix, Y, that comprises the first FBMC signal and the second FBMC signal is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix, X, that comprises the data sequence at the transmit end is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \leq i \leq M-1$, $0 \leq j \leq N-1$, $Y=WX$, $2*M*N$ pieces of data of the data sequence at the transmit end are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \leq r \leq M-1$, and $0 \leq s \leq 2N-1$; and performing a filter bank-based multi carrier (FBMC) signal demodulation operation on the transmit diversity signals to obtain a first signal;

performing a decoding operation on the first signal according to Alamouti encoding to obtain a second signal; and according to the second signal, performing an interference cancellation operation on received signals corresponding to the $(N-1)^{th}$ symbol and the $N^{th}$ symbol that are two adjacent symbols of the first antenna, and performing an interference cancellation operation on received signals corresponding to the $(N-1)^{th}$ symbol and the $N^{th}$ symbol that are two adjacent symbols of the second antenna, to obtain an estimated value of the data sequence.

8. The method according to claim 7, wherein all the $2*M*N$ pieces of data are pure-real-number data, or all are pure-imaginary-number data.

9. A transmit end apparatus, comprising:

an obtaining unit, configured to obtain a to-be-transmitted data sequence, wherein the to-be-transmitted data sequence comprises $2*M*N$ pieces of data;

a processing unit, configured to perform transmit diversity processing on the to-be-transmitted data sequence to obtain filter bank-based multi carrier (FBMC) signals of a first antenna and a second antenna, wherein $Y=WX$ a precoding matrix, W, is $$W = \begin{bmatrix} 1 & 0 & 0 & 0 \\ 0 & 1 & 0 & 0 \\ 0 & 0 & 0 & (-1)^{j+1} \\ 0 & 0 & (-1)^{j} & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^{j} & 0 \end{bmatrix},$$

a matrix, Y, that comprises the FBMC signals of the first antenna and the second antenna is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix, X, that comprises the to-be-transmitted data sequence is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \leq i \leq M-1$, $0 \leq j \leq N\ 1$, the $2*M*N$ pieces of data of the to-be-transmitted data sequence are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \leq r \leq 2M-1$, and $0 \leq s \leq 2N-1$; and a transmitting unit, configured to transmit the FBMC signals of the first antenna and the second antenna.

10. The transmit end apparatus according to claim 9, wherein all the $2*M*N$ pieces of data are pure-real-number data, or all are pure-imaginary-number data.

11. A transmit end apparatus, comprising:

a receiver, configured to obtain a to-be-transmitted data sequence, wherein the data sequence comprises $2*M*N$ pieces of data;

a processor, configured to perform transmit diversity processing on the to-be-transmitted data sequence to obtain filter bank-based multi carrier (FBMC) signals of a first antenna and a second antenna, wherein $Y=WX$ a precoding matrix, W, is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix, Y, that comprises the FBMC signals of the first antenna and the second antenna is $$Y = \begin{bmatrix} y^{(0)}(i, j) \\ y^{(1)}(i, j) \\ y^{(0)}(i, j+N) \\ y^{(1)}(i, j+N) \end{bmatrix},$$

a matrix, X, that comprises the to-be-transmitted data sequence is $$X = \begin{bmatrix} x^{(0)}(i, j) \\ x^{(1)}(i, j) \\ x^{(0)}(i, N-j-1) \\ x^{(1)}(i, N-j-1) \end{bmatrix},$$

$0 \le i \le M-1$, $0 \le j \le N-1$, the $2*M*N$ pieces of data of the to-be-transmitted data sequence are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \le r \le M-1$, and $0 \le s \le 2N-1$; and a transmitter, configured to transmit the FBMC signals of the first antenna and the second antenna.

12. The transmit end apparatus according to claim 11, wherein all the $2*M*N$ pieces of data are pure-real-number data, or all are pure-imaginary-number data.

13. A receive end apparatus, comprising:

a receiver, configured to receive transmit diversity signals transmitted by a transmit end, wherein the transmit diversity signals at the transmit end comprise a first filter bank-based multi carrier (FBMC) signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, wherein a precoding matrix, W, is $$W = \begin{bmatrix} 1 & 0 & 0 & 0 \\ 0 & 1 & 0 & 0 \\ 0 & 0 & 0 & (-1)^{j+1} \\ 0 & 0 & (-1)^j & 0 \end{bmatrix} \text{ or } W = \begin{bmatrix} 1 & 0 & 0 & 0 \\ 0 & (-1)^{j+1} & 0 & 0 \\ 0 & 0 & 0 & 1 \\ 0 & 0 & (-1)^j & 0 \end{bmatrix},$$

a matrix, Y, that comprises the first FBMC signal and the second FBMC signal is $$Y = \begin{bmatrix} y^{(0)}(i, j) \\ y^{(1)}(i, j) \\ y^{(0)}(i+M, j) \\ y^{(1)}(i+M, j) \end{bmatrix},$$

a matrix, X, that comprises the data sequence at the transmit end is $$X = \begin{bmatrix} x^{(0)}(i, j) \\ x^{(1)}(i, j) \\ x^{(0)}(M-i-1, j) \\ x^{(1)}(M-i-1, j) \end{bmatrix},$$

$0 \le i \le M-1$, $0 \le j \le N-1$, $Y=WX$, $2*M*N$ pieces of data of the data sequence at the end are denoted by $x^{(0)}(k,l)$ and $x^{(1)}(k,l)$, $0 \le k \le M-1$, $0 \le l \le N-1$, FBMC signals of the first antenna and the second antenna on an $r^{th}$ subcarrier and an $s^{th}$ symbol are denoted by $y^{(0)}(r,s)$ and $y^{(1)}(r,s)$ respectively, $0 \le r \le 2M-1$, and $0 \le s \le 2N-1$; and a processor, configured to perform a filter bank-based multi carrier FBMC signal demodulation operation on the transmit diversity signals to obtain a first signal; perform a decoding operation on the first signal according to Alamouti encoding to obtain a second signal; and according to the second signal, perform an interference cancellation operation on received signals corresponding to the $(M-1)^{th}$ subcarrier and the $M^{th}$ subcarrier that are two adjacent subcarriers of the first antenna, and perform an interference cancellation operation on received signals corresponding to the $(M-1)^{th}$ subcarrier and the $M^{th}$ subcarrier that are two adjacent subcarriers of the second antenna, to obtain an estimated value of the data sequence.

14. The receive end apparatus according to claim 13, wherein all the $2*M*N$ pieces of data are pure-real-number data, or all are pure-imaginary-number data.

15. A receive end apparatus, comprising:

a receiver, configured to receive transmit diversity signals transmitted by a transmit end, wherein the transmit diversity signals at the transmit end comprise a first filter bank-based multi carrier (FBMC) signal transmitted by a first antenna of the transmit end and a second FBMC signal transmitted by a second antenna of the transmit end, and the transmit end performs transmit diversity processing on a data sequence at the transmit end to obtain the first FBMC signal and the second FBMC signal, wherein a precoding matrix, W, is $$W = \begin{bmatrix} 1 & 0 & 0 & 0 \\ 0 & 1 & 0 & 0 \\ 0 & 0 & 0 & -1 \\ 0 & 0 & 1 & 0 \end{bmatrix} \text{ or } W = \begin{bmatrix} 1 & 0 & 0 & 0 \\ 0 & 1 & 0 & 0 \\ 0 & 0 & 0 & 1 \\ 0 & 0 & -1 & 0 \end{bmatrix},$$

a matrix, Y, that comprises the first FBMC signal and the second FBMC signal is $$Y = \begin{bmatrix} y^{(0)}(i,j) \\ y^{(1)}(i,j) \\ y^{(0)}(i,j+N) \\ y^{(1)}(i,j+N) \end{bmatrix},$$

a matrix, X, that comprises the data sequence at the transmit end is $$X = \begin{bmatrix} x^{(0)}(i,j) \\ x^{(1)}(i,j) \\ x^{(0)}(i,N-j-1) \\ x^{(1)}(i,N-j-1) \end{bmatrix},$$

$0 \leq i \leq M-1$, $0 \leq j \leq N-1$, Y=WX, 2*M*N pieces of data of the data sequence at the transmit end are denoted by $x^{(0)}(k,l)$ and $x^{(1)}(k,l)$, $0 \leq k \leq M-1$, $0 \leq l \leq N-1$, FBMC signals of the first antenna and the second antenna on an $r^{th}$ subcarrier and an $s^{th}$ symbol are denoted by $y^{(0)}(r,s)$ and $y^{(1)}(r,s)$, $0 \leq r \leq M-1$, and $0 \leq s \leq 2N-1$; and a processor, configured to perform a filter bank-based multi carrier FBMC signal demodulation operation on the transmit diversity signals to obtain a first signal; perform a decoding operation on the first signal according to Alamouti encoding to obtain a second signal; and according to the second signal, perform an interference cancellation operation on received signals corresponding to the $(N-1)^{th}$ symbol and the $N^{th}$ symbol that are two adjacent symbols of the first antenna, and perform an interference cancellation operation on received signals corresponding to the $(N-1)^{th}$ symbol and the $N^{th}$ symbol that are two adjacent symbols of the second antenna, to obtain an estimated value of the data sequence.

16. The receive end apparatus according to claim 15, wherein all the 2*M*N pieces of data are pure-real-number data, or all are pure-imaginary-number data.

* * * * *

UNITED STATES PATENT AND TRADEMARK OFFICE
CERTIFICATE OF CORRECTION

| | | |
|---|---|---|
| PATENT NO. | : 10,050,684 B2 | Page 1 of 1 |
| APPLICATION NO. | : 15/604387 | |
| DATED | : August 14, 2018 | |
| INVENTOR(S) | : Daiming Qu et al. | |

It is certified that error appears in the above-identified patent and that said Letters Patent is hereby corrected as shown below:

In the Claims

Claim 1, Column 89, Line 6, " $X = \begin{bmatrix} x^{(0)}(i,j) \\ x^{(1)}(i,j) \\ x^{(0)}(M-i-1,j) \\ x^{(1)}(M-1-1,j) \end{bmatrix}$, " should read -- $X = \begin{bmatrix} x^{(0)}(i,j) \\ x^{(1)}(i,j) \\ x^{(0)}(M-i-1,j) \\ x^{(1)}(M-i-1,j) \end{bmatrix}$ --.

Claim 5, Column 90, Line 44, " $X = \begin{bmatrix} x^{(0)}(i,j) \\ x^{(1)}(i,j) \\ x^{(0)}(M-i-1,j) \\ x^{(1)}(M-1-1,j) \end{bmatrix}$, " should read -- $X = \begin{bmatrix} x^{(0)}(i,j) \\ x^{(1)}(i,j) \\ x^{(0)}(M-i-1,j) \\ x^{(1)}(M-i-1,j) \end{bmatrix}$ --.

Signed and Sealed this
Third Day of September, 2019

Andrei Iancu
*Director of the United States Patent and Trademark Office*